United States Patent
Kondo

(10) Patent No.: US 7,859,601 B2
(45) Date of Patent: Dec. 28, 2010

(54) SIGNAL PROCESSING DEVICE, HOUSING RACK, AND CONNECTOR

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 10/297,887

(22) PCT Filed: Apr. 12, 2002

(86) PCT No.: PCT/JP02/03699

§ 371 (c)(1),
(2), (4) Date: May 19, 2003

(87) PCT Pub. No.: WO02/085003

PCT Pub. Date: Oct. 24, 2002

(65) Prior Publication Data

US 2004/0031060 A1   Feb. 12, 2004

(30) Foreign Application Priority Data

Apr. 12, 2001 (JP) .......................... 2001-113416
Apr. 12, 2001 (JP) .......................... 2001-113417

(51) Int. Cl.
  *H04N 7/00* (2006.01)
  *H04N 9/64* (2006.01)
  *H04N 5/64* (2006.01)
(52) U.S. Cl. .......................... 348/789; 348/552; 348/718; 348/721; 348/838; 348/839
(58) Field of Classification Search ................. 348/552, 348/718–721, 789, 838, 839
See application file for complete search history.

(56) References Cited

U.S. PATENT DOCUMENTS

| 3,679,829 | A |   | 7/1972 | Hofmeister et al. |
| 4,179,172 | A |   | 12/1979 | Christensen et al. |
| 5,227,863 | A | * | 7/1993 | Bilbrey et al. ............... 348/578 |
| 5,502,512 | A | * | 3/1996 | Toyoda et al. ............... 348/706 |

(Continued)

FOREIGN PATENT DOCUMENTS

EP   1 037 471   9/2000

(Continued)

OTHER PUBLICATIONS

James Kardach, Bluetooth Architecture Overview, XP002141146.

*Primary Examiner*—Brian Yenke
(74) *Attorney, Agent, or Firm*—Frommer Lawrence & Haug LLP; Williams S. Frommer; Thomas F. Presson

(57) ABSTRACT

A signal processing system with multiple electronic apparatus. A controller checks and determines whether or not the electronic apparatus are electrically connected and are compliant for performing a cooperative signal processing. For example, when a TV signal processor is not connected to another apparatus, a signal processing circuit performs normal signal processing. When the TV signal processor is connected to another compliant apparatus, the TV signal processor cooperates with the compliant electronic apparatus as if they were a single apparatus and performs optimal processing of an input signal. In an ID table stored in the controller, processing information concerning processing tasks to be shared with the compliant electronic apparatus is associated with the function ID of the compliant electronic apparatus.

26 Claims, 27 Drawing Sheets

U.S. PATENT DOCUMENTS

| | | | |
|---|---|---|---|
| 5,602,723 A | | 2/1997 | Takahashi et al. |
| RE35,859 E | * | 7/1998 | Gardner et al. ............... 348/553 |
| 5,872,565 A | * | 2/1999 | Greaves et al. ............. 715/723 |
| 5,926,624 A | * | 7/1999 | Katz et al. ................... 709/217 |
| 6,003,041 A | * | 12/1999 | Wugofski ................ 707/104.1 |
| 6,052,750 A | * | 4/2000 | Lea ............................. 710/72 |
| 6,144,561 A | | 11/2000 | Cannella, Jr. et al. |
| 6,151,077 A | * | 11/2000 | Vogel et al. ................. 348/553 |
| 6,160,548 A | * | 12/2000 | Lea et al. .................... 715/723 |
| 6,161,156 A | * | 12/2000 | Suzuki et al. ............... 710/300 |
| 6,175,390 B1 | * | 1/2001 | Kim et al. ................... 348/725 |
| 6,188,381 B1 | * | 2/2001 | van der Wal et al. ........ 345/581 |
| 6,340,994 B1 | * | 1/2002 | Margulis et al. ............. 348/625 |
| 6,363,434 B1 | * | 3/2002 | Eytchison ................... 719/313 |
| 6,414,717 B1 | | 7/2002 | Kondo et al. |
| 6,469,742 B1 | * | 10/2002 | Trovato et al. .............. 348/553 |
| 6,530,085 B1 | * | 3/2003 | Perlman ....................... 725/82 |
| 6,532,004 B1 | * | 3/2003 | Harrison et al. ............. 345/169 |
| 6,615,243 B1 | * | 9/2003 | Megeid et al. .............. 709/208 |
| 6,665,020 B1 | * | 12/2003 | Stahl et al. ................... 348/552 |
| 6,690,431 B1 | * | 2/2004 | Yang et al. .................. 348/706 |
| 6,735,720 B1 | * | 5/2004 | Dunn et al. ................... 714/43 |
| 6,829,783 B1 | * | 12/2004 | Fegesh ........................ 348/705 |
| 6,847,411 B2 | | 1/2005 | Pan et al. ..................... 348/839 |
| 6,933,936 B1 | * | 8/2005 | Hirai ............................ 345/211 |
| 7,386,742 B2 | * | 6/2008 | Hirai ............................ 713/300 |
| 2001/0052946 A1 | * | 12/2001 | Sato ............................. 348/706 |
| 2002/0008779 A1 | * | 1/2002 | Ju et al. ....................... 348/552 |
| 2002/0016873 A1 | * | 2/2002 | Gray et al. ..................... 710/28 |
| 2002/0161844 A1 | * | 10/2002 | Overtoom .................... 709/208 |
| 2002/0186329 A1 | * | 12/2002 | Tong et al. ................... 348/839 |
| 2002/0186536 A1 | * | 12/2002 | Kimball et al. .............. 361/707 |
| 2003/0070168 A1 | * | 4/2003 | Stone ........................... 725/37 |
| 2003/0092437 A1 | * | 5/2003 | Nowlin et al. ............... 455/420 |
| 2004/0103184 A1 | * | 5/2004 | Humpleman et al. ........ 709/223 |
| 2004/0199696 A1 | * | 10/2004 | Chari et al. .................. 710/302 |
| 2006/0206629 A1 | * | 9/2006 | Sasaki et al. .................... 710/8 |

FOREIGN PATENT DOCUMENTS

| | | | |
|---|---|---|---|
| JP | 2-246400 | | 10/1990 |
| JP | 3-2694 | | 1/1991 |
| JP | 4 271084 | | 9/1992 |
| JP | 5 37171 | | 2/1993 |
| JP | 5 103376 | | 4/1993 |
| JP | 5-144242 | | 6/1993 |
| JP | 5 315770 | | 11/1993 |
| JP | 60169440 | * | 6/1994 |
| JP | 7 75029 | | 3/1995 |
| JP | 9 98355 | | 4/1997 |
| JP | 2000-307594 | * | 11/2000 |
| JP | 2000-316085 | | 11/2000 |
| WO | WO 00/21301 | | 4/2000 |
| WO | WO 01/22204 | * | 3/2001 |

* cited by examiner

FIG. 8
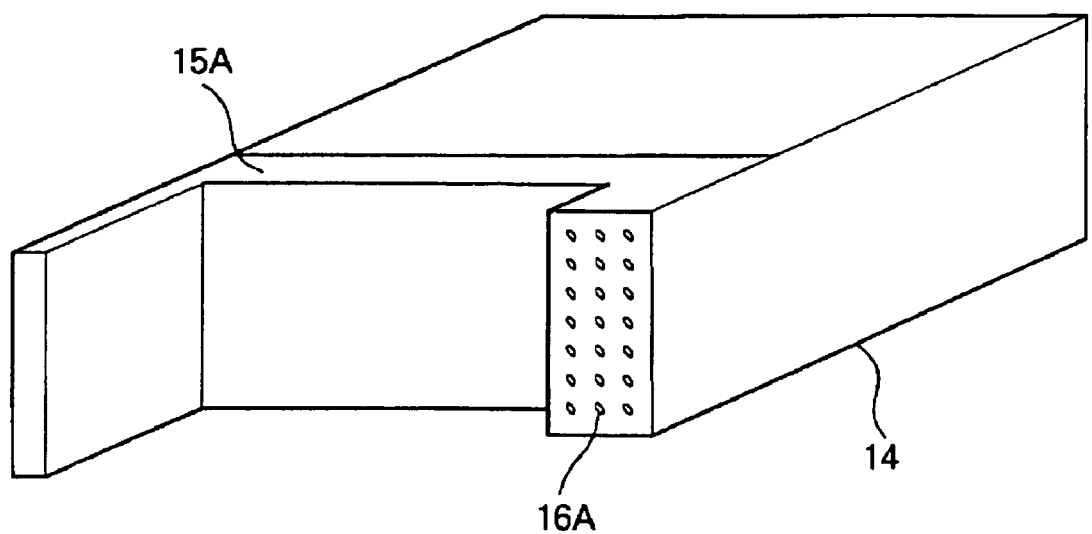
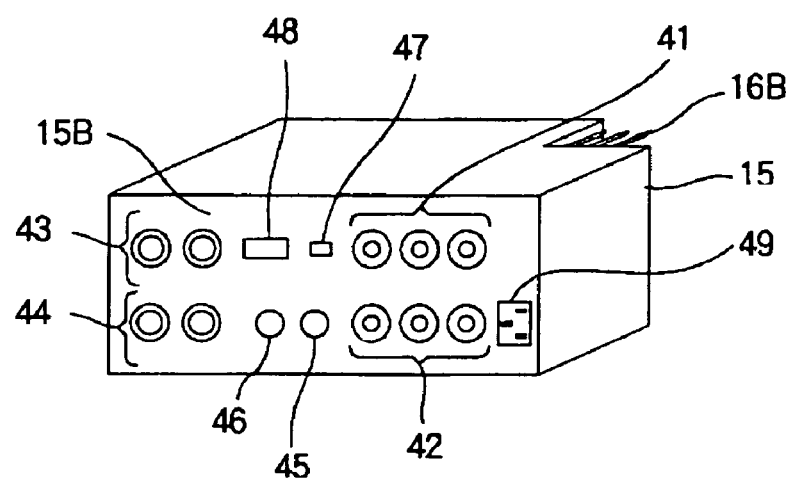

FIG. 13
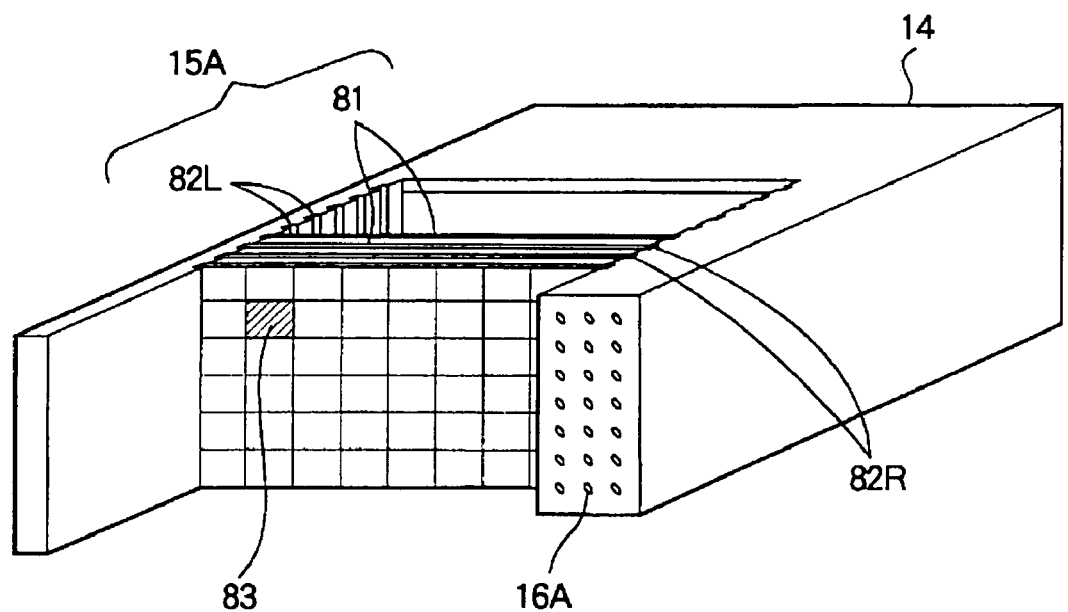
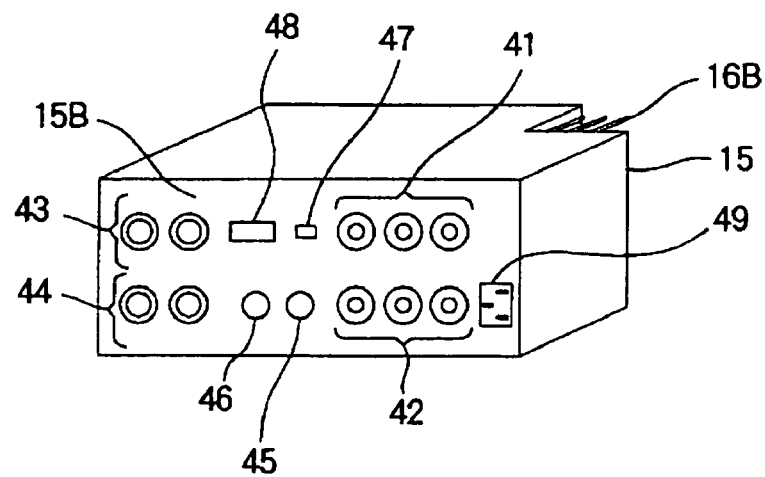

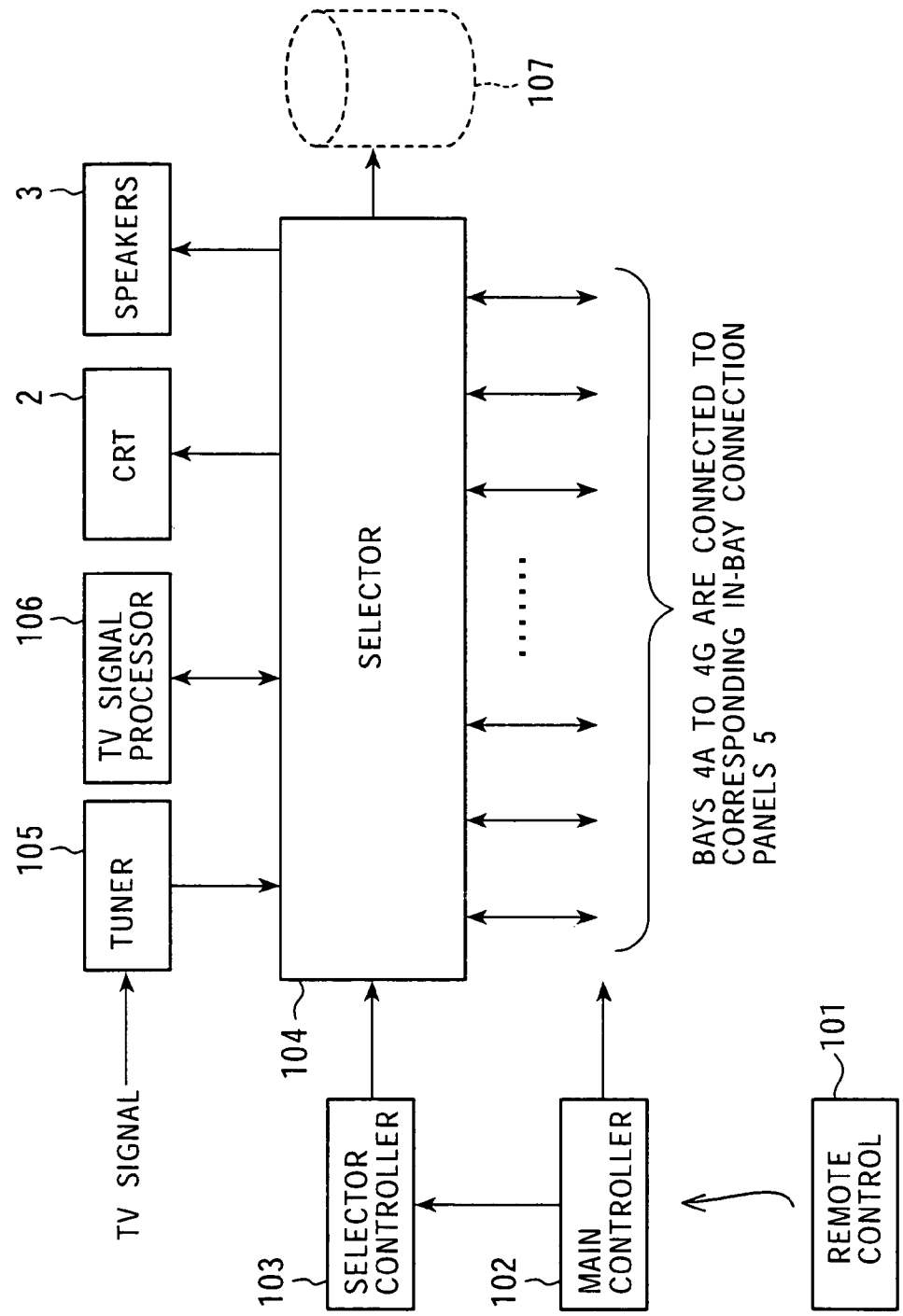

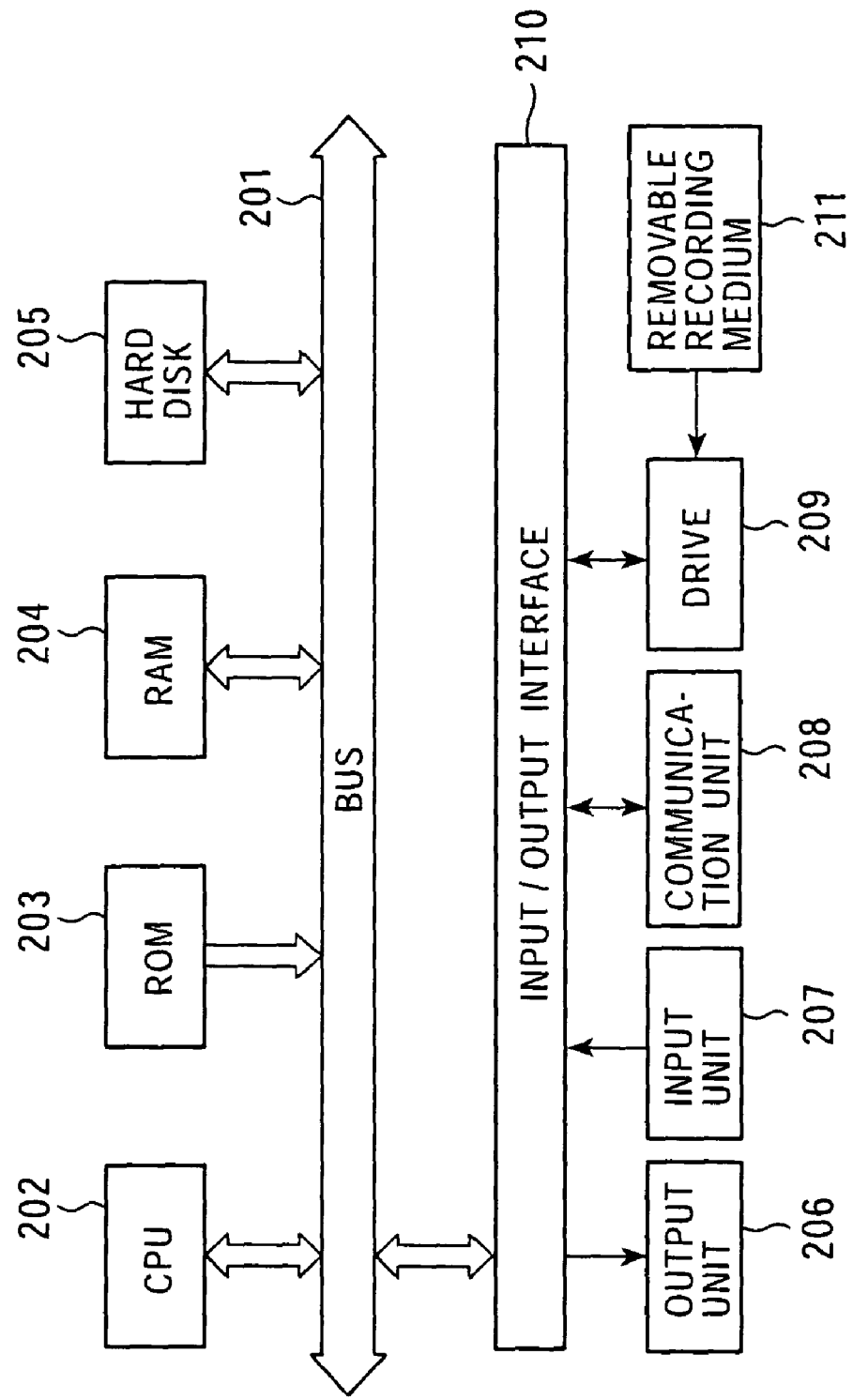

SIGNAL PROCESSING DEVICE, HOUSING RACK, AND CONNECTOR

TECHNICAL FIELD

The present invention relates to signal processing apparatuses, and more particularly relates to a signal processing apparatus for enabling, when a plurality of apparatuses are connected with one other, the apparatuses to cooperate in sharing the task of processing an input signal by changing the function of each apparatus, thus achieving a processing result of higher quality than that achieved by independent processing by a single apparatus. Furthermore, the present invention relates to storage racks and connection apparatuses, and more particularly relates to a storage rack and a connection apparatus for easily connecting electronic apparatuses, e.g., AV (Audio Visual) apparatuses, with each other.

BACKGROUND ART

For example, digital VTRs (Video Tape Recorders) and DVD (Digital Versatile Disc) players are used by connecting them to television sets for viewing and listening to images and audio played. Specifically, images and audio played by a digital VTR or the like are supplied to a television set, and the images are displayed on a screen, and the audio is output from a speaker.

As described above, when the television set outputs the images and audio played by the digital VTR, some of signal processing circuits included in the television set do not particularly perform processing.

In other words, for example, when a component signal is output from the digital VTR, a signal processing circuit for converting a composite signal into a component signal in the television set is not particularly required to perform processing and thus idle.

As described above, when the television set and the digital VTR are connected with each other, if a signal processing circuit included in the television set and a signal processing circuit included in the digital VTR cooperate in sharing the task of processing a signal such as an image or audio, a higher-quality image and audio can be offered to a user.

At the same time, for example, AV apparatuses such as the digital VTR, the DVD player, and the television set operate independently. In order to view/listen to images and audio played by the digital VTR and the DVD player, the digital VTR and the DVD player need to be connected to the television set.

In other words, the digital VTR, the DVD player, and the television set are generally provided with, at the back thereof, terminals, which are exposed to the outside, for receiving or outputting images and audio. Output terminals of the digital VTR and the DVD player and input terminals of the television set are connected with one another by predetermined cables, thus allowing images and audio played by the digital VTR and the DVD player to be output from the television set.

For example, when two AV apparatuses are connected with each other, three cables are required for images and audio from the L (Left) and R (Right) channels. Connecting the AV apparatuses with each other using cables is cumbersome. As the number of AV apparatuses to be connected with one another increases, so does the number of cables required for connecting the AV apparatuses with one another. Cable handling (arrangement, etc.) thus becomes complicated.

DISCLOSURE OF INVENTION

In view of these circumstances, it is an object of the present invention to enable a plurality of apparatuses to cooperate in sharing the task of processing an input signal by changing the function of each apparatus, thus achieving a processing result of higher quality than that achieved by independent processing by a single apparatus.

Furthermore, it is another object of the present invention to easily connect electronic apparatuses with each other.

A signal processing apparatus of the present invention includes signal processing means for processing an input signal, the signal processing means having a predetermined function; determining means for determining whether or not another apparatus is connected; and control means for changing the function of the signal processing means between a mode in which the other apparatus is connected and a mode in which the other apparatus is not connected.

A signal processing method of the present invention includes a signal processing step of processing an input signal, the signal processing step having a predetermined function; a determining step of determining whether or not another apparatus is connected; and a control step of changing the function of the signal processing step between a mode in which the other apparatus is connected and a mode in which the other apparatus is not connected.

A program of the present invention includes a signal processing step of processing an input signal, the signal processing step having a predetermined function; a determining step of determining whether or not another apparatus is connected; and a control step of changing the function of the signal processing step between a mode in which the other apparatus is connected and a mode in which the other apparatus is not connected.

A recording medium of the present invention has recorded therein a program including a signal processing step of processing an input signal, the signal processing step having a predetermined function; a determining step of determining whether or not another apparatus is connected; and a control step of changing the function of the signal processing step between a mode in which the other apparatus is connected and a mode in which the other apparatus is not connected.

A signal processing system of the present invention includes first and second signal processing apparatuses, each of which including signal processing means for processing an input signal, the signal processing means having a predetermined function; determining means for determining whether or not the other signal processing apparatus is connected; and control means for changing the function of the signal processing means between a mode in which the other signal processing apparatus is connected and a mode in which the other signal processing apparatus is not connected.

A storage rack of the present invention includes at least one holder in the shape of a cavity for storing an electronic apparatus which operates independently and which includes at least one signal terminal, which is exposed to the outside, for receiving or outputting a signal; and a connection panel including a connection terminal connecting with the signal terminal of the electronic apparatus, the connection panel being provided in the holder.

A connection apparatus of the present invention includes a first face including a first terminal connecting with a connection terminal provided on a connection panel of a storage rack including the connection panel including the connection terminal electrically connecting with a signal terminal of an electronic apparatus, the connection panel being included in at least one holder in the shape of a cavity; and a second face including a second terminal connecting with the signal terminal of the electronic apparatus which operates independently and which includes at least one signal terminal, which is exposed to the outside, for receiving or outputting a signal.

A storage rack system of the present invention includes a storage rack for storing an electronic apparatus which operates independently and which includes at least one signal terminal, which is exposed to the outside, for receiving or outputting a signal. The storage rack includes at least one holder in the shape of a cavity for storing the electronic apparatus; and a connection panel including a connection terminal connecting with the signal terminal of the electronic apparatus, the connection panel being provided in the holder.

Another signal processing apparatus of the present invention includes connection means to which another apparatus is connected; determining means for determining whether or not the other apparatus connected with the connection means is a specific apparatus; signal processing means having tap coefficients computed in advance by learning, the signal processing means performing signal processing of the input signal in accordance with a first or second function by performing an arithmetic operation using the tap coefficients and the input signal; and control means for changing the function of the signal processing by the signal processing means by changing the tap coefficients on the basis of a determination result by the determining means. The signal processing means includes a storage unit for storing the tap coefficients; and an arithmetic operation unit for performing, under the control of the control means, the arithmetic operation using the tap coefficients and the input signal. The arithmetic operation unit performs the signal processing in accordance with the first and second functions without changing the physical configuration of a circuit for performing processing specialized in one processing step.

According to a signal processing apparatus, a signal processing method, a program, a recording medium, and a signal processing system, it is determined whether or not another apparatus is connected. The function of processing an input signal is changed between a mode in which the other apparatus is connected and a mode in which the other apparatus is not connected.

According to a storage rack of the present invention, an electronic apparatus which operates individually and which includes at least one signal terminal, which is exposed to the outside, for receiving or outputting a signal is stored in a holder in the shape of a cavity, and a connection terminal provided on a connection panel in the holder is connected with the signal terminal of the electronic apparatus.

According to a connection apparatus of the present invention, a first face includes a first terminal connecting with a connection terminal provided on a connection panel of a storage rack including the connection panel in a holder, the connection panel including the connection terminal electrically connecting with a signal terminal of an electronic apparatus, and a second face includes a second terminal connecting with the signal terminal of the electronic apparatus which operates individually and which includes at least one signal terminal, which is exposed to the outside, for receiving or outputting a signal.

According to a storage rack system of the present invention, a storage rack for storing an electronic apparatus which operates individually and which includes at least one signal terminal, which is exposed to the outside, for receiving or outputting a signal includes at least one holder in the shape of a cavity for storing the electronic apparatus; and a connection panel including a connection terminal connecting with the signal terminal of the electronic apparatus, the connection panel being provided in the holder.

According to another signal processing apparatus of the present invention, signal processing of an input signal in accordance with a first or second function is performed by an arithmetic operation using tap coefficients, which are computed in advance by learning, and the input signal. In contrast, it is determined whether or not another apparatus connected with connection means is a specific apparatus. The tap coefficients are changed on the basis of a determination result by determining means. Accordingly, the function of signal processing is changed. In this case, signal processing means for performing signal processing includes a storage unit for storing the tap coefficients; and an arithmetic operation unit for performing, under the control of the control means, the arithmetic operation using the tap coefficients and the input signal. The arithmetic operation unit performs the signal processing in accordance with the first and second functions without changing the physical configuration of a circuit for performing processing specialized in one processing step.

BRIEF DESCRIPTION OF THE DRAWINGS

FIG. 8 is a perspective view showing the bay adapter box 14 having the removable adapter back panel 15B.

FIG. 13 includes perspective views showing yet another example of the configuration of the back panel 15 having the movable terminals.

FIG. 15 is a block diagram showing an example of the electrical configuration of the bay-structure television set.

FIG. 29 is a block diagram showing an example of the configuration of an embodiment of a computer according to the present invention.

BEST MODE FOR CARRYING OUT THE INVENTION

Figure 1:
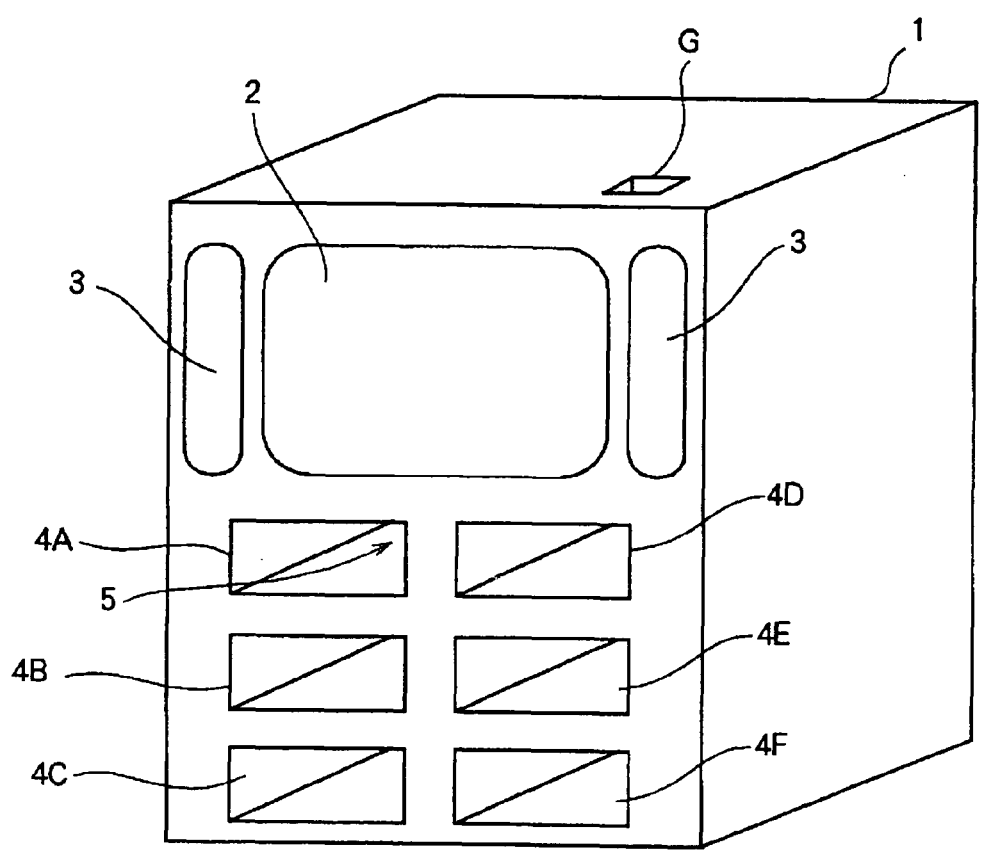
FIG. 1 is a perspective view showing an example of the configuration of an embodiment of a bay-structure television set according to the present invention.

FIG. 1 is a perspective view showing an example of the configuration of an embodiment of a bay-structure television set according to the present invention.

A TV (Television) rack 1, which is a casing of the apparatus, is provided with a CRT (Cathode Ray Tube) 2 at the center of the upper portion of the front face and L (Left) channel and R (Right) channel speakers 3 on the left and right of the CRT 2.

The lower portion of the front face of the TV rack 1 is provided with six bays 4A, 4B, 4C, 4D, 4E, and 4F. Hereinafter, the bays 4A to 4F are referred to as the bays 4 when it is unnecessary to distinguish one from the others.

The bays 4 are formed in the shape of cavities so as to store electronic apparatuses such as a digital VTR and a DVD player which operate independently and which have at least one signal terminal, which is exposed to the outside, for receiving or outputting signals. The internal front face of each of the bays 4 is provided with an in-bay connection panel 5 (FIG. 3), which will be described below, having a connection terminal connecting with a signal terminal of an electronic apparatus stored in each of the bays 4.

A bay 4G, which is also formed in the shape of a cavity, is provided at the right front side of the top face of the TV rack 1. Whereas the bays 4A to 4F are shaped as large cavities so as to store relatively large electronic apparatuses such as the digital VTR, the bay 4G is shaped as a small cavity so as to store a relatively small electronic apparatus such as a cellular phone or a PDA (Personal Digital Assistant). The interior of the bay 4G is provided with an in-bay connection panel having a connection terminal connecting with a signal terminal of an electronic apparatus stored therein. Since the in-bay connection panel in the bay 4G connects with the signal terminal of the small electronic apparatus such as the cellular phone, the in-bay connection panel in the bay 4G differs from the in-bay connection panels 5 in the bays 4A to 4F, which connect with the signal terminals of the large electronic apparatuses such as the digital VTR.

Figure 2:
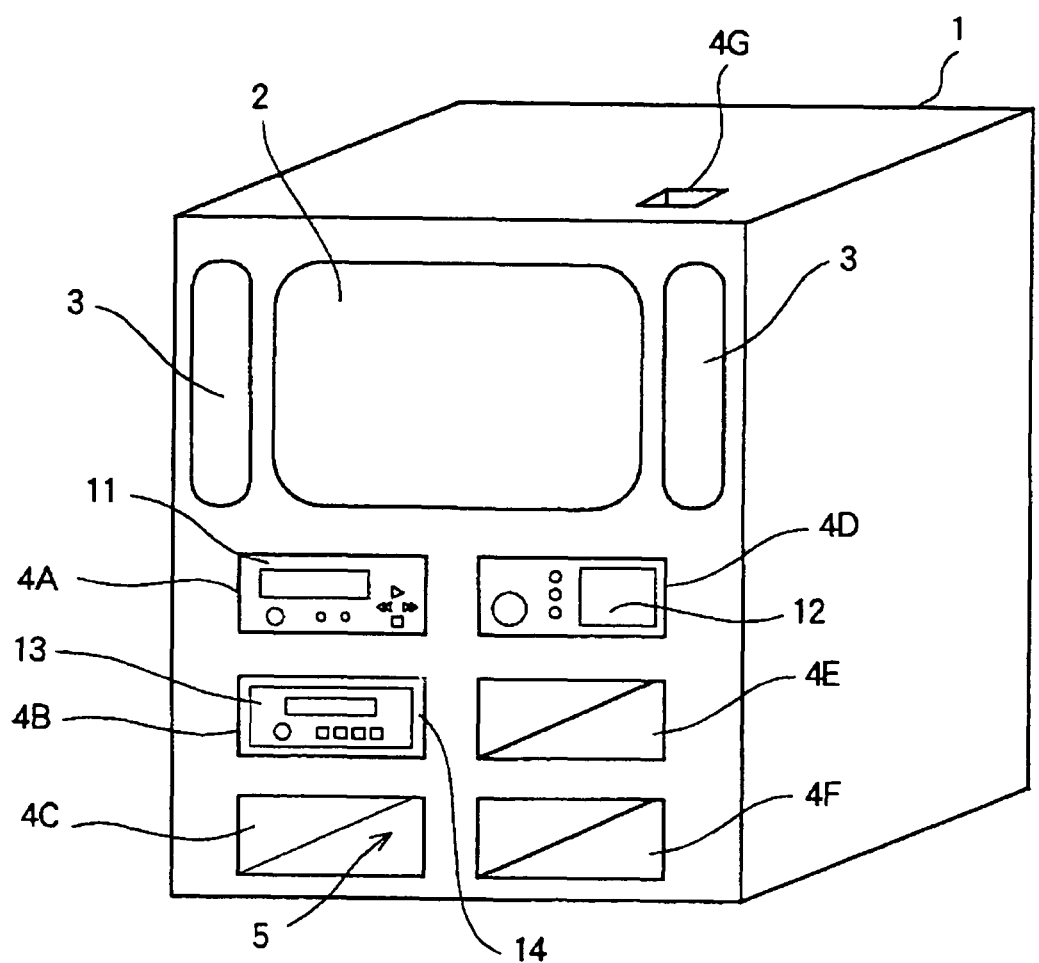
FIG. 2 is a perspective view showing the bay-structure television set having electronic apparatuses stored therein.

FIG. 2 is a perspective view of the bay-structure television set shown in FIG. 1 in which electronic apparatuses are stored in the bays 4.

In the embodiment of FIG. 2, electronic apparatuses 11 and 12 are stored directly in the bays 4A and 4D, and an electronic apparatus 13 stored in a bay adapter box 14 is stored in the bay 4B.

Specifically, the electronic apparatuses 11 and 12 are electronic apparatuses compliant with the bay-structure television set (for example, electronic apparatuses manufactured by the same manufacturer as that of the bay-structure television set). Without the use of the bay adapter box 14, the electronic apparatuses 11 and 12 can be stored directly in the bays 4.

In contrast, the electronic apparatus 13 is an electronic apparatus not compliant with the bay-structure television set (for example, an electronic apparatus manufactured by a manufacturer different from that of the bay-structure television set). By using the bay adapter box 14, the electronic apparatus 13 can be stored in the bay 4.

The apertures of the bays 4 (the same applies to the bay 4G) can be provided with covers, similar to that provided at a tape insertion slot of a VTR. In this case, the dust can be kept out of the interior of the bays 4 having no electronic apparatus stored therein.

Figure 3:
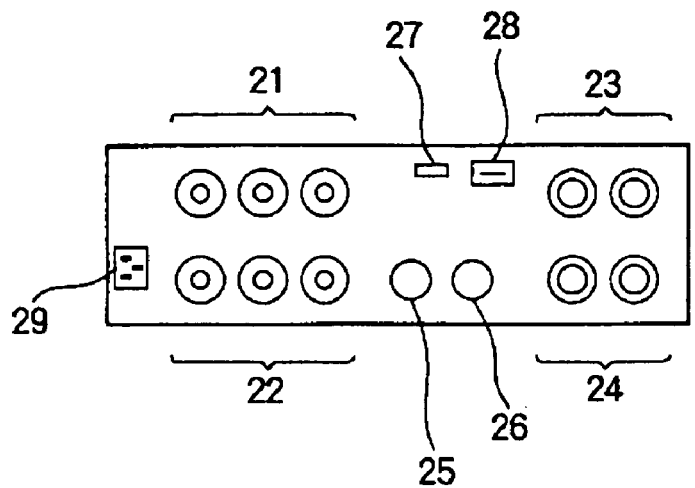
FIG. 3 is a plan view showing an example of the configuration of an in-bay connection panel 5.

FIG. 3 is a plan view showing an example of the configuration of the in-bay connection panel 5 provided on the internal front face of each of the bays 4.

The in-bay connection panel 5 has terminals for exchanging signals among electronic apparatuses, such as RGB (Red, Green, and Blue) output terminals 21, RGB input terminals 22, audio output terminals 23, audio input terminals 24, an output S (Separate (Special/Super)) terminal 25, an input S terminal 26, an IEEE (Institute of Electrical and Electronics Engineers) 1394 terminal 27, a USB (Universal Serial Bus) terminal 28, and a power terminal 29.

The RGB output terminals 21 are terminals for outputting RGB signals, which are image signals (image data) obtained by the bay-structure television set, to an electronic apparatus stored in the bay 4. The RGB input terminals 22 are terminals for inputting RGB signals output from the electronic apparatus stored in the bay 4 to the bay-structure television set. The audio output terminals 23 are terminals for outputting L and R channel audio signals obtained by the bay-structure television set to the electronic apparatus stored in the bay 4. The audio input terminals 24 are terminals for inputting L and R channel audio signals output from the electronic apparatus stored in the bay 4 to the bay-structure television set. The output S terminal 25 is a terminal for outputting a luminance signal and a color signal, which are image signals obtained by the bay-structure television set, to the electronic apparatus stored in the bay 4. The input S terminal 26 is a terminal for inputting a luminance signal and a color signal output from the electronic apparatus stored in the bay 4 to the bay-structure television set. The IEEE 1394 terminal 27 is a terminal for performing communication compliant with the IEEE 1394 standard between the bay-structure television set and the electronic apparatus stored in the bay 4. The USB terminal 28 is a terminal for performing communication compliant with the USB standard between the bay-structure television set and the electronic apparatus stored in the bay 4. The power terminal 29 is a terminal for supplying power from the bay-structure television set to the electronic apparatus stored in the bay 4.

In the embodiment of FIG. 3, the RGB output terminals 21, the RGB input terminals 22, the audio output terminals 23, the audio input terminals 24, the output S terminal 25, the input S terminal 26, the IEEE 1394 terminal 27, the USB terminal 28, and the power terminal 29 are disposed on the in-bay connection panel 5 at predetermined positions.

Figure 4:
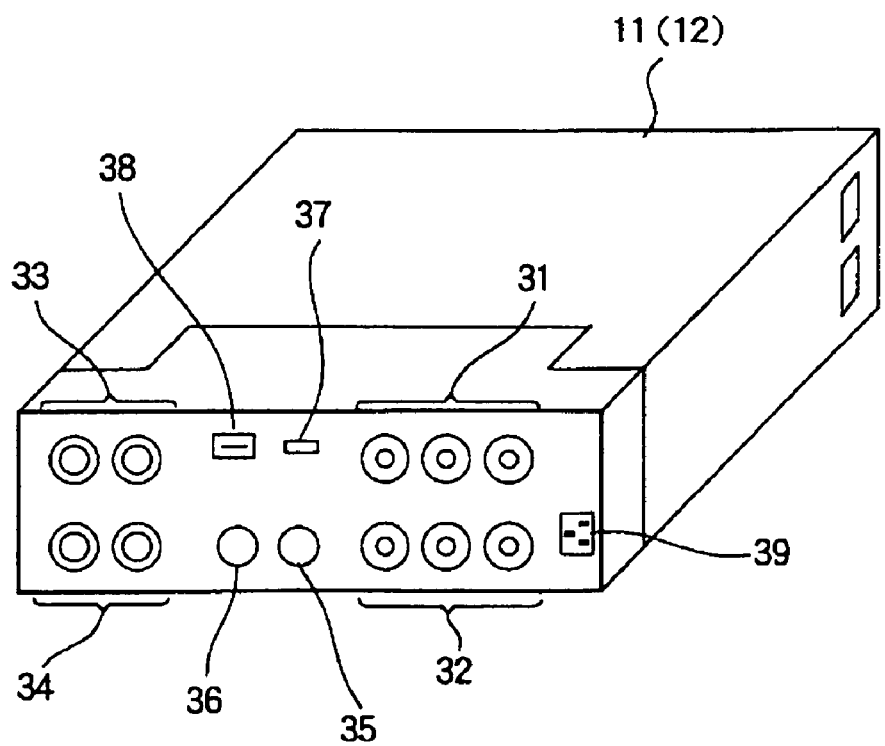
FIG. 4 is a perspective view of an electronic apparatus 11 (12) viewed from the backside.

FIG. 4 is a perspective view of an example of the configuration of the electronic apparatus 11 (12) compliant with the bay-structure television set, which is viewed from the backside.

A back panel of the electronic apparatus 11 is provided with RGB input terminals 31, RGB output terminals 32, audio input terminals 33, audio output terminals 34, an input S terminal 35, an output S terminal 36, an IEEE 1394 terminal 37, a USB terminal 38, a power terminal 39, and the like.

The bays 4 of the bay-structure television set are each formed with a size capable of storing the electronic apparatus 11. The RGB output terminals 21 to the power terminal 29 of the in-bay connection panel 5 are disposed at positions to be electrically connected with the RGB input terminals 31 to the power terminal 39 of the electronic apparatus 11 when the electronic apparatus 11 is stored in the bay 4.

Accordingly, the electronic apparatuses 11 and 12 compliant with the bay-structure television set are designed to be electrically connected with the bay-structure television set without using cables by simply storing, by a user, the electronic apparatus 11 in the bay 4.

By storing the electronic apparatuses 11 and 12 in the bays 4 of the bay-structure television set, the electronic apparatuses 11 and 12 are electrically connected with each other via the bay-structure television set. Accordingly, the electronic apparatuses 11 and 12 can be electrically connected with each other without using cables by simply storing, by the user, the electronic apparatuses 11 and 12 in the bays 4.

As described above, electronic apparatuses can be electrically connected with each other by simply storing, by the user, the electronic apparatuses in the bays 4.

When an electronic apparatus stored in the bay 4 is, for example, a playback-only electronic apparatus, such an electronic apparatus is not required to have input terminals for images and audio.

At the same time, the playback-only electronic apparatus is not the only apparatus to be stored in the bay 4. For example, an electronic apparatus capable of both recording and playing signals may be stored. Such an electronic apparatus is provided with both input terminals and output terminals for images and audio.

Preferably, the in-bay connection panel 5 (FIG. 3) provided in the interior of each of the bays 4 has, at positions corresponding to terminals of all electronic apparatuses that can be stored in the bay 4, terminals electrically connecting with the terminals of the electronic apparatuses. In this case, some of the terminals provided on the in-bay connection panel 5 may be idle depending on the electronic apparatus stored in the bay 4. However, this is not a problem.

As described above, the electronic apparatuses 11 and 12 are compliant with the bay-structure television set, and the RGB output terminals 21 to the power terminal 29 of the in-bay connection panel 5 are arranged at positions to be electrically connected with the RGB input terminals 31 to the power terminal 39, respectively, of the electronic apparatus 11 or 12 when the electronic apparatus 11 or 12 is stored in the bay 4. By simply storing the electronic apparatuses 11 and 12 in the bays 4, the electronic apparatuses 11 and 12 can be electrically connected with the bay-structure television set.

In contrast, the electronic apparatus 13 is not compliant with the bay-structure television set. When the electronic apparatus 13 is stored directly in the bay 4, the terminals of the electronic apparatus 13 may not be electrically connected with the corresponding terminals of the in-bay connection panel 5 because the terminals are arranged at different positions. More likely, many terminals of the electronic apparatus 13 are not connected with the corresponding terminals of the in-bay connection panel 5.

The electronic apparatus 13 not compliant with the bay-structure television set can be easily and electrically connected with the bay-structure television set using the bay adapter box 14.

Figure 5:
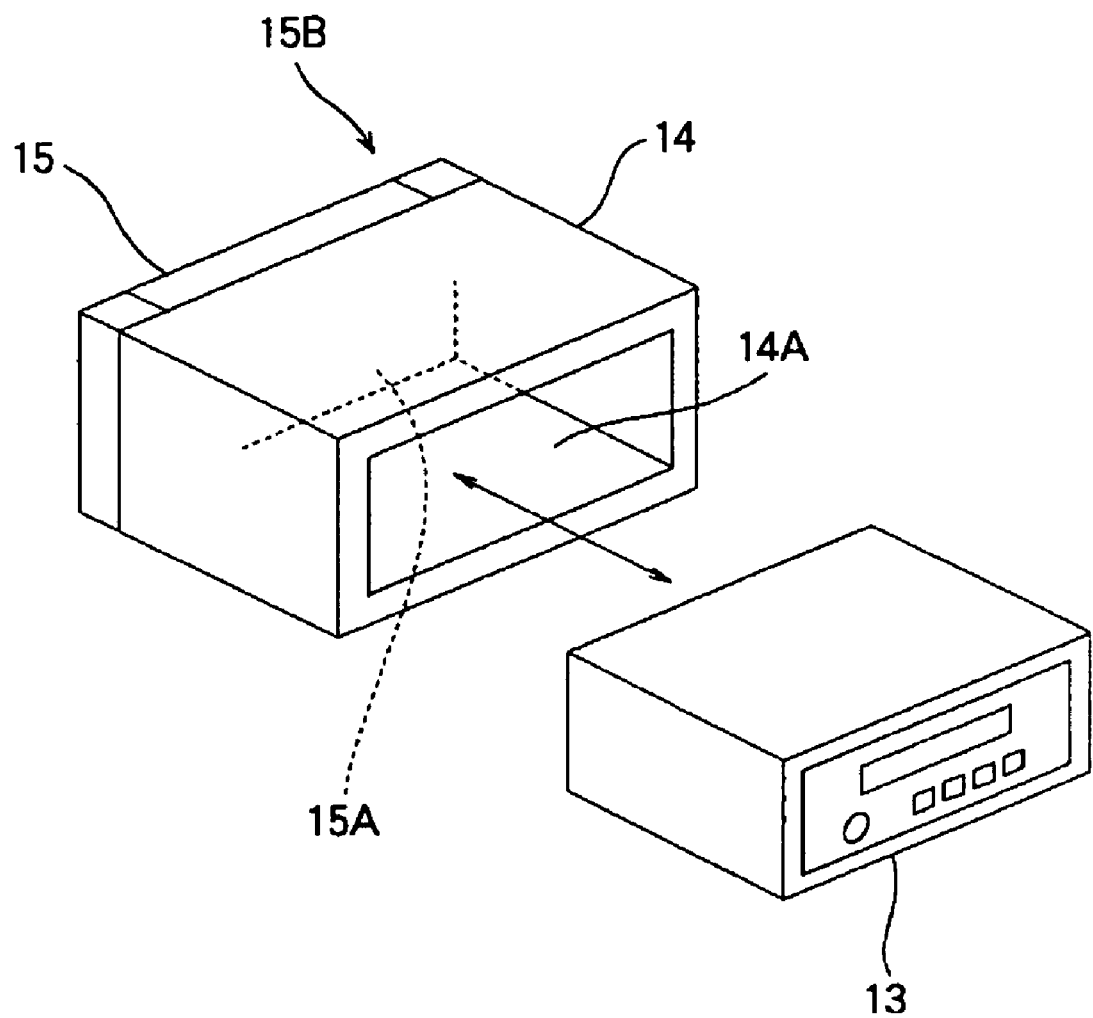
FIG. 5 is a perspective view showing an example of the configuration of a bay adapter box 14.

Specifically, FIG. 5 is a perspective view showing an example of the configuration of the bay adapter box 14.

The bay adapter box 14 is provided with a cavity-shaped slot 14A so as to store the electronic apparatus 13 from the front side thereof. The electronic apparatus 13 is stored in the bay adapter box 14, and the bay adapter box 14 containing the electronic apparatus 13 is stored in the bay 4 of the bay-structure television set. Accordingly, the electronic apparatus 13 is electrically connected with the bay-structure television set.

Specifically, the back section of the bay adapter box 14 is provided with a back panel 15. The back panel 15 includes an in-adapter connection panel 15A whose front side faces the slot 14A side and an adapter back panel 15B whose front side faces the backside of the bay adapter box 14. In other words, given that the slot 14A side of the bay adapter box 14 is the front, the in-adapter connection panel 15A is provided at the front side and the adapter back panel 15B is provided at the backside.

FIG. 6 includes plan views showing examples of the configurations of the in-adapter connection panel 15A and the adapter back panel 15B.

As in the electronic apparatus 13, the in-adapter connection panel 15A has corresponding connection terminals at positions to be connected with signal terminals provided on the back panel of an electronic apparatus not compliant with the bay-structure television set (hereinafter referred to as a non-compliant electronic apparatus) when the non-compliant electronic apparatus is stored in the bay adapter box 14.

Non-compliant electronic apparatuses have signal terminals arranged at different positions, for example, depending on the manufacturer. As shown in FIG. 6A, for each manufacturer, the in-adapter connection panel 15A has terminals connecting with signal terminals provided on the back panel of the non-compliant electronic apparatus manufactured by each manufacturer, the terminals of the in-adapter connection panel 15A being arranged at fixed positions corresponding to the signal terminals of the non-compliant electronic apparatus. FIG. 6A shows in-adapter connection panels 15 for non-compliant electronic apparatuses manufactured by manufacturers A, B, and C.

Figure 6B:
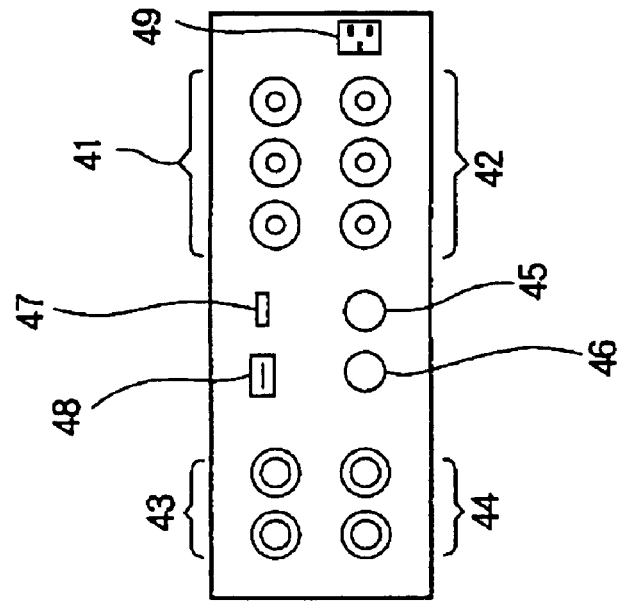
FIG. 6B is a plan view showing an example of the configuration of an adapter back panel 15B.
Figure 6A:
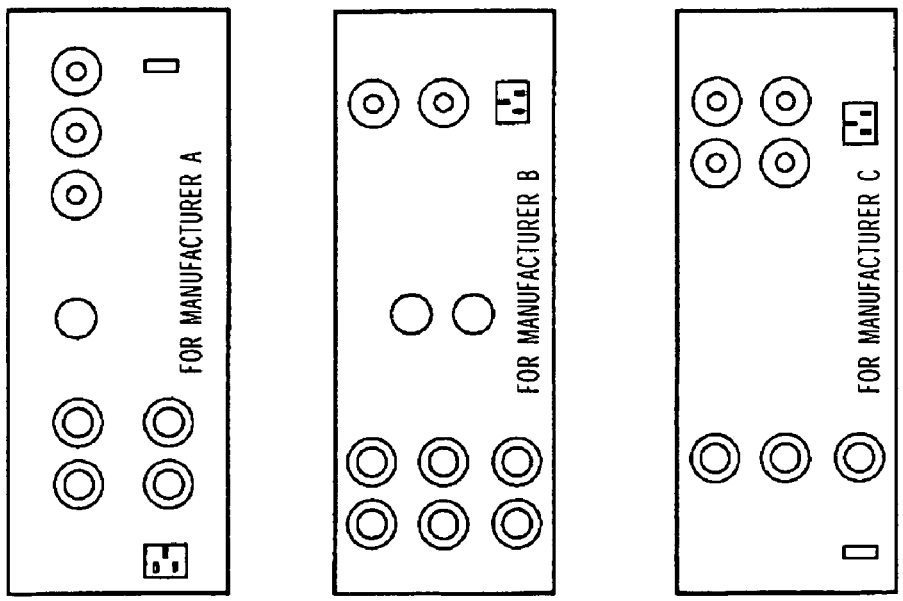
FIG. 6A is a plan view showing an example of the configuration of an adapter internal connection panel 15A.

In contrast, as shown in FIG. 6B, the adapter back panel 15B has RGB input terminals 41 to a power terminal 49 at fixed positions corresponding to the RGB output terminals 21 to the power terminal 29 provided on the in-bay connection panel 5 (FIG. 3) in the bay 4. By storing the bay adapter box 14 in the bay 4 so that the adapter back panel 15B can face the in-bay connection panel 5 in the bay 4, the RGB input terminals 41 to the power terminal 49 provided on the adapter back panel 15B are electrically connected with the RGB output terminals 21 to the power terminal 29, respectively, provided on the in-bay connection panel 5 in the bay 4.

The terminals provided on the in-adapter connection panel 15A are connected with corresponding ones of the RGB input terminals 41 to the power terminal 49 provided on the adapter back panel 15B. Even a non-compliant electronic apparatus can be electrically connected with the bay-structure television set (and, furthermore, with another electronic apparatus stored in the bay 4 via the bay-structure television set) by storing the non-compliant electronic apparatus in the bay adapter box 14 having the in-adapter connection panel 15A corresponding to the non-compliant electronic apparatus and by storing the bay adapter box 14 having the non-compliant electronic apparatus stored therein in the bay 4.

Accordingly, the user can easily establish a connection with a non-compliant electronic apparatus.

As described above, the non-compliant electronic apparatus can easily be connected with the bay-structure television set via the bay adapter box 14. In this case, the user must prepare the overall bay adapter box 14 having the in-adapter connection panel 1SA corresponding to the non-compliant electronic apparatus.

Figure 7:
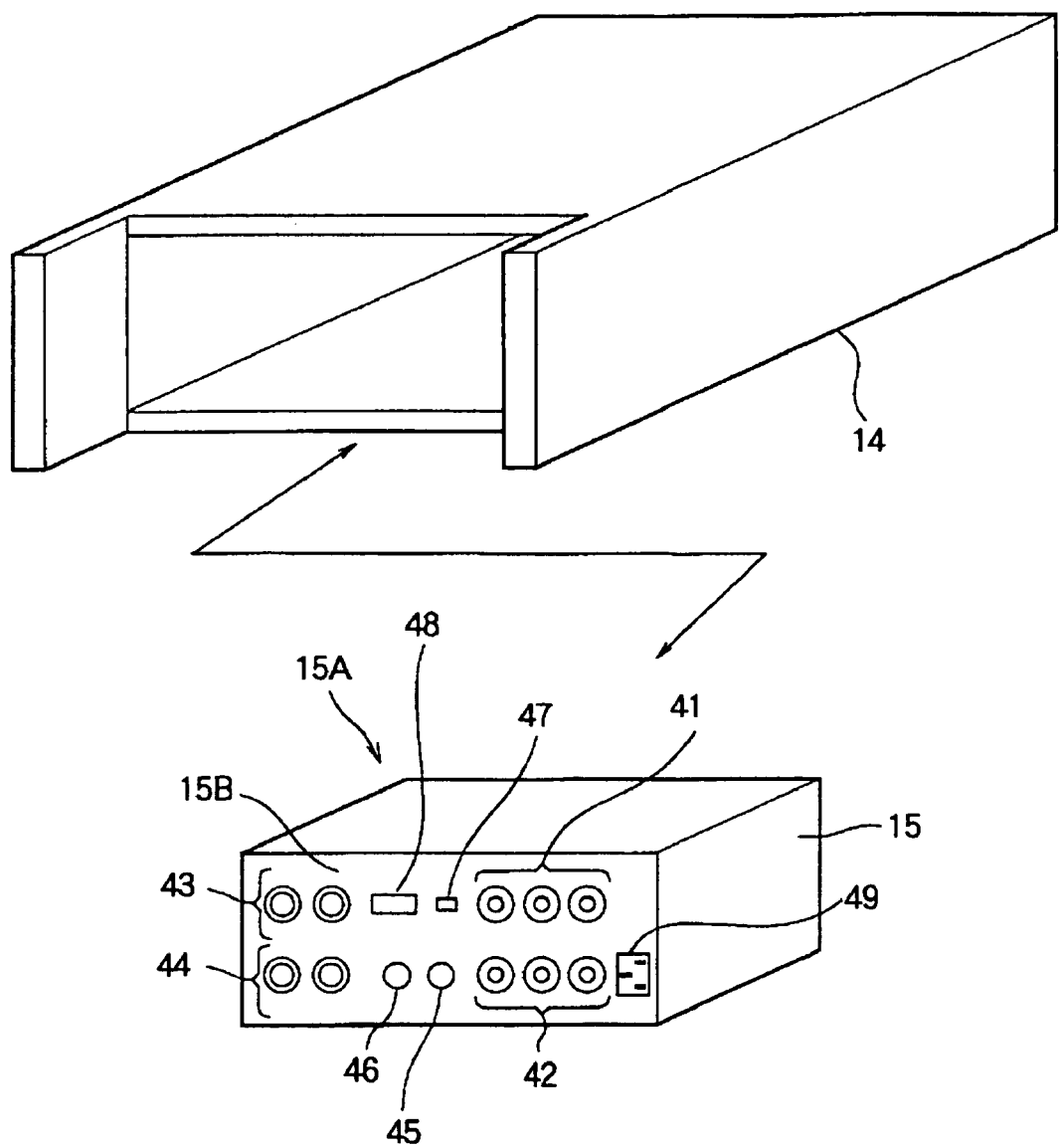
FIG. 7 is a perspective view showing the bay adapter box 14 having a removable back panel 15.

For example, as shown in FIG. 7, the bay adapter box 14 can be formed using the removable back panel 15, which can be removed from the remaining section. In this case, the user is not required to prepare the overall bay adapter box 14 for each manufacturer of non-compliant electronic apparatuses. It is only necessary to exchange the back panel 15. In this case, the non-compliant electronic apparatus may be stored in the bay 4 while the terminals provided on the in-adapter connection panel 15A of the back panel 15 are engaged (connected) with the terminals on the backside of the non-compliant electronic apparatus. In other words, the non-compliant electronic apparatus may be connected with the bay-structure television set by storing, in the bay 4, the overall bay adapter box 14 having the non-compliant electronic apparatus stored therein. Alternatively, the non-compliant electronic apparatus may be connected with the bay-structure television set by storing, in the bay 4, along with the non-compliant electronic apparatus, the back panel 15 having the in-adapter connection panel 15A connected with the non-compliant electronic apparatus.

The back panel 15 may be formed by integrating the in-adapter connection panel 15A and the adapter back panel 15B. Alternatively, the in-adapter connection panel 15A and the adapter back panel 15B can be removable.

For example, as shown in FIG. 8, the back panel 1S may be formed so that only the adapter back panel 15B is removable from the bay adapter box 14.

In the embodiment of FIG. 8, the removable adapter back panel 15B is provided with a male pin group 16B including a plurality of male pins, and the bay adapter box 14 is provided with a female pin group 16A including a plurality of female pins. When the bay adapter back panel 15B is attached to the bay adapter box 14, each male pin forming the male pin group 16B of the adapter back panel 15B is engaged with the corresponding female pin forming the female pin group 16A of the bay adapter box 14, thus electrically connecting the bay adapter back panel 15B and the in-adapter connection panel 15A of the bay adapter box 14 with each other. In other words, the RGB input terminals 41 to the power terminal 49 provided on the adapter back panel 15B are electrically connected with predetermined male pins forming the male pin group 16B, and the terminals provided on the in-adapter connection panel 15A are electrically connected with predetermined female pins forming the female pin group 16A. Engaging each male pin forming the male pin group 16B of the adapter back panel 15B with the corresponding female pin forming the female pin group 16A of the bay adapter box 14 allows the RGB input terminals 41 to the power terminal 49 provided on the adapter back panel 15B to be electrically connected with the corresponding terminals provided on the in-adapter confection panel 15A via the female pin group 16A and the male pin group 16B.

As described above, in a case in which the in-adapter connection panel 15A has connection terminals connecting with signal terminals of a non-compliant electronic apparatus manufactured by each manufacturer at fixed positions corresponding to the positions of the signal terminals, for example, as shown in FIG. 7, even when the back panel 15 is removable, it is still necessary to have the back panel 15 with the in-adapter connection panel 15A having the connection terminals at the fixed positions corresponding to the positions of the signal terminals of the non-compliant electronic apparatus manufactured by each manufacturer.

Figure 9:
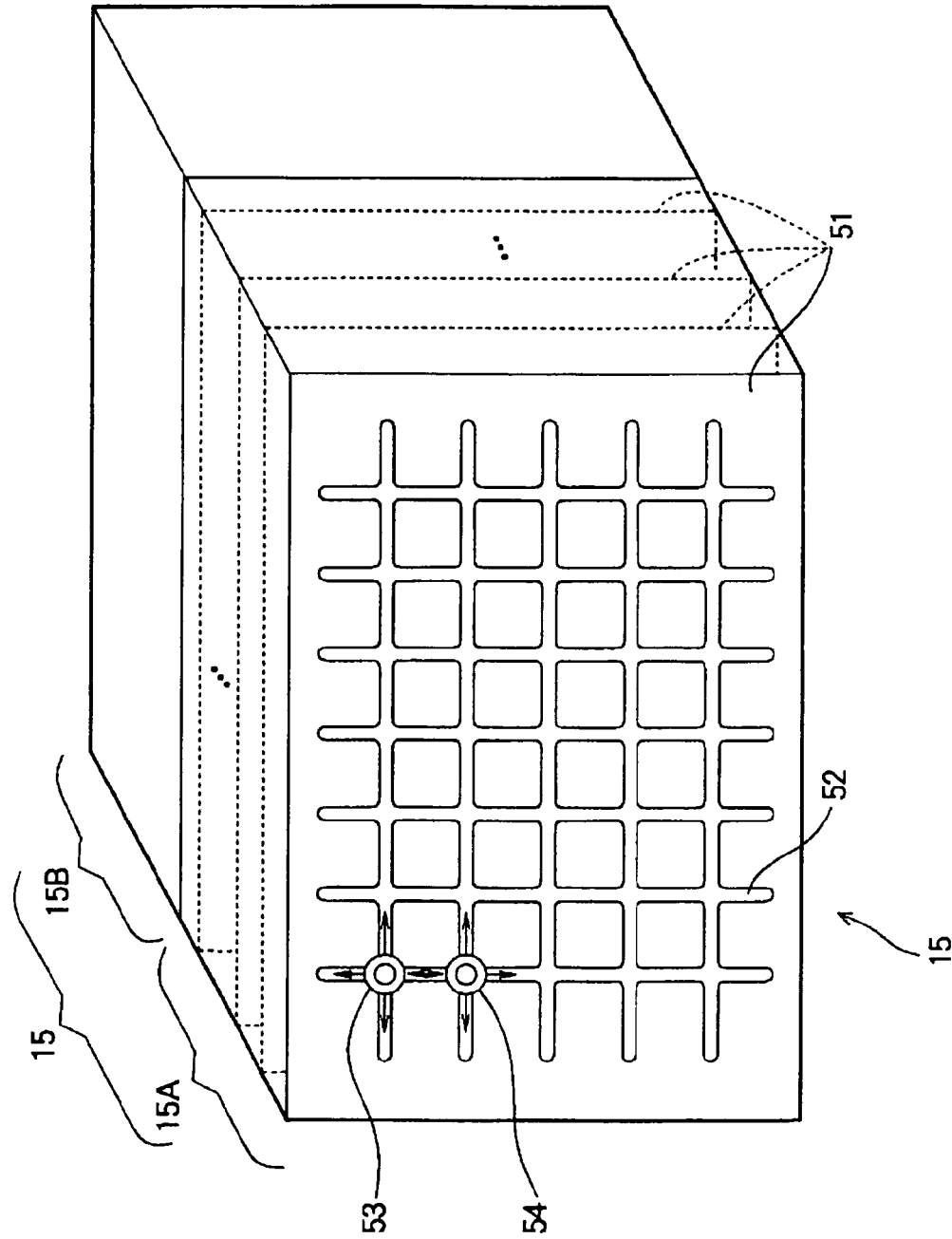
FIG. 9 is a perspective view showing an example of the configuration of the back panel 15 having movable terminals.

FIG. 9 is a perspective view showing an example of the configuration of the back panel 15 conforming to non-compliant electronic apparatuses manufactured by a plurality of (or all) manufacturers.

Specifically, in the embodiment of FIG. 9, terminals 53 and 54 which are provided on the in-adapter connection panel 15A and which connect to signal terminals of a non-compliant electronic apparatus are movable. In other words, the terminals 53 and 54 can be moved to positions connecting to the signal terminals of the non-compliant electronic apparatus.

In the embodiment of FIG. 9, only the two terminals 53 and 54 are shown on the in-adapter connection panel 15A in order to simplify the drawing.

In the embodiment of FIG. 9, the in-adapter connection panel 15A is made of a plurality of slit plates 51.

Specifically, the slit plates 51 are formed by, for example, conductive flat plates (thin films). Each of the slit plates 51 has slits (holes) 52 arranged in a grid. The terminal 53 (54) can be moved along the slits 52 in the directions indicated by the arrows of FIG. 9.

Figure 10:
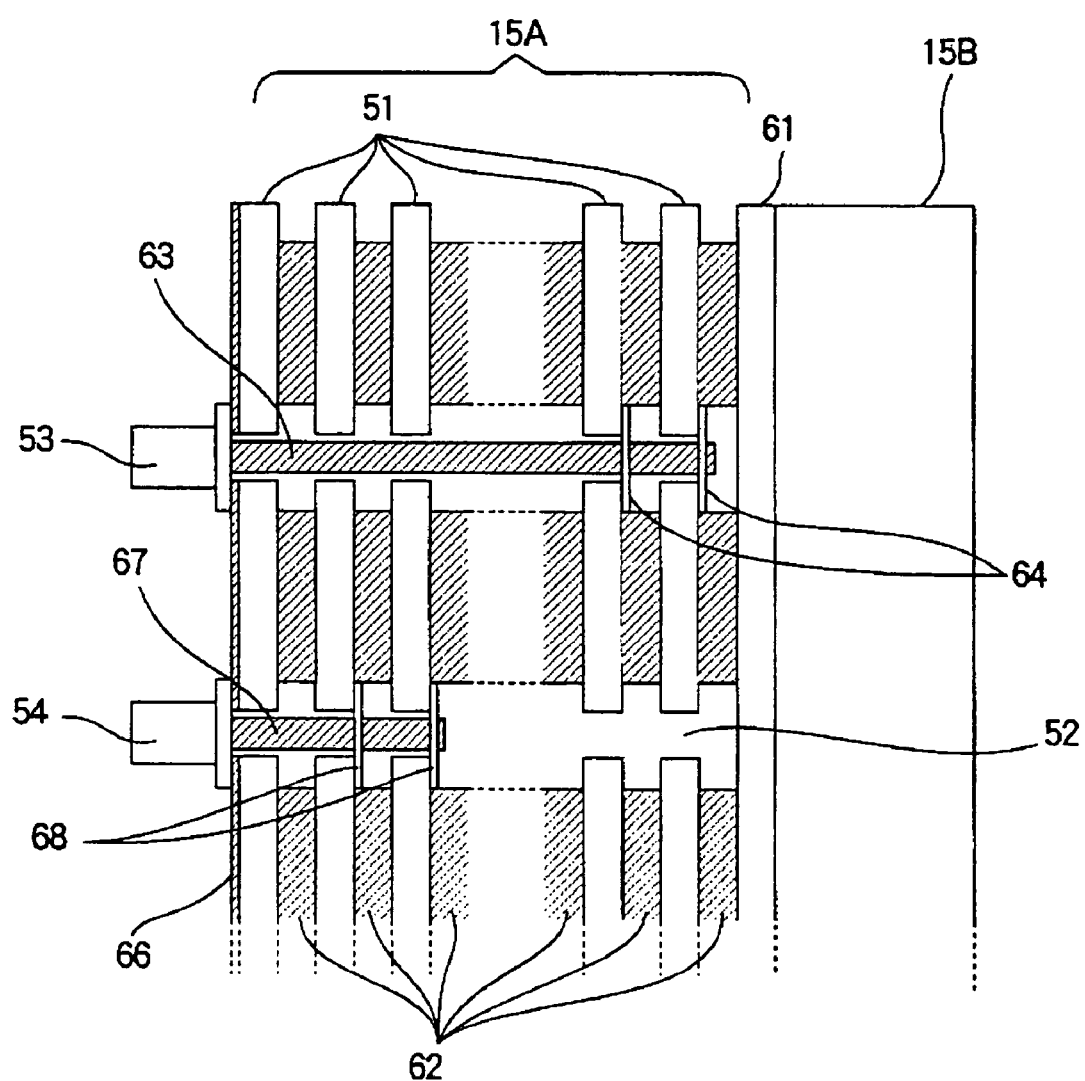
FIG. 10 is a sectional view showing the back panel 15 having the movable terminals.

FIG. 10 is a sectional view of a side face of the in-adapter connection panel 15A shown in FIG. 9.

Each of the slit plates 51 is attached between insulators 62. The insulator 62 nearest to the adapter back panel 15B is fixed to a bottom plate 61. The insulators 62 are arranged at intervals larger than those between the slits 52 provided on the slit plates 51.

An insulating film 66 is provided on the surface of the slit plate 51 nearest to the terminal 53 (54). The insulating film 66 prevents the terminal 53 or 54 from being electrically connected with one of the plurality of slits 51 nearest to the terminal 53.

The terminal 53 (the same applies to the terminal 54) is provided with a stick-shaped body 63 (67) having a diameter slightly less than the width of each slit 52. The body 63 slides along the slits 51 to move the terminal 53 to an arbitrary position over the slits 51.

Contact fittings 64 (68) made of conductors are fixed to one end of the body 63, to which the terminal 53 is not attached. The contact fittings 64 are brought into contact with predetermined ones of the plurality of slit plates 51. In the embodiment of FIG. 10, the contact fittings 64 attached to the body 63 of the terminal 53 are in contact with two slit plates 51 nearest to the bottom plate 61.

The plurality of slit plates 51 is connected with predetermined ones of the RGB input terminals 41 to the power terminal 49 provided on the adapter back panel 15B. Thus, the terminal 53 is electrically connected with a predetermined one of the RGB input terminals 41 to the power terminal 49 provided on the adapter back panel 15B via the interior of the body 63, the contact fittings 64, and the slit plates 51.

The body 67 of the terminal 54 is shorter than the body 63 of the terminal 53. This allows the contact fittings 68 fixed to the body 67 of the terminal 54 to be in contact with the slit plates 51 nearer to the terminal 53 (54) than the slit plates 51 touching the contact fittings 64 fixed to the body 63 of the terminal 53. Thus, the terminal 53 is electrically connected with the corresponding terminal on the adapter back panel 15B, and the terminal 54 is electrically connected with the corresponding terminal on the adapter back panel 15B.

The body 63 of the terminal 53 (the same applies to the body 67 of the terminal 54) has an insulating film on the surface thereof. This prevents the terminal 53 from being electrically connected with the slit plates 51 other than the slit plates 51 touching the contact fittings 64.

Figure 11:
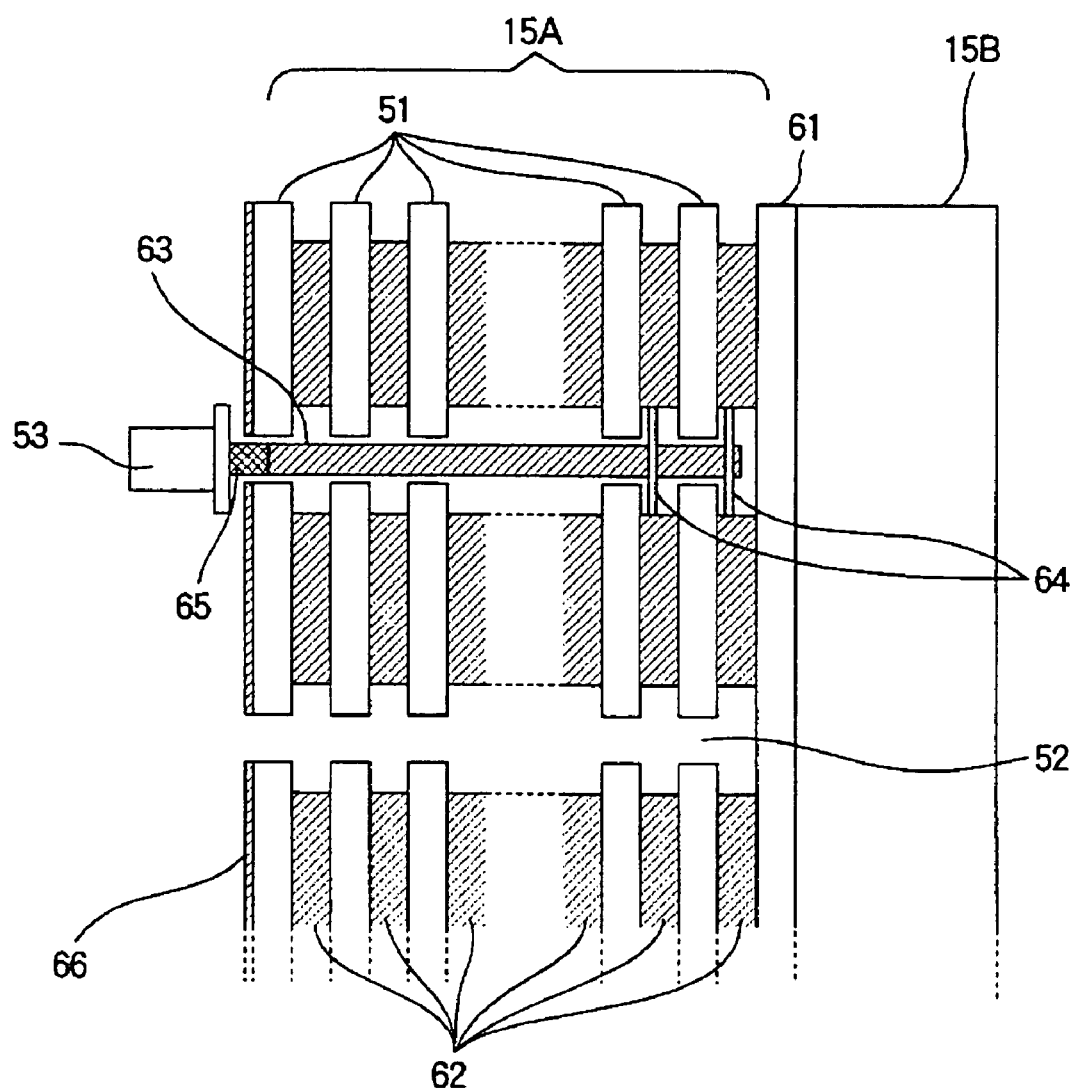
FIG. 11 is a sectional view showing the back panel 15 having the movable terminals.

One end of the body 63 at the terminal 53 side is provided with, as shown in FIG. 11, a threaded screw 65. The interior of the terminal 53 is also threaded. The terminal 53 is screwed into the screw 65 of the body 63.

By rotating the terminal 53 in a counterclockwise direction, when viewed from the terminal 53 side, the screw is loosened, and, as shown in FIG. 11, the terminal 53 is separated from the insulating film 66 and the contact fittings 64 of the body 63 are separated from the slit plates 51. Accordingly, the terminal 53, along with the body 63, becomes movable along the slits 52.

In the embodiment of FIG. 11, the terminal 54, the body 67, and the contact fittings 68 are omitted in the drawing. As in the terminal 53, the terminal 54 is movable along the slits 52.

By rotating the terminal 53 in a clockwise direction, when viewed from the terminal 53 side, the screw is tightened, and, as shown in FIG. 10, the end of the terminal 53 at the insulating film 66 side is pressed against the insulating film 66. Furthermore, the contact fittings 64 of the body 63 are pressed against the slit plates 5.1, which are supposed to be touching the contact fittings 64, with a predetermined pressure. Accordingly, the terminal 53 is fixed at a predetermined position along the slits 52 and electrically connected with the slit plates 51 via the body 64 and the contact fittings 64.

Figure 12:
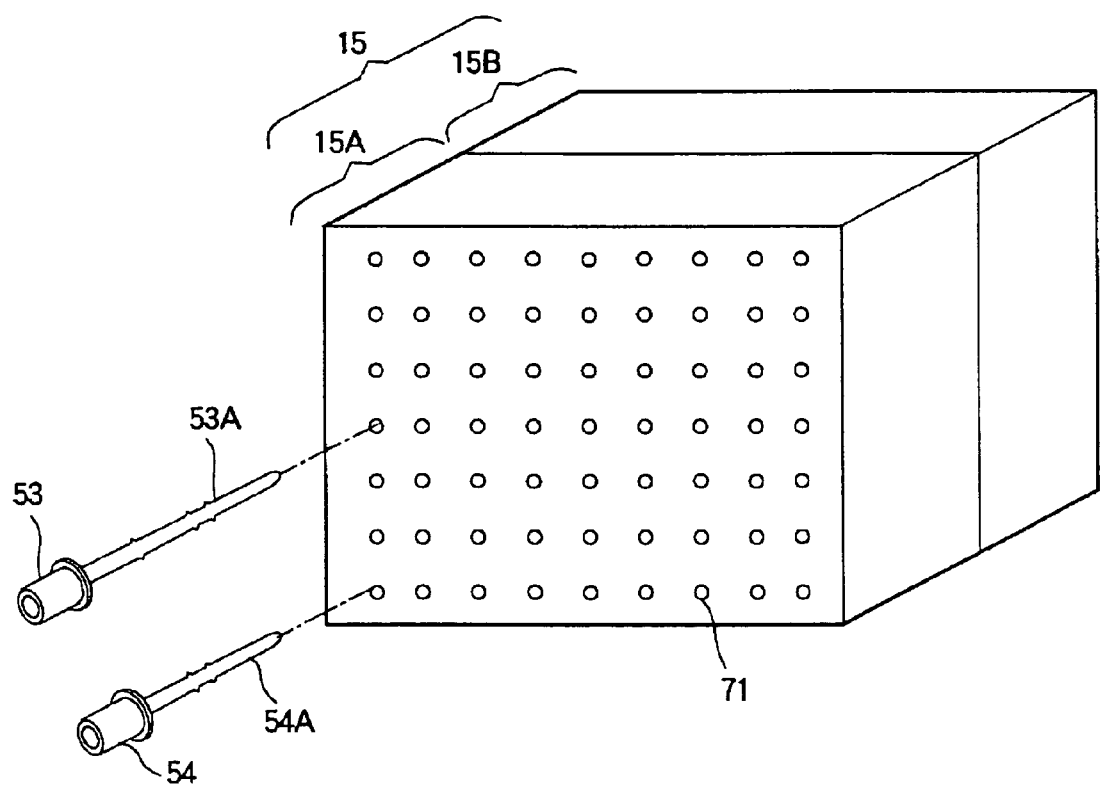
FIG. 12 is a perspective view showing another example of the configuration of the back panel 15 having the movable terminals.

FIG. 12 is a perspective view showing another example of the configuration of the back panel 15 having the movable terminals 53 and 54 connecting with the signal terminals of the non-compliant electronic apparatus.

In the embodiment of FIG. 12, many insertion slots (holes) 71 are provided. The terminals 53 and 54 can be moved to arbitrary positions of the positions of the many insertion slots 71.

Specifically, the terminal 53 has, for example, a body 53A in the shape of a pin jack insertable into the insertion slot 71. By inserting the body 53A into the insertion slot 71, the terminal 53 is fixed at the position of the insertion slot 71.

The body 53A of the terminal 53 and a body 54A of the terminal 54 differ in length. Accordingly, when the body 53A of the terminal 53 is inserted into the insertion slot 71 and the body 54A of the terminal 54 is inserted into the insertion slot 71, the terminals 53 and 54 are electrically connected with different terminals on the adapter back panel 15B.

FIG. 13 includes perspective views showing yet another example of the configuration of the back panel 15 having movable terminals on the in-adapter connection panel 15A. In the illustrations, portions corresponding to those in FIG. 8 are given the same reference numerals.

In the embodiment of FIG. 13, the adapter back panel 15B of the back panel 15 is removable, as described in the embodiment of FIG. 8.

In the embodiment of FIG. 13, the in-adapter connection panel 15A is made of a plurality of connection plates 81. U-shaped insertion slits 82L and 82R are provided on the left and right sides of the bay adapter box 14. The connection plates 81 can be fixed in place by being inserted into the insertion slits 82L and 82R. The connection plates 81 can be easily removed by sliding along the insertion slits 82L and 82R.

Figure 14B:
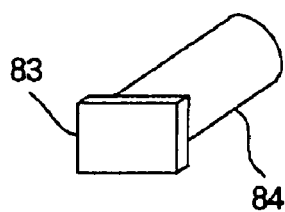
FIG. 14B is a perspective view showing an example of the configuration of a patch plate 83.
Figure 14C:
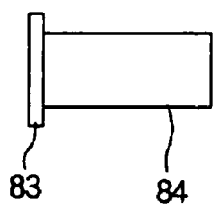
FIG. 14C is a side view showing an example of the configuration of the patch plate 83.
Figure 14D:
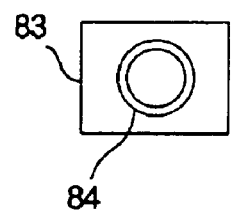
FIG. 14D is a plan view showing an example of the configuration of the patch plate 83.
Figure 14A:
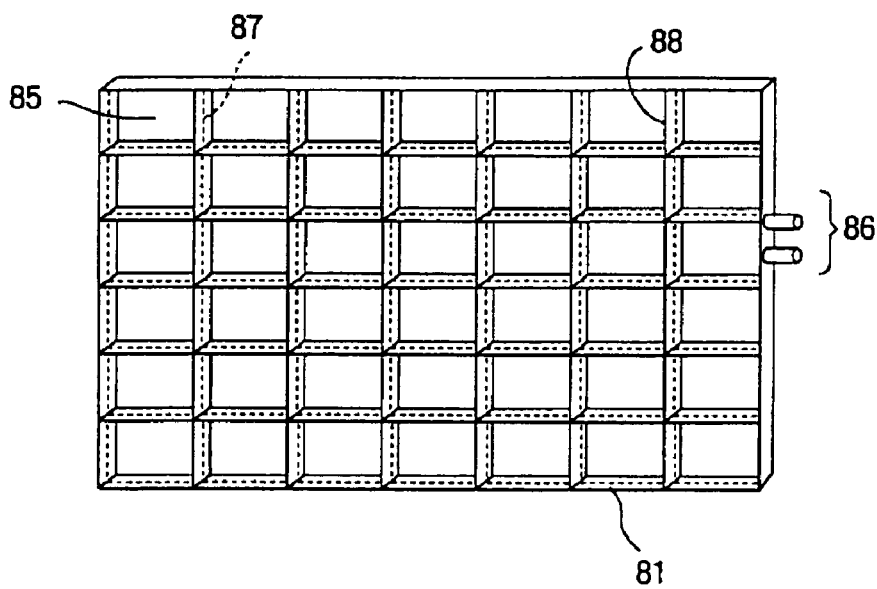
FIG. 14A is a perspective view showing an example of the configuration of a connection plate 81.

For example, as shown in FIG. 14A, the connection plates 81 each have a frame 88 in the shape of a grid. The inner surface of the frame 88 has a frame groove 87 serving as a groove into which a patch plate 83, which will be described below, can be inserted. Frame holes 85 (spaces) defined by the frame 88 have substantially the same size as that of the flat patch plate 83, which is shown in a perspective view of FIG. 14B, a side view of FIG. 14C, and a plan view of FIG. 14D. By fitting the outer surface of the patch plate 83 into the frame groove 87 in the inner surface of the frame 88, the patch plate 83 is fixed to the frame hole 85.

As shown in FIGS. 14B to 14D, the patch plate 83 has a terminal 84. By inserting the patch plate 83 into a different frame hole 85, the position of the terminal 84 provided on the patch plate 83 can be moved.

Figure 14E:
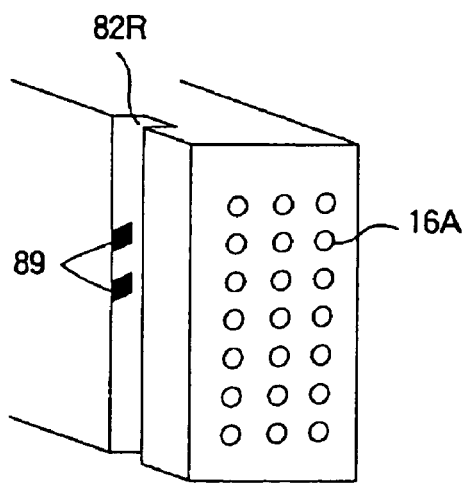
FIG. 14E is a perspective view showing an example of the configuration of current-carrying sections 89.

By inserting the patch plate 83 into the frame 88, the terminal 84 is electrically connected with the frame 88. Each connection plate 81 has connection terminals 86 on the outer surface fitting into the insertion slit 82R (FIG. 13). The frame 88 is electrically connected with the connection terminals 86. As shown in FIG. 14E, each insertion slit 82R has current-carrying sections 89. By inserting the connection plate 81 into the insertion slit 82R, the connection terminals 86 are electrically connected with the current-carrying sections 89. The current-carrying sections 89 connect with predetermined terminals on the adapter back panel 15B via the female pin group 16A and the male pin group 16B. Thus, the terminal 84 of the patch plate 83 fitted into the frame 88 is electrically connected with a predetermined terminal on the adapter back panel 15B via the patch plate 83, the frame 88, the connection terminals 86, the current-carrying sections 89, the female pin group 16A, and the male pin group 16B.

The plurality of connection plates 81 has the connection terminals 86 at different positions. The current-carrying sections 89 of the insertion slit 82R are provided at positions corresponding to the connection terminals 86 of the connection plate 81 fitted into the insertion slit 82R. Only when the connection plate 81 is inserted into the correct insertion slit 82R, the connection terminals 86 of the connection plate 81 are connected with the current-carrying sections 89 provided on the insertion slit 82R. Accordingly, when the connection plate 81 is inserted into a wrong insertion slit 82R, the terminal 84 fitted into the connection plate 81 is prevented from being electrically connected with a terminal on the adapter back panel 15B (terminal that is not supposed to be connected with the terminal 84), which is connected with the current-carrying sections 89 via the female pin group 16A and the male pin group 16B.

Alternatively, for example, the connection plate 81 and the insertion slits 82L and 82R are formed to allow the connection plate 81 to be inserted only into the correct insertion slits 82L and 82R into which the connection plate 81 is insertable. Accordingly, the terminal 84 fitted into the connection plate 81 can be prevented from being electrically connected with the terminal on the adapter back panel 15B, which is not supposed to be connected with the terminal 84.

By inserting the patch plate 83 into the frame hole 85, the terminal 84 fixed at a predetermined position on the connection plate 81 is exposed towards the aperture of the slot 14A of the bay adapter box 14 directly or through the frame hole 85 of the connection plate 81 arranged in the front part thereof (towards the opening side of the slot 14A (FIG. 5) of the bay adapter box 14 shown in FIG. 13). Accordingly, the terminal 84 is connected with a terminal of a non-compliant electrical apparatus stored in the slot 14A of the bay adapter box 14.

As described above, when the terminals which are provided on the in-adapter connection panel 15A and which connect to the signal terminals of the non-compliant electrical apparatus are movable, it is unnecessary to prepare the bay adapter box 14 and the back panel 15 for each manufacturer of non-compliant electrical apparatuses. The cost burden on the user can thus be lessened.

As described above, when the terminals of the in-adapter connection panel 15A are movable, it may be unclear where to move the terminals. Preferably, for example, the positions of the terminals are described on the in-adapter connection panel 15A according to each manufacturer of non-compliant electronic apparatuses.

In the above description, the terminals provided on the in-adapter connection panel 15A are movable to conform to each manufacturer's non-compliant electronic apparatus. Alternatively, for example, the RGB output terminals 21 to the power terminal 29 provided on the in-bay connection panel 5 (FIG. 3) in the bay 4 are movable. In this case, the non-compliant electronic apparatus and the bay-structure television set can be electrically connected with each other without the use of bay adapter box 14 (or the back panel 15).

FIG. 15 is a block diagram showing an example of the electrical configuration of the bay-structure television set shown in FIG. 1.

A remote commander (hereinafter referred to as a remote control) 101 is operated by the user when selecting a desired television broadcasting channel, adjusting the volume, or switching signal input/output between electronic apparatuses by a selector 104, which will be described below. The remote control 101 transmits a signal corresponding to the operation to a main controller 102 using infrared rays. In FIGS. 1 and 2, the remote control 101 is omitted.

In accordance with the infrared ray signal from the remote control 101 or the like, the main controller 102 controls a selector controller 103, and, if necessary, controls each block forming the bay-structure television set.

Under the control of the main controller 102 or the like, the selector controller 103 controls the selector 104.

The selector 104 is connected with the CRT 2, the speakers 3, a tuner 105, and a TV signal processor 106. The selector 104 is also connected with the terminals of the in-bay connection panels 5 in the bays 4A to 4G. Under the control of the selector controller 103, the selector 104 changes the output destination of an input signal input thereto.

A television broadcasting signal (hereinafter referred to as a TV signal) received by an antenna, which is not shown, is supplied to the tuner 105. Under the control of the main controller 102, the tuner 105 detects and demodulates a TV signal on a predetermined channel and outputs a baseband signal to the selector 104.

The TV signal processor 106 processes an image signal (e.g., a baseband image signal output from the tuner 105) output from the selector 104 and outputs the resulting image signal to the selector 104.

The CRT 2 displays an image signal output from the selector 104, and the speakers 3 output an audio signal output from the selector 104.

Of the above-described components, the CRT 2, the speakers 3, the tuner 105, and the TV signal processor 106 function as the television set, which is an electronic apparatus.

Figure 16:
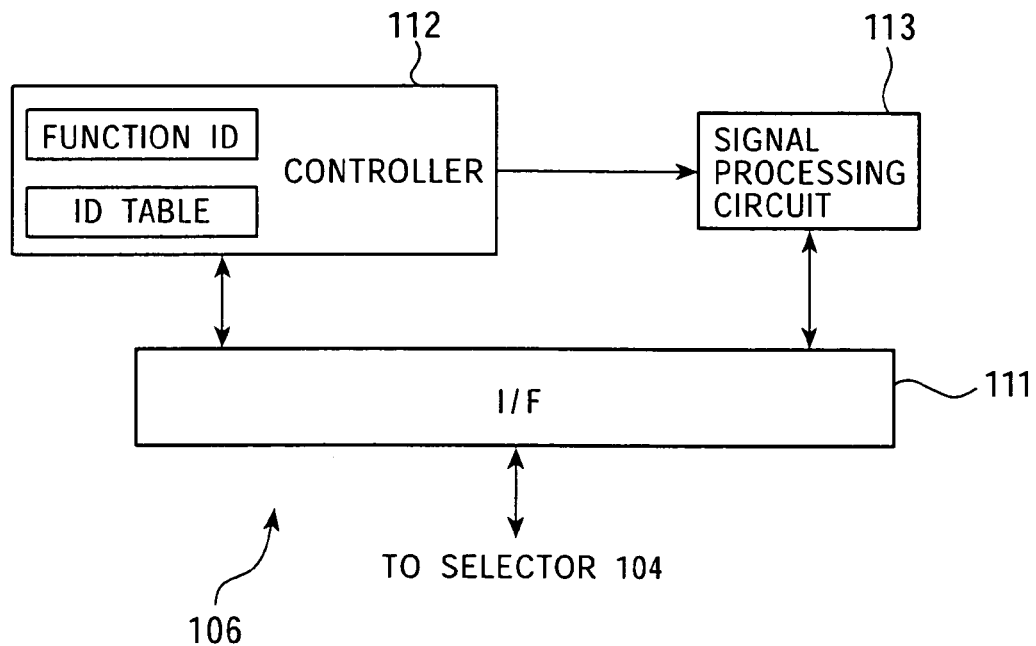
FIG. 16 is a block diagram showing an example of the configuration of a TV signal processor 106.

FIG. 16 shows an example of the configuration of the TV signal processor 106 shown in FIG. 15.

The TV signal processor 106 includes an I/F (Interface) 111, a controller 112, and a signal processing circuit 113.

The I/F 111 controls exchange of signals among the selector 104, the controller 112, and the signal processing circuit 113.

The controller 112 determines whether or not an electronic apparatus is stored in the bay 4 and electrically connected with the selector 104 via the I/F 111 and the selector 104. On the basis of the determination result, the controller 112 controls the signal processing circuit 113. There are various possible methods for determining the connection. For example, a method determining whether or not there is a signal from the electronic apparatus stored in the bay 4 can be adopted.

The controller 112 stores function IDs and an ID table. The function ID is a unique ID (Identification) for identifying each function of the signal processing circuit 113. The ID table includes processing information, which will be described below, corresponding to each function ID.

Basically, for example, the signal processing circuit 113 has a function for converting a composite image signal into a component image signal and a function for converting a component standard definition image signal (hereinafter referred to as an SD (Standard Definition) image signal) into a high definition image signal (hereinafter referred to as an HD (High Definition) image signal). Under the control of the controller 112, the signal processing circuit 113 can change the function thereof.

Figure 17:
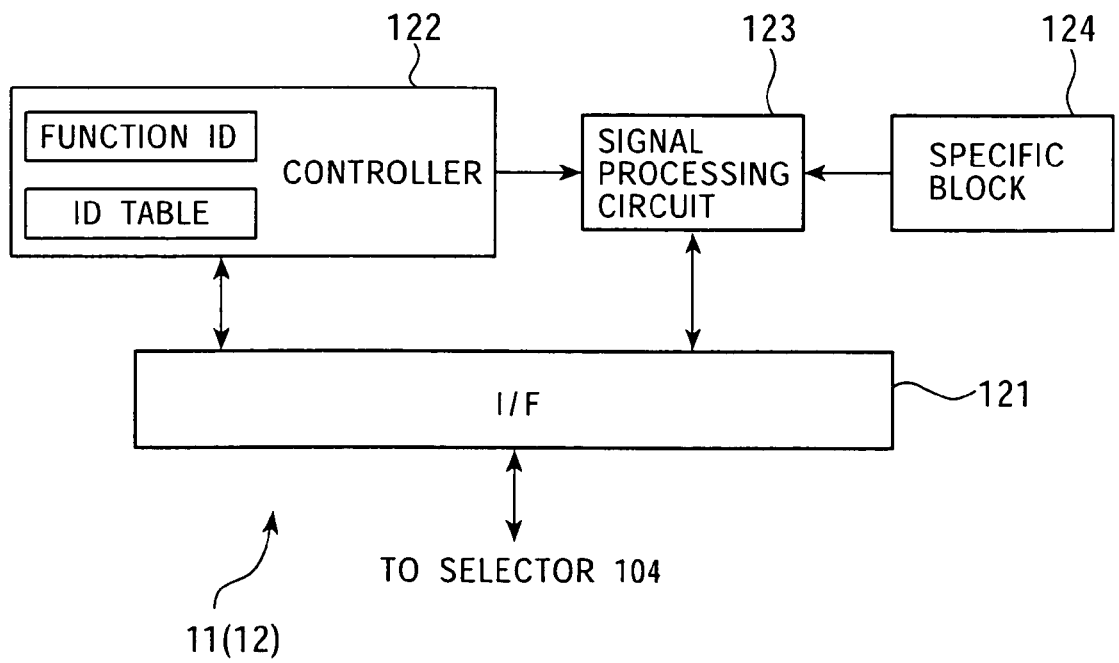
FIG. 17 is a block diagram showing an example of the configuration of the electronic apparatus 11 (12).

FIG. 17 shows an example of the electrical configuration of the electronic apparatus 11 stored in the bay 4. As described above, the electronic apparatus 11 is an electronic apparatus compliant with the bay-structure television set (hereinafter referred to as a compliant electronic apparatus). The compliant electronic apparatus is not limited to the electronic apparatus 11 and is arranged as shown in FIG. 17.

The electronic apparatus 11 includes an I/F 121, a controller 122, a signal processing circuit 123, and a specific block 124.

The I/F 121, the controller 122, and the signal processing circuit 123 are formed as in the I/F 111, the controller 112, and the signal processing circuit 113, respectively, which are shown in FIG. 16.

The specific block 124 is a block specific to the electronic apparatus 11. For example, when the electronic apparatus 11 is a DVD player, the specific block 124 includes, for example, an optical pickup for irradiating a DVD, which is not shown, with a laser beam, receiving light reflected from the DVD, and performing photoelectric conversion. When the electronic apparatus 11 is a digital VTR, the specific block 124 includes, for example, a drive mechanism for driving a video tape and a magnetic head for reading/writing signals from/to the video tape.

When the electronic apparatus 11 is a DVD player, signals recorded in DVDs are MPEG (Moving Picture Expert Group) encoded; basically, the signal processing circuit 123 has a function for MPEG-decoding MPEG-encoded signals. In the present embodiment, the signal processing circuit 123 also has, for example, a function for performing space resolution improvement processing.

Referring to a flowchart in FIG. 18, the operation of the TV signal processor 106 shown in FIG. 16 will now be described.

In step S1, the controller 112 checks whether or not an electronic apparatus is electrically connected via the I/F 111 and the selector 104 and proceeds to step S2. In step S2, the controller 112 determines whether or not an electronic apparatus is electrically connected on the basis of the check result in step S1.

When it is determined in step S2 that no electronic apparatus is electrically connected with the TV signal processor 106, that is, when no electrical apparatus is stored in the bay 4, or, if an electronic apparatus is stored in the bay 4, when the electronic apparatus is not selected by the selector 104 to be electrically connected with the TV signal processor 106, in step S3, the controller 112 outputs a command to the signal processing circuit 113 to perform processing in accordance with a normal function. As a result, in step S3, the signal processing circuit 113 performs normal signal processing, and subsequently, the processing is terminated.

Specifically, when the TV signal processor 106 is connected with no other electronic apparatus, the tuner 105 (FIG. 15) extracts a baseband signal on a predetermined channel from a TV signal and supplies the baseband signal to the TV signal processor 106 via the selector 104. In the TV signal processor 106, the I/F 111 receives the baseband image signal supplied via the selector 104 and supplies the baseband image signal to the signal processing circuit 113. Since the signal processing circuit 113 has a function for simultaneously performing, with respect to the image signal from the I/F 111, composite/component conversion processing for converting a composite signal into a component signal and space resolution improvement processing for improving the space resolution by converting an SD image signal into an HD image signal, the signal processing circuit 113 performs processing in accordance with the function. The signal processing circuit 113 supplies the resulting component HD image signal to the CRT 2 via the I/F 111 and the selector 104. Accordingly, the CRT 2 displays an HD image, which is a high resolution image.

In contrast, when it is determined in step S2 that there is an electronic apparatus electrically connected with the TV signal processor 106, that is, when an electronic apparatus is stored in the bay 4, and, if necessary, the electronic apparatus is selected by the selector 104 to be electrically connected with the TV signal processor 106, in step S4, the controller 112 transmits a function ID request to the electronic apparatus electrically connected with the TV signal processor 106 (hereinafter referred to as the connected apparatus) via the I/F 111 and the selector 104 and proceeds to step S5.

In step S5, in response to the function ID request in step S4, the controller 112 determines whether or not the function ID is transmitted from the connected apparatus. If it is determined in step S5 that no function ID is transmitted from the connected apparatus, in step S3, processing basically similar to the above is performed.

Specifically, the fact that no function ID is transmitted from the connected apparatus means that the connected apparatus is not a compliant electronic apparatus such as the electronic apparatus 11 shown in FIG. 17. When the connected apparatus is not a compliant electronic apparatus, that is, when the connected apparatus is a non-compliant electronic apparatus, the signal processing circuit 113 of the TV signal processor 106 performs processing of the image signal supplied from the non-compliant electronic apparatus via the selector 104 and the I/F 111 in a manner similar to the above case.

In contrast, when it is determined in step S5 that the function ID is transmitted from the connected apparatus, in step S6, the controller 112 receives the function ID from the connected apparatus, recognizes cooperative processing by referring to the ID table on the basis of the function ID, and sets a signal path.

Specifically, in the ID table, each function ID of the electronic apparatus is associated with processing information indicating the contents of processing to be performed by the signal processing circuit 113 when the TV signal processor 106 is connected with the electronic apparatus having the function ID. The controller 112 recognizes the processing information corresponding to the function ID received from the connected apparatus. The controller 112 recognizes the processing indicated by the processing information as cooperative processing to be performed by the signal processing circuit 113.

When electrically connected with a compliant electronic apparatus, the TV signal processor 106 cooperates with the compliant electronic apparatus as if they were a single apparatus and performs optimal processing of an input signal. In other words, the signal processing advantages and function of each apparatus change depending on the apparatus connected therewith. Due to the changes in signal processing advantages and function, the entire system including each apparatus performs optimal processing of an input signal. In this case, the TV signal processor 106 and the compliant electronic apparatus cooperate in processing the input signal. In the ID table stored in the controller 112 of the TV signal processor 106, the function ID of the compliant electronic apparatus is associated with processing information concerning processing tasks to be shared (cooperative processing) by the TV signal processor 106 and the compliant electronic apparatus.

When the controller 112 recognizes sharing of the task of processing the input signal, the controller 112 sets a signal path serving as a channel representing the order of processing the input signal by the signal processing circuit 113 and the connected apparatus.

In step S7, the controller 112 generates a control signal for controlling the function of the signal processing circuit 113 so as to cause the signal processing circuit 113 to perform cooperative processing (processing indicated by the processing information recognized in step S6) and supplies the control signal to the signal processing circuit 113. In accordance with the control signal from the controller 112, the signal processing circuit 113 changes the function thereof and proceeds to step S8.

In step S8, the signal processing circuit 113 performs processing of the input signal supplied along the signal path in accordance with the changed function and outputs the processing result along the signal path. When processing of the input signal is completed, the controller 112 transmits in step S9 a control signal to the signal processing circuit 113. In response, the function of the signal processing circuit 113 is restored, and the processing is terminated.

Figure 18:
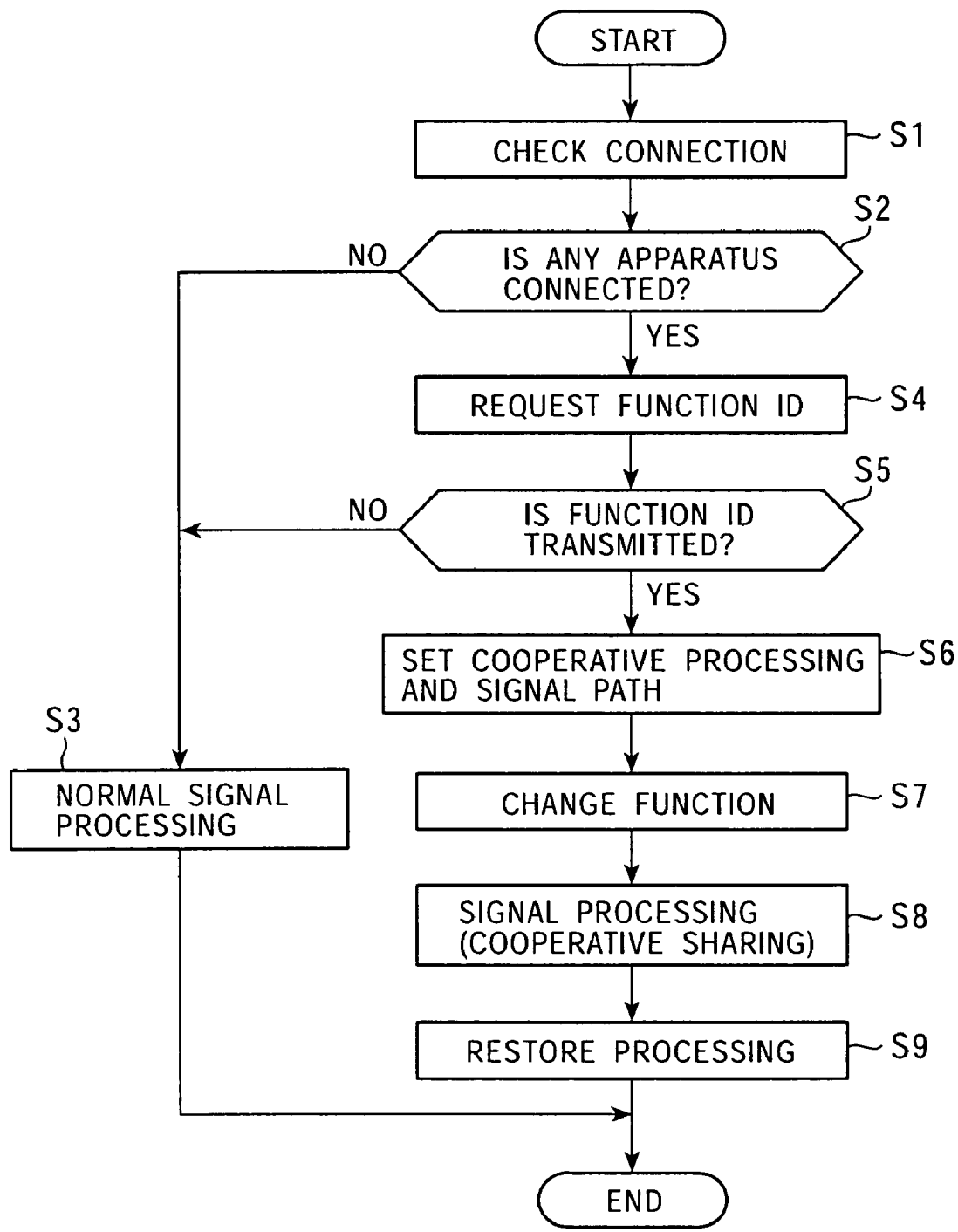
FIG. 18 is a flowchart describing processing by the TV signal processor 106 (electronic apparatus 11 (12)).

When the connected apparatus is, for example, the electronic apparatus 11, i.e., the compliant apparatus, shown in FIG. 17, the electronic apparatus 11 performs processing similar to that in accordance with the flowchart in FIG. 18. In this case, the electronic apparatus 11 transmits a function ID request to the TV signal processor 106. The request is received by the controller 112 of the TV signal processor 106. The controller 112 transmits the function ID stored therein to the electronic apparatus 11. The controller 122 of the electronic apparatus 11 receives the function ID from the TV signal processor 106 and refers to the ID table stored therein on the basis of the function ID, thus recognizing processing information concerning processing tasks to be shared (cooperative processing) by the electronic apparatus 11 and the TV signal processor 106. In the electronic apparatus 11, the controller 122 performs control to change the function of the signal processing circuit 123 in accordance with the recognized processing information.

As described above, the TV signal processing circuit 113 and the electronic apparatus 11 change the functions thereof between a mode in which another apparatus is connected and a mode in which another apparatus is not connected. The TV signal processing circuit 113 and the electronic apparatus 11 share the task of processing an input signal with the other apparatus. Compared with a case in which the TV signal processing circuit 113 (or the other apparatus) or the electronic apparatus 11 performs independent processing, the processing result has a higher quality.

In other words, when the TV signal processor 106 and the electronic apparatus 11 are not electrically connected with each other, the TV signal processor 106 and the electronic apparatus 11 perform independent processing, as shown in FIG. 19. In this case, the electronic apparatus 11 is, for example, a DVD player.

Figure 19A:
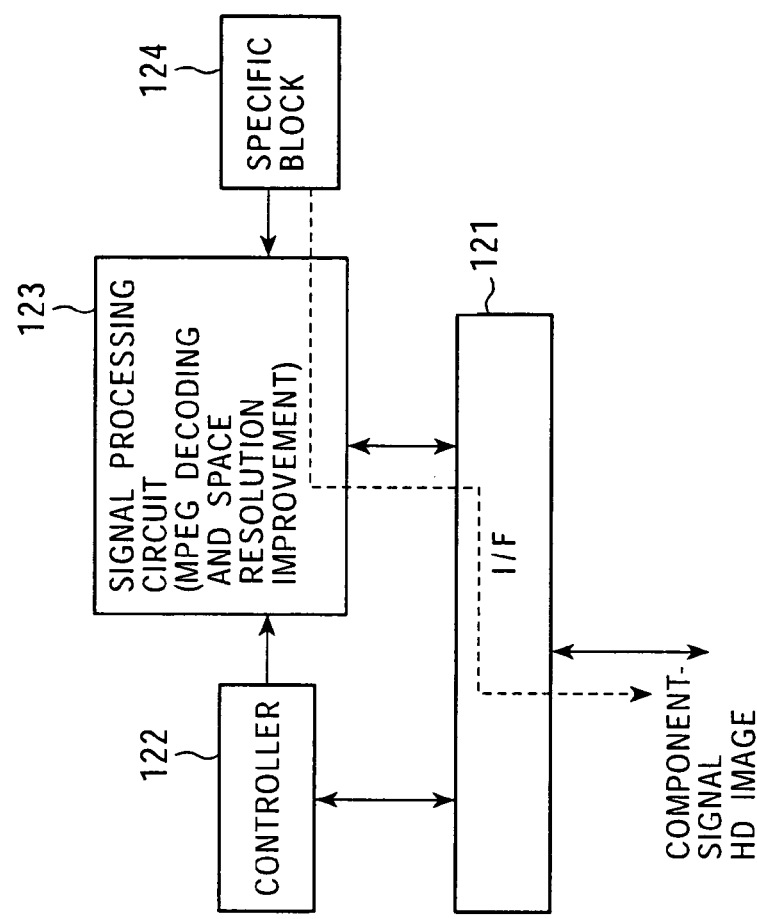
FIG. 19A is a diagram for describing independent processing by the TV signal processor 106.

In the embodiment of FIG. 19, in the TV signal processor 106, for example, as shown in FIG. 19A, the signal processing circuit 113 simultaneously performs composite/component conversion processing and space resolution improvement processing of a composite SD image signal supplied from the tuner 105 (FIG. 15) via the selector 104 and the I/F 111. The resulting component HD image signal is supplied to the CRT 2 via the I/F 111 and the selector 104.

Figure 19B:
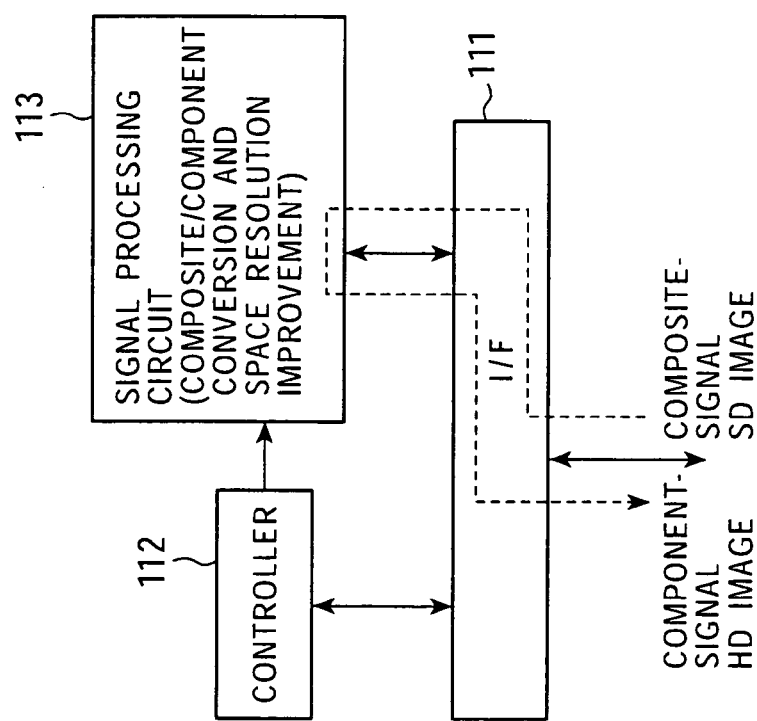
FIG. 19B is a diagram for describing independent processing by the electronic apparatus 11.

In the electronic apparatus 11, which is the DVD player, as shown in FIG. 19B, the specific block 124 reads a signal recorded in the DVD and supplies the signal to the signal processing circuit 123. The signal processing circuit 123 simultaneously performs, for example, MPEG decoding and space resolution improvement of the signal read from the DVD and outputs the resulting component HD image signal via the I/F 121.

Figure 20:
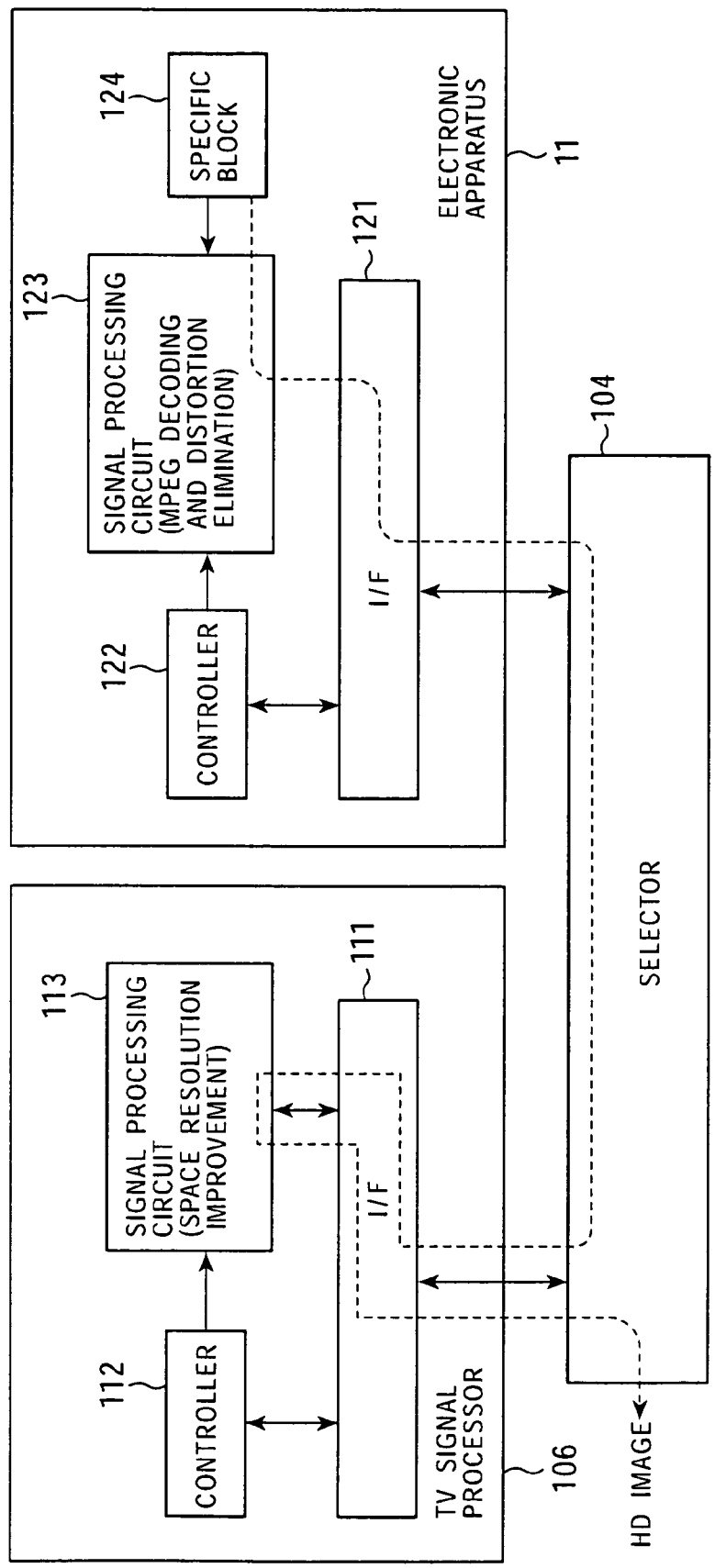
FIG. 20 is a diagram for describing cooperative processing by the TV signal processor 106 and the electronic apparatus 11.

In contrast, when the TV signal processor 106 and the electronic apparatus 11 are electrically connected with each other, the TV signal processor 106 and the electronic apparatus 11 cooperate in sharing the task of processing the input signal, as shown in FIG. 20. The TV signal processor 106 and the electronic apparatus 11 each perform processing allocated thereto by changing the function thereof.

Specifically, in the embodiment of FIG. 20, the function of the signal processing circuit 113 in the TV signal processor 106 is changed from the function for simultaneously performing composite/component conversion processing and space resolution improvement processing to the function for only performing space resolution improvement processing. At the same time, the function of the signal processing circuit 123 in the electronic apparatus 11 is changed from the function for simultaneously performing MPEG decoding and space resolution improvement processing to the function for simultaneously performing MPEG decoding and distortion elimination processing. In the embodiment of FIG. 20, the signal path is set to the order starting from the specific block 124, the signal processing circuit 123, the I/F 121, and the selector 104 in the electronic apparatus 11, and the I/F 111, the signal processing circuit 113, the I/F 111, and the selector 104 in the TV signal processor 106.

Figure 21:
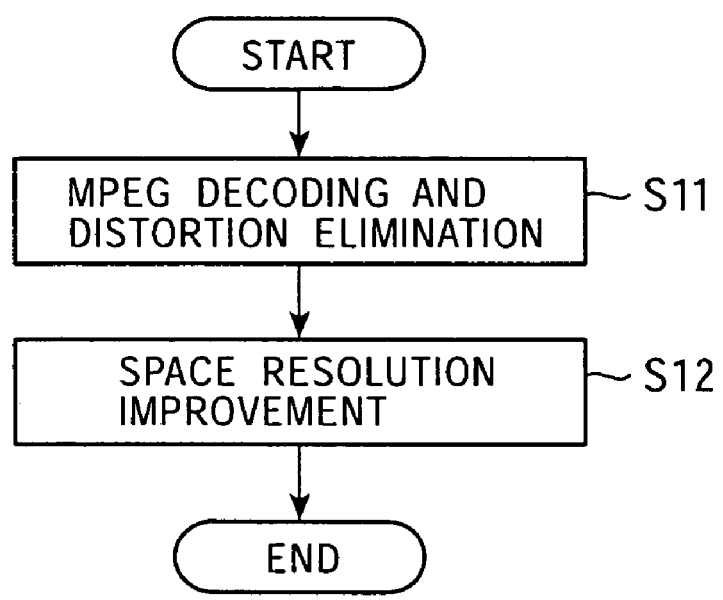
FIG. 21 is a flowchart describing cooperative processing performed by the TV signal processor 106 and the electronic apparatus 11.

As described above, when the functions of the signal processing circuits 113 and 123 are changed and the signal path is set, the TV signal processor 106 and the electronic apparatus 11 which are electrically connected with each other perform processing shown in a flowchart in FIG. 21.

Specifically, the specific block 124 in the electronic apparatus 11, which is the DVD player, reads a signal recorded in the DVD and supplies the signal to the signal processing circuit 123. In step S11, the signal processing circuit 123 simultaneously performs MPEG-decoding and distortion elimination processing of the signal read from the DVD and outputs the resulting component SD image signal (from which distortion is eliminated) via the I/F 121.

Distortion elimination eliminates block distortion caused by MPEG encoding or the like.

Accordingly, the component SD image signal output from the I/F 121 in the electronic apparatus 11 is received by the selector 104 and supplied to the TV signal processor 106.

In the TV signal processor 106, the signal processing circuit 113 receives the component SD image signal from the selector 104 via the I/F 111. In step S12, the signal processing circuit 113 performs space resolution improvement processing of the SD image signal. As a result, a component HD image signal generated by performing, by the signal processing circuit 113, space resolution improvement processing is supplied to the selector 104 via the I/F 111.

The selector 104 supplies the HD image signal to, for example, the CRT 2 (FIG. 15). Accordingly, the CRT 2 displays a composite-signal HD image generated by MPEG-decoding the signal recorded on the DVD, eliminating distortion from the signal, and improving the space resolution of the signal.

As described above, the function of the signal processing circuit 113 in the TV signal processor 106 is changed from the function for simultaneously performing composite/component conversion processing and space resolution improvement processing to the function for only performing space resolution improvement processing. As described above, the function of the signal processing circuit 123 in the electronic apparatus 11 is changed from the function for simultaneously performing MPEG decoding and space resolution improvement processing to the function for simultaneously performing MPEG decoding and distortion elimination processing.

Such a signal processing circuit having a variable function can be realized by classification adaptive processing previously proposed by the assignee of the present invention.

Classification adaptive processing includes classification processing and adaptive processing. Classification processing classifies signals (data) into classes according to characteristics. Each class is subjected to adaptive processing.

Adaptive processing will now be described using a case in which space resolution improvement processing for converting an SD image into an HD image is performed.

In this case, adaptive processing performs a linear combination of pixels forming an SD image (hereinafter referred to as SD pixels) and predetermined tap coefficients to compute a predicted value of a pixel of an HD image generated by improving the space resolution of the SD image. As a result, the image whose resolution is improved from the SD image is generated.

Specifically, for example, given an HD image as teacher data that is used as model data and an SD image generated by degrading the resolution of the HD image as student data that is to be converted to be much the same as the model data, a predicted value $E[y]$ of a pixel value of a pixel forming the HD image (hereinafter referred to as an HD pixel) is computed using a linear combination model defined by a linear combination of a set of pixel values $x_1, x_2, \ldots$ of several SD pixels (pixels forming the SD image) and predetermined tap coefficients w1, w2 . . . . In this case, the predicted value E[y] is expressed by the following equation:

$$E[y]=w_1x_1+w_2x_2+$$

In order to generalize equation (1), a matrix W having a set of tap coefficients $w_j$, a matrix X having a set of student data $x_{ij}$, and a matrix Y' having a set of predicted values $E[y_j]$ are defined as:

$$X = \begin{bmatrix} x_{11} & x_{12} & \Lambda & x_{1J} \\ x_{21} & x_{22} & \Lambda & x_{2J} \\ \Lambda & \Lambda & \Lambda & \Lambda \\ x_{I1} & x_{I2} & \Lambda & x_{IJ} \end{bmatrix}$$ [Eq. 1]

$$W = \begin{bmatrix} W_1 \\ W_2 \\ \Lambda \\ W_J \end{bmatrix}, Y' = \begin{bmatrix} E[y_1] \\ E[y_2] \\ \Lambda \\ E[y_J] \end{bmatrix}$$

then, the following observation equation holds true:

$$XW=Y' \qquad (2)$$

The component $x_{ij}$ of the matrix X corresponds to the j-th student data of the i-th set of student data (set of student data used to predict the i-th teacher data $y_i$). The component $w_j$ of the matrix W denotes a tap coefficient to be multiplied with the j-th student data in the set of student data. Also, $y_i$ denotes the i-th teacher data. Thus, $E[y_i]$ denotes a predicted value of the i-th teacher data. From y in the left side of equation (1), the suffix i of the component $y_i$ of the matrix Y is omitted. From $x_1, x_2, \ldots$ in the right side of equation (1), the suffix i of the component $x_{ij}$ of the matrix X is omitted.

A least-squares method is applied to the observation equation to compute the predicted value E[y] close to the pixel value y of the HD pixel. In this case, a matrix Y having a set of real pixel values y of the HD pixels serving as the teacher data and a matrix E having a set of residuals e between the predicted values E[y] and the pixel values y of the HD pixels are defined as:

$$E = \begin{bmatrix} e_1 \\ e_2 \\ \Lambda \\ e_I \end{bmatrix}, Y = \begin{bmatrix} y_1 \\ y_2 \\ \Lambda \\ y_I \end{bmatrix}$$ [Eq. 2]

From equation (2), the following residual equation holds true:

$$XW=Y+E \qquad (3)$$

In this case, the tap coefficient $w_j$ for computing the predicted value E[y] close to the pixel value y of the HD pixel is computed by minimizing the square error:

$$\sum_{i=1}^{I} e_i^2$$ [Exp. 3]

When the above square error differentiated with respect to the tap coefficient $w_j$ is zero, the tap coefficient $w_j$ that satisfies the following equation is the optimal value for computing the predicted value E[y] close to the pixel value y of the HD pixel:

$$e_1 \frac{\partial e_1}{\partial w_j} + e_2 \frac{\partial e_2}{\partial w_j} + \Lambda + e_I \frac{\partial e_I}{\partial w_j} = 0 \quad (j=1,2,\Lambda,J)$$ [Eq. 4]

By differentiating equation (3) with respect to the tap coefficient $w_j$, the following equations hold true:

[Eq. 5]

$$\frac{\partial e_i}{\partial w_1} = x_{i1}, \frac{\partial e_i}{\partial w_2} = x_{i2}, \Lambda, \frac{\partial e_i}{\partial w_J} = x_{iJ}, (j=1,2,\Lambda,J) \qquad (5)$$

From equations (4) and (5), equations (6) are obtained:

[Eq. 6]

$$\sum_{i=1}^{I} e_i x_{i1} = 0, \sum_{i=1}^{I} e_i x_{i2} = 0, \Lambda \sum_{i=1}^{I} e_i x_{iJ} = 0 \qquad (6)$$

Taking into consideration the relationship among the student data $x_{ij}$, the tap coefficient $w_j$, the teacher data $y_i$, and the residual $e_i$ in the residual equation of equation (3), the following normal equations are obtained from equations (6):

[Eq. 7]

$$\begin{cases} \left(\sum_{i=1}^{I} x_{i1}x_{i1}\right)w_1 + \left(\sum_{i=1}^{I} x_{i1}x_{i2}\right)w_2 + \Lambda + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \Lambda + \left(\sum_{i=1}^{I} x_{i2}x_{iJ}\right)w_J = \left(\sum_{i=1}^{I} x_{i2}y_i\right) \\ \left(\sum_{i=1}^{I} x_{iJ}x_{i1}\right)w_1 + \left(\sum_{i=1}^{I} x_{iJ}x_{i2}\right)w_2 + \Lambda + \left(\sum_{i=1}^{I} x_{iJ}x_{iJ}\right)w_J = \left(\sum_{i=1}^{I} x_{iJ}y_i\right) \end{cases}$$ (7)

The normal equations shown by equations (7) define a matrix (covariance matrix) A and a vector v as:

$$A = \begin{pmatrix} \sum_{i=1}^{I} x_{i1}x_{i1} & \sum_{i=1}^{I} x_{i1}x_{i2} & \Lambda & \sum_{i=1}^{I} x_{i1}x_{iJ} \\ \sum_{i=1}^{I} x_{i2}x_{i1} & \sum_{i=1}^{I} x_{i2}x_{i2} & \Lambda & \sum_{i=1}^{I} x_{i2}x_{iJ} \\ & & \Lambda & \\ \sum_{i=1}^{I} x_{iJ}x_{i1} & \sum_{i=1}^{I} x_{iJ}x_{i2} & \Lambda & \sum_{i=1}^{I} x_{iJ}x_{iJ} \end{pmatrix}$$ [Eq. 8]

$$v = \begin{pmatrix} \sum_{i=1}^{I} x_{i1}y_i \\ \sum_{i=1}^{I} x_{i2}y_i \\ M \\ \sum_{i=1}^{I} x_{iJ}y_i \end{pmatrix}$$

and defines a vector W as shown in equation (1), then the following equation holds true:

$$AW=v \quad (8)$$

By preparing a certain number of sets of student data $x_{ij}$ and teacher data $y_i$, the same number of normal equations (7) as the number J of the tap coefficients $w_j$ to be computed can be obtained. Calculation of equation (8) with respect to the vector W (the matrix A in equation (8) must be non-zero in order to calculate equation (8)) gives the optimal tap coefficient $w_j$. Equation (8) can be calculated using, for example, a sweep-out method (Gauss-Jordan elimination method).

As described above, using student data and teacher data, adaptive processing learns computation of the optimal tap coefficients $w_j$ for predicting the teacher data from the student data and tap coefficients and uses the tap coefficients $w_j$ to compute a predicted value E[y] close to the teacher data y using equation (1).

Adaptive processing differs from, for example, simple interpolation processing in that the former represents components included not in an SD image but in an HD image. Specifically, in view of equation (1) only, adaptive processing seems to be the same as interpolation processing using a so-called interpolation filter. Since the tap coefficients w corresponding to tap coefficients of the interpolation filter are computed by learning using the teacher data and the student data, the components included in the HD image can be represented. This shows that adaptive processing is processing that involves so-called image creation (resolution creation).

Adaptive processing has been described using, for example, a case in which space resolution is improved. By performing adaptive processing, learning is conducted using different teacher data and student data to generate various tap coefficients, and the tap coefficients may be used, for example, to improve S/N (Signal to Noise Ratio), to reduce blurring, and to perform various other types of processing.

Specifically, in order to improve S/N or reduce blurring by adaptive processing, image data having a high S/N is used as teacher data, and an image generated by degrading S/N of the teacher data or a blurred image is used as student data. Tap coefficients are thus computed.

For example, in order to simultaneously perform composite/component conversion processing and space resolution improvement processing by adaptive processing, a component-signal HD image is used as teacher data, and an image generated by degrading the space resolution of the teacher data and converting the data into a composite signal is used as student data. Tap coefficients are thus computed.

For example, in order to perform space resolution improvement processing of a component-signal image by adaptive processing, a component-signal HD image is used as teacher data, and an SD image generated by degrading the space resolution of the teacher data is used as student data. Tap coefficients are thus computed.

For example, in order to simultaneously perform MPEG decoding and space resolution improvement processing of an MPEG-coded image by adaptive processing, an image generated by MPEG-encoding a component-signal HD image and decoding the resulting MPEG-coded image is used as teacher data, and coded data generated by degrading the space resolution of the teacher data and MPEG-encoding the degraded data is used as student data. Tap coefficients are thus computed. Alternatively, a component-signal image is used as teacher data, and coded data generated by MPEG-encoding the teacher data is used as student data. Tap coefficients are thus computed.

Figure 22:
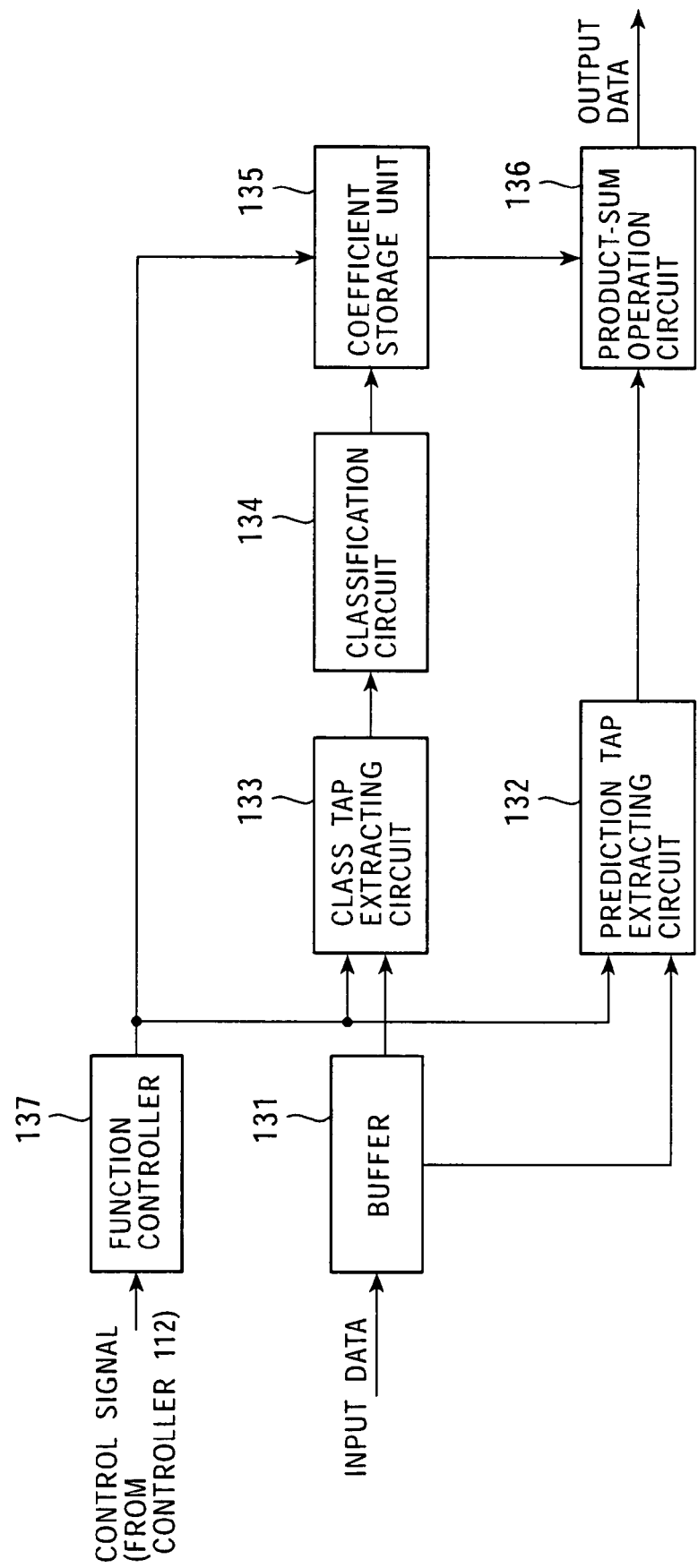
FIG. 22 is a diagram showing an example of the configuration of a signal processing circuit 113.

FIG. 22 shows an example of the configuration of the signal circuit 113 in the TV signal processor 106, which is implemented by a classification adaptive processing circuit for performing the above-described classification adaptive processing. The signal processor 123 in the electronic apparatus 11 (FIG. 17) is similarly arranged.

Input data (input signal) to be processed by the signal processing circuit 113 is supplied to a buffer 131. The buffer 131 temporarily stores the input data supplied thereto.

A prediction tap extracting circuit 132 sequentially uses, as target data, output data to be computed by a product-sum operation circuit 136, which will be described below, extracts the input data to be used for predicting the target data from the buffer 131, and uses the input data as prediction taps.

Specifically, for example, when the input data is SD image data and the output data is HD image data generated by improving the space resolution of the SD image, the prediction tap extracting circuit 132 extracts, as prediction taps, several SD pixels of the SD image, which are close to the position corresponding to an HD pixel serving as the target data in the space or time domain.

For example, when the input data is coded data generated by MPEG-encoding an image and the output data is image data generated by MPEG-decoding the coded data, the prediction tap extracting circuit 132 extracts, as prediction taps, a DCT (Discrete Cosine Transform) coefficient forming a DCT block including a pixel serving as the target data (block used as the unit of DCT processing involved in MPEG-encoding), DCT coefficients close to this DCT block in the space or time domain, or the like. When a pixel serving as the target data is generated by MPEG-encoding an image in another frame (or field) as a prediction image (for example, P picture or B picture), the prediction tap extracting circuit 132 extracts, as prediction taps, DCT coefficients of pixels forming the prediction image. Alternatively, pixels of the image serving as the prediction image, which has already been output as the output data, may be used as prediction taps.

Having obtained the prediction taps for the target data, the prediction tap extracting circuit 132 supplies the prediction taps for the target data to the product-sum operation circuit 136.

A control signal is supplied from a function controller 137 to the prediction tap extracting circuit 132. In accordance with the control signal from the function controller 137, the prediction tap extracting circuit 132 determines the structure of the input data forming the prediction taps (and output data), that is, the structure of the prediction taps.

A class tap extracting circuit 133 extracts, from the buffer 131, input data to be used for classifying the target data into one of several classes and uses the input data as a class tap.

A control signal is supplied from the function controller 137 to the class tap extracting circuit 133. As in the prediction tap extracting circuit 132, the class tap extracting circuit 133 determines, in accordance with the control signal from the function controller 137, the structure of the input data forming the class tap, that is, the structure of the class tap.

In order to simplify the description, for example, the prediction taps obtained by the prediction tap extracting circuit 132 and the class tap obtained by the class tap extracting circuit 133 have the same tap structure. Needless to say, the prediction taps and the class tap can have independent tap structures.

The class tap for the target data, which is obtained by the class tap extracting circuit 133, is supplied to a classification circuit 134. The classification circuit 134 classifies the target data in accordance with the class tap from the class tap extracting circuit 133 and outputs a class code corresponding to a class obtained as a result of classification.

For example, ADRC (Adaptive Dynamic Range Coding) or the like may be adopted as a classification method.

The ADRC method involves ADRC processing of input data forming the class tap and determining the class of the target data in accordance with the resulting ADRC code.

In K-bit ADRC, for example, the maximum value MAX and the minimum value MIN of the input data forming the class tap are detected, and DR=MAX−MIN is calculated as a local dynamic range of the set. On the basis of the dynamic range DR, the input data forming the class tap is re-quantized to K bits. Specifically, the minimum value MIN is subtracted from each piece of the input data forming the class tap, and the difference is divided (quantized) by $DR/2^K$. The pieces of k-bit input data forming the class tap are arranged in a predetermined sequence to give a bit string, which is output as an ADRC code. When the class tap is subjected to, for example, 1-bit ADRC processing, the minimum value MIN is subtracted from each piece of the input data forming the class tap, and the difference is divided by the average of the maximum value MAX and the minimum value MIN. As a result, each piece of the input data has 1 bit (binarized). The pieces of 1-bit input data are arranged in a predetermined sequence to give a bit string, which is output as an ADRC code.

For example, the classification circuit 134 may output, as a class code, a level distribution pattern of the input data forming the class tap. In this case, when the class tap consists of N pieces of input data and K bits are allocated to each piece of the input data, the number of cases of the class code output by the classification circuit 134 is $(2^N)^K$ combinations, which is a vast number exponentially proportional to the number of bits K of the input data.

Preferably, the classification circuit 134 first compresses the information amount of the class tap using the above ADRC processing or vector quantization and then performs classification.

The class code output by the classification circuit 134 is supplied as an address to a coefficient storage unit 135.

The coefficient storage unit 135 stores tap coefficients generated by learning. The coefficient storage unit 135 outputs tap coefficients stored at the address corresponding to the class code output by the classification circuit 134 to the product-sum operation circuit 136.

As described below, the coefficient storage unit 135 stores a plurality of sets (a plurality of types) of tap coefficients generated by learning using a plurality of sets of teacher data and student data. In the coefficient storage unit 135, the set of tap coefficients to be used is determined from among a plurality of sets of tap coefficients in accordance with a control signal from the function controller 137. Specifically, the control signal output from the function controller 137 is supplied to the coefficient storage unit 135. The coefficient storage unit 135 determines the set of tap coefficients to be used in accordance with the control signal and outputs tap coefficients corresponding to the class code supplied from the classification circuit 134 from among the set of tap coefficients to the product-sum operation circuit 136.

The product-sum operation circuit 136 obtains the prediction taps output by the prediction tap extracting circuit 132 and the tap coefficients output by the coefficient storage unit 135, performs a linear prediction operation (product-sum operation) shown by equation (1) using the prediction taps and the tap coefficients, and outputs the operation result as output data.

A control signal from the controller 112 (FIG. 16) is supplied to the function controller 137. The function controller 137 controls the prediction tap extracting circuit 132, the class tap extracting circuit 133, and the coefficient storage unit 135 in accordance with the control signal.

Figure 23:
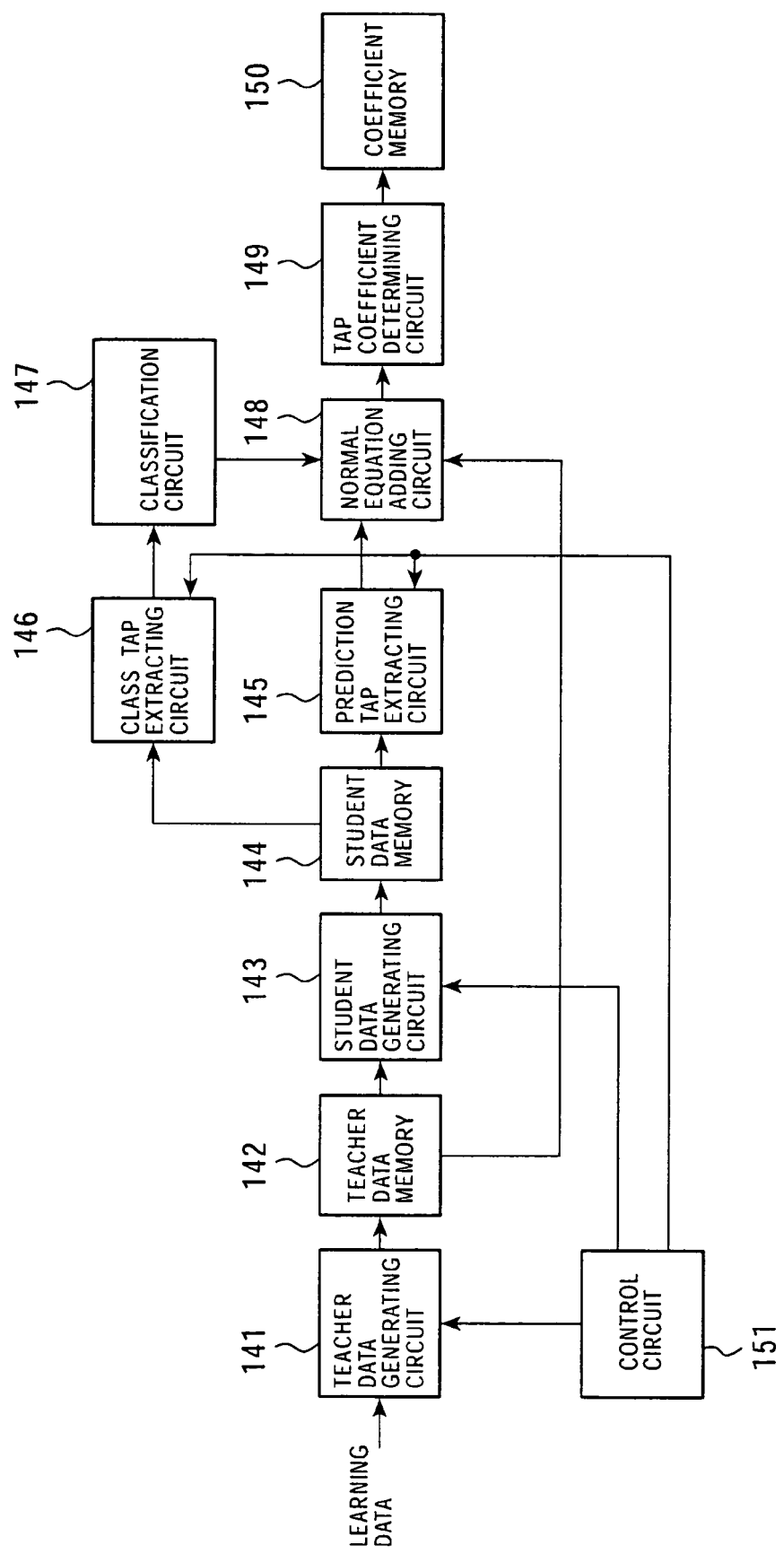
FIG. 23 is a block diagram showing an example of the configuration of a learning apparatus for learning tap coefficients to be stored in a coefficient storage unit 135.

FIG. 23 shows an example of the configuration of an embodiment of a learning apparatus for learning tap coefficients to be stored in the coefficient storage unit 135 shown in FIG. 22.

Learning data used for learning is supplied to a teacher data generating circuit 141. High-quality data such as HD image data can be used as learning data.

The teacher data generating circuit 141 generates teacher data, which becomes model data in the learning processing, from the learning data.

Specifically, for example, in a case in which the learning data is HD image data, when the tap coefficients to be computed by learning are used for converting an SD image into an HD image or converting MPEG-coded data into an HD image, the teacher data generating circuit 141 maintains the HD image data serving as the learning data and outputs the HD image data as teacher data.

For example, in a case in which the learning data is HD image data, when the tap coefficients to be computed by learning are used for converting an SD image having a low S/N into an SD image having a high S/N or converting MPEG-coded data into an SD image, the teacher data generating circuit 141 decimates the pixels of the HD image data serving as the learning data to generate SD image data and outputs the generated SD image data as teacher data.

The teacher data output by the teacher data generating circuit 141 is supplied to a teacher data memory 142. The teacher data memory 142 stores the teacher data from the teacher data generating circuit 141.

A student data generating circuit 143 generates student data, which becomes a student in the learning processing, from the teacher data stored in the teacher data memory 142.

Specifically, for example, when the tap coefficients to be computed by learning are used for converting an SD image into an HD image, as described above, the teacher data memory 142 stores the HD image serving as the teacher data. In this case, the student data generating circuit 143 decimates the pixels of the teacher data to generate SD image data and outputs the SD image data as student data.

For example, when the tap coefficients to be computed by learning are used for converting MPEG-coded data into an HD image, as described above, the teacher data memory 142 stores the HD image serving as the teacher data. In this case, the student data generating circuit 143 MPEG-encodes the teacher data to generate coded data and outputs the coded data as student data.

For example, when the tap coefficients to be computed by learning are used for converting an SD image having a low S/N into an SD image having a high S/N, as described above, the teacher data memory 142 stores the SD image serving as the teacher data. In this case, the student data generating circuit 143 adds noise to the teacher data to generate SD image data having a low S/N and outputs the SD image data having a low S/N as student data.

For example, when the tap coefficients to be computed by learning are used for converting MPEG-coded data into an SD image, as described above, the teacher data memory 142 stores the SD image serving as the teacher data. In this case, the student data generating circuit 143 MPEG-encodes the teacher data to generate coded data and outputs the coded data as student data.

The student data output by the student data generating circuit 143 is supplied to a student data memory 144. The student data memory 144 stores the student data supplied from the student data generating circuit 143.

The prediction tap extracting circuit 145 sequentially uses the teacher data stored in the teacher data memory 142 as target data, extracts the student data used for predicting the target data from the student data memory 144, and generates prediction taps having the same tap structure as those generated by the prediction tap extracting circuit 132 shown in FIG. 22. The prediction taps generated by the prediction tap extracting circuit 145 are supplied to a normal equation adding circuit 148.

The class tap extracting circuit 146 extracts the student data used for classifying the target data from the student data memory 144, generates a class tap having the same tap structure as that generated by the class tap extracting circuit 133 shown in FIG. 22, and supplies the class tap to a classification circuit 147. As in the classification circuit 134 shown in FIG. 22, the classification circuit 147 uses the class tap from the class tap extracting circuit 146 to perform classification and supplies a class code representing the class of the target data to the normal equation adding circuit 148.

The normal equation adding circuit 148 reads the teacher data serving as the target data from the teacher data memory 142 and performs addition of the student data forming the prediction taps from the prediction tap extracting circuit 145 and the teacher data serving as the target data in each class represented by the class code supplied from the classification circuit 147.

Specifically, the normal equation adding circuit 148 uses the prediction taps (student data) and performs, in each class corresponding to the class code supplied from the classification circuit 147, operations corresponding to multiplication $(x_{in}x_{im})$ of the student data, each piece forming each component of the matrix A in equation (8), and summation ($\Sigma$).

Furthermore, the normal equation adding circuit 148 uses the prediction taps (student data) and the target pixel (teacher data) and performs, in each class corresponding to the class code supplied from the classification circuit 147, operations corresponding to multiplication $(x_{in}y_i)$ of the student data and the teacher data, each piece forming each component of the vector v in equation (8), and summation ($\Sigma$).

The normal equation adding circuit 148 performs the above addition using all pieces of the teacher data stored in the teacher data memory 142 as target data, thus giving the normal equations shown in equations (8) in each class.

By solving the normal equations generated in each class by the normal equation adding circuit 148, a tap coefficient determining circuit 149 computes tap coefficients in each class and supplies the tap coefficients to an address corresponding to each class in a coefficient table memory 150.

Depending on the data prepared as the learning data, there may be a class in which the normal equation adding circuit 148 cannot generate a sufficient number of normal equations for computing the tap coefficients. In such a class, the tap coefficient determining circuit 149 outputs, for example, default tap coefficients.

The coefficient table memory 150 stores the tap coefficients in each class, which are supplied from the tap coefficient determining circuit 149.

A control circuit 151 controls the teacher data generating circuit 141, the student data generating circuit 142, the prediction tap extracting circuit 145, and the class tap extracting circuit 146.

Specifically, in the learning apparatus shown in FIG. 23, processing information indicating the contents of processing performed using the tap coefficients is set to the control circuit 151 as information indicating the type of processing performed by the tap coefficients to be learned by operating an operation unit, which is not shown. In accordance with the processing information set by operating the operation unit, the control circuit 151 controls the teacher data generating circuit 141, the student data generating circuit 142, the prediction tap extracting circuit 145, and the class tap extracting circuit 146.

Accordingly, under the control of the control circuit 151, the teacher data generating circuit 141 generates teacher data from the learning data. Under the control of the control circuit 151, the student data generating circuit 143 generates student data from the teacher data. Under the control of the control circuit 151, the prediction tap extracting circuit 145 sets the tap structure of prediction taps and generates prediction taps having the tap structure. Under the control of the control circuit 151, the class tap extracting circuit 146 sets the tap structure of a class tap and generates a class tap having the tap structure.

Figure 24:
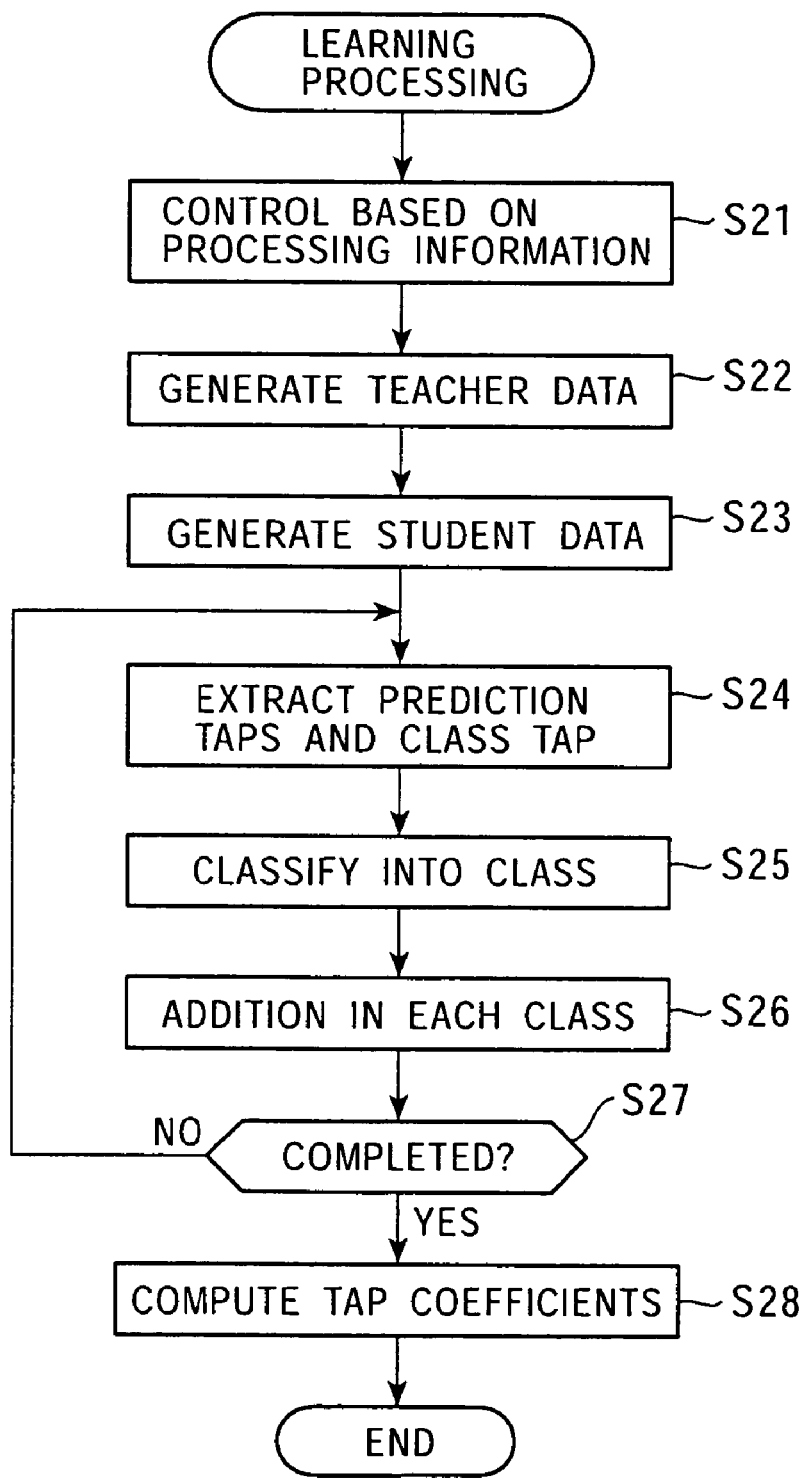
FIG. 24 is a flowchart describing learning processing by the learning apparatus.

Referring to a flowchart in FIG. 24, processing (learning processing) by the learning apparatus shown in FIG. 23 will now be described.

In step S21, the control circuit 151 controls the teacher data generating circuit 141, the student data generating circuit 142, the prediction tap extracting circuit 145, and the class tap extracting circuit 146 in accordance with the set processing information. Accordingly, the teacher data generating circuit 141 sets a method of generating teacher data from the learning data. The student data generating circuit 143 sets a method of generating student data from the teacher data. The prediction tap extracting circuit 145 sets the tap structure of prediction taps. The class tap extracting circuit 146 sets the tap structure of a class tap.

In step S22, the teacher data generating circuit 141 generates teacher data from the learning data supplied thereto in accordance with the generation method set in step S21 and supplies and stores the teacher data in the teacher data memory 142.

Subsequently, in step S23, the student data generating circuit 143 generates student data from the teacher data stored in the teacher data memory 142 in accordance with the generation method set in step S21 and supplies and stores the student data in the student data memory 144.

In step S24, the prediction tap extracting circuit 145 uses, from among the teacher data stored in the teacher data memory 142, data that has not yet been selected as target data as target data. By reading the student data from the student data memory 144, the prediction tap extracting circuit 145 generates prediction taps having the tap structure set in step S21 for the target data and supplies the prediction taps to the normal equation adding circuit 148.

In step S24, the class tap extracting circuit 146 generates a class tap having the tap structure set in step S21 for the target data by reading the student data from the student data memory 144, supplies the class tap to the classification circuit 147, and proceeds to step S25.

In step S25, the classification circuit 147 performs classification using the class tap from the class tap extracting circuit 146 and obtains a class code of the target data. The class code is supplied from the classification circuit 147 to the normal equation adding circuit 148.

In step S26, the normal equation adding circuit 148 reads the teacher data serving as the target data from the teacher data memory 142. For the student data forming the prediction taps supplied from the prediction tap extracting circuit 145 and the teacher data serving as the target data, the normal equation adding circuit 148 performs the above-described addition of the matrix A and the vector v shown by equation (8). The addition is performed in each class corresponding to the class code from the classification circuit 147.

In step S27, the prediction tap extracting circuit 145 determines whether or not the addition in which all pieces of the teacher data stored in the teacher data memory 142 are used as the target data is performed. If it is determined in step S27 that the addition in which all pieces of the teacher data are used as the target data is not performed, the prediction tap extracting circuit 145 returns to step S24 and uses, of the teacher data, data that has not yet been selected as target data as new target data. Subsequently, similar processing is repeated.

If it is determined in step S27 that the addition in which all pieces of the teacher data are used as the target data is performed, in step S28, the tap coefficient determining circuit 149 solves the normal equations generated in each class by the addition performed in step S26 by the normal equation adding circuit 148, thus computing the tap coefficients in each class. The tap coefficients are supplied and stored at an address corresponding to each class in the coefficient memory 150, and the processing is terminated.

Accordingly, the coefficient memory 150 stores the tap coefficients in each class for performing processing indicated by the processing information set to the control circuit 151.

The above learning processing by the learning apparatus is performed by changing the processing information set to the control circuit 151, and a set of tap coefficients based on each piece of processing information is obtained.

Accordingly, a plurality of sets of tap coefficients computed for a plurality of pieces of processing information is stored in the coefficient storage unit 135 in the signal processing circuit 113 shown in FIG. 22.

Figure 25:
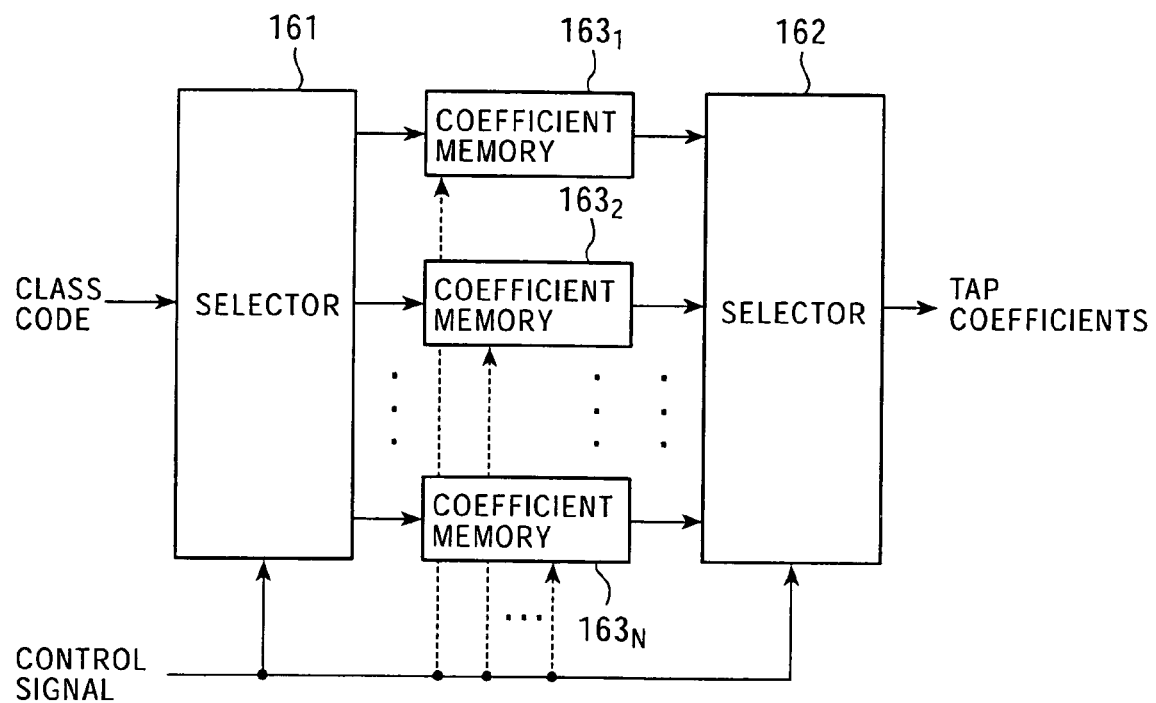
FIG. 25 is a block diagram showing an example of the configuration of the coefficient storage unit 135.

Specifically, FIG. 25 shows an example of the configuration of the coefficient storage unit 135 shown in FIG. 22.

Selectors 161 and 162 each select one of N coefficient memories $163_1$ to $163_N$ in accordance with a control signal supplied from the function controller 137 (FIG. 22). The selectors 161 and 162 select the same coefficient memory $163_n$.

The coefficient memories $163_1$ to $163_N$ each store a set of tap coefficients computed by the learning apparatus shown in FIG. 23 on the basis of each piece of processing information.

In the coefficient storage unit 135 arranged as described above, the selectors 161 and 162 select the coefficient memory $163_n$ from among the N coefficient memories $163_1$ to $163_N$ in accordance with the control signal supplied from the function controller 137.

A class code is supplied from the classification circuit 134 to the selector 161. The selector 161 supplies the class code to the selected coefficient memory $163_n$. The coefficient memory $163_n$ reads tap coefficients stored at an address corresponding to the class code from the selector 161 from the set of tap coefficients (stored therein) corresponding to the predetermined processing information and outputs the tap coefficients.

The tap coefficients output by the coefficient memory $163_n$ are supplied to the selector 162 selecting the coefficient memory $163_n$. The selector 162 supplies the tap coefficients supplied from the coefficient memory $163_n$ to the product-sum operation circuit 136 (FIG. 22).

The coefficient memories $163_1$ to $163_N$, each storing the set of tap coefficients based on each piece of processing information, need not be physically separated. In other words, the coefficient memories $163_1$ to $163_N$ may be implemented by bank switching a single memory.

In the present embodiment, since the function of the signal processing circuit 113 in the TV signal processor 106 changes from the function for simultaneously performing composite/component conversion processing and space resolution improvement processing to the function for only performing space resolution improvement processing, the coefficient storage unit 135 of the signal processing circuit 113 stores at least the following two sets of tap coefficients.

Specifically, one coefficient memory $163_i$ in the coefficient storage unit 135 of the signal processing circuit 113 stores a set of tap coefficients generated by learning processing using a component-signal HD image as teacher data and a composite-signal SD image as student data, the composite-signal SD image being generated by degrading the space resolution of the teacher data and converting the component signal into a composite signal. Another coefficient memory $163_j$ in the coefficient storage unit 135 of the signal processing circuit 113 stores a set of tap coefficients generated by learning processing using a component-signal HD image as teacher data and an SD image as student data, the SD image being generated by degrading the space resolution of the teacher data.

In the present embodiment, since the function of the signal processing circuit 123 in the electronic apparatus 11 (FIG. 17) changes from the function for simultaneously performing MPEG decoding and space resolution improvement processing to the function for simultaneously performing MPEG decoding and distortion elimination processing, a coefficient storage unit 135 in the signal processing circuit 123 of the electronic apparatus 11 stores at least the following two sets of tap coefficients.

Specifically, one coefficient memory $163_i$ in the coefficient storage unit 135 of the signal processing circuit 123 stores a set of tap coefficients generated by learning processing using an HD image as teacher data, the HD image being generated by MPEG-encoding a component-signal HD image and MPEG-decoding the coded data, and using an MPEG-coded SD image as student data, the SD image being generated by degrading the space resolution of the teacher data and MPEG-encoding the degraded data. Another coefficient memory $163_j$ in the coefficient storage unit 135 of the signal processing circuit 123 stores a set of tap coefficients generated by learning processing using a component-signal SD image as teacher data and coded data generated by MPEG-encoding the teacher data as student data.

The coefficient storage units 135 in the TV signal processor 106 and the electronic apparatus 11 may store other tap coefficients. Specifically, the coefficient storage units 135 may store, for example, tap coefficients for enlarging/contracting (resizing) an image, tap coefficients for improving the resolution in the time domain, tap coefficients for improving the resolution in the gray-scale domain, tap coefficients for reducing blurring, and tap coefficients for eliminating distortion and noise.

Classification adaptive processing using tap coefficients for improving the space resolution or time resolution or for resizing an image is described in U.S. Pat. No. 5,666,164. For example, classification adaptive processing using tap coefficients for performing MPEG decoding is described in Japanese Unexamined Patent Application Publication No. 2001-320711. For example, classification adaptive processing using tap coefficients for changing the gray scale is described in Japanese Unexamined Patent Application Publication No. 9-219833. For example, classification adaptive processing using tap coefficients for reducing blurring is described in U.S. Pat. No. 6,233,019. For example, classification adaptive processing using tap coefficients for eliminating distortion and noise is described in U.S. Pat. No. 5,499,057.

As described above, sets of many types of tap coefficients are stored in the coefficient storage units 135, and the set to be used is switched among these sets, thus easily changing the functions of the signal processing circuit 113 of the TV signal processor 106 and the signal processing circuit 123 of the electronic apparatus 11. In order to improve the efficiency of signal processing and memory usage, the tap structures of the prediction taps and the class tap are changed in accordance with the signal processing function. When the prediction taps and the class tap are pre-designed to sufficiently perform each signal processing function, the tap structures of the prediction taps and the class tap need not be changed.

Figure 26:
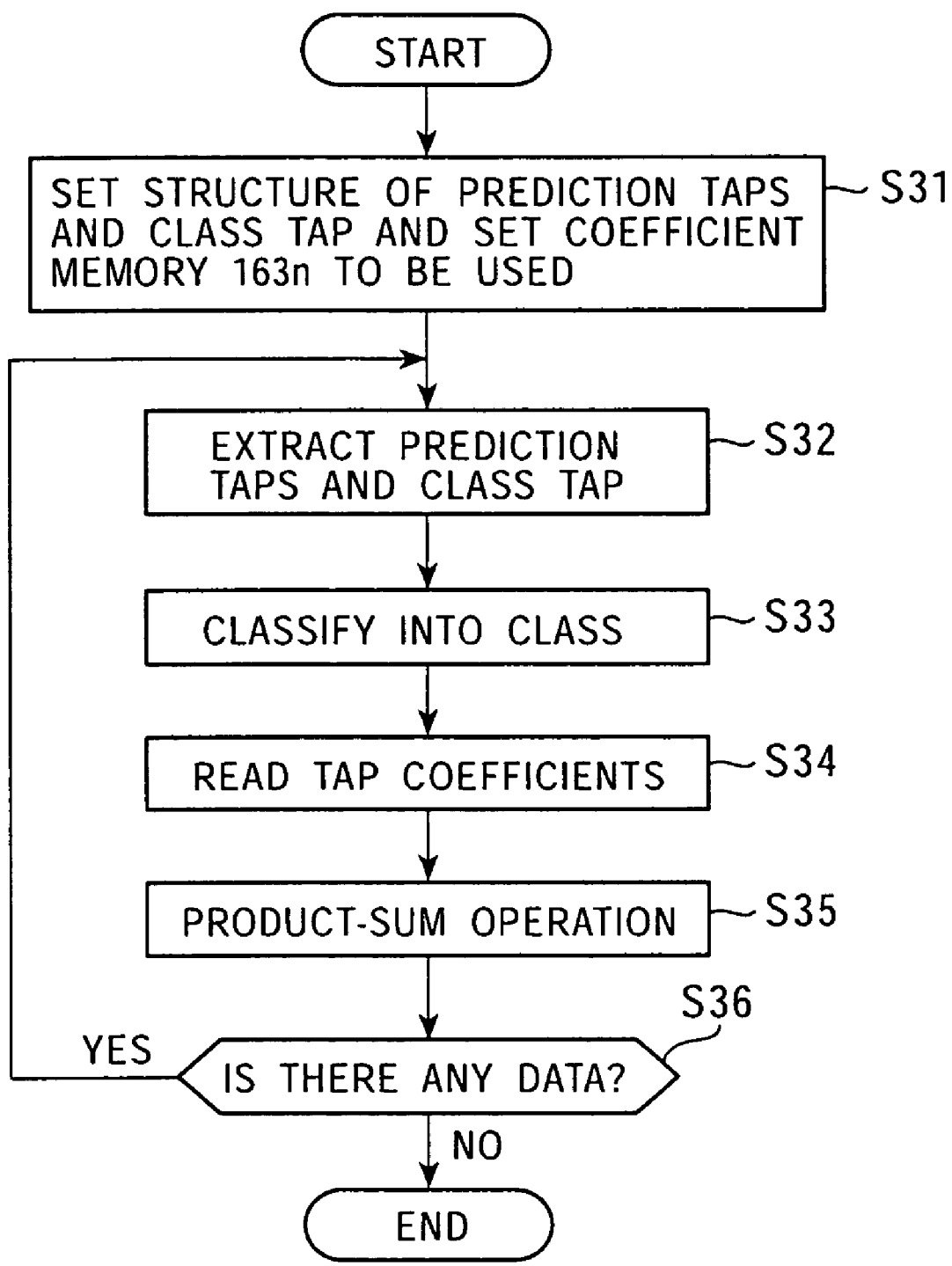
FIG. 26 is a flowchart describing processing by the signal processing circuit 113 including a classification adaptive processing circuit.

Referring to a flowchart in FIG. 26, processing by the signal processing circuit 113 shown in FIG. 22 will now be described.

In step S31, the function controller 137 receives a control signal from the controller 112 to change the function of the signal processing circuit 113. In accordance with the control signal, the function controller 113 controls the prediction tap extracting circuit 132, the class tap extracting circuit 133, and the coefficient storage unit 135.

Specifically, the control signal supplied from the controller 112 to the function controller 137 includes processing information associated with the function ID stored in the controller 112. In accordance with the processing information, the function controller 137 controls, as in the control circuit 151 shown in FIG. 23, the prediction tap extracting circuit 132, the class tap extracting circuit 133, and the coefficient storage unit 135.

As a result, the prediction tap extracting circuit 132 is set to generate prediction taps having the same tap structure as those generated by the prediction tap extracting circuit 145 of the learning apparatus shown in FIG. 23. The class tap extracting circuit 133 is also set to generate a class tap having the same tap structure as that generated by the class tap extracting circuit 146 of the learning apparatus shown in FIG. 23.

The coefficient storage unit 135 is set to use the coefficient memory $163_n$ (FIG. 25) having stored therein a set of tap coefficients corresponding to the processing information included in the control signal from the function controller 137.

Subsequently, when input data is supplied and stored in the buffer 131, in step S32, the prediction tap extracting circuit 132 uses, of the output data to be computed by the product-sum operation circuit 136, data that has not yet been selected as target data as target data. By reading the input data from the buffer 131, the prediction tap extracting circuit 132 generates (forms) prediction taps having the tap structure set in step S31 for the target data and supplies the prediction taps to the product-sum operation circuit 136.

In step S32, the class tap extracting circuit 133 generates a class tap having the tap structure set in step S31 for the target data by reading the input data from the buffer 131, supplies the class tap to the classification circuit 134, and proceeds to step S33.

In step S33, the classification circuit 134 performs classification using the class tap from the class tap extracting circuit 133 and obtains a class code of the target data. The class code is supplied to the coefficient storage unit 135.

In the coefficient storage unit 135 (FIG. 25), the selectors 161 and 162 have selected the coefficient memory $163_n$ set in step S31. When the class code is supplied from the classification circuit 134, in step S34, the coefficient storage unit 135 reads from the coefficient memory $163_n$ tap coefficients at an address corresponding to the class code from the classification circuit 134 and supplies the tap coefficients to the product-sum operation circuit 136.

The product-sum operation circuit 136 obtains the tap coefficients supplied from the coefficient storage unit 135. In step S35, the product-sum operation circuit 136 uses the tap coefficients and the prediction taps supplied in step S32 from the prediction tap extracting circuit 132 to perform a product-sum operation shown by equation (1), computes a predicted value of the target data, and outputs the predicted value as output data.

The output data output by the product-sum operation circuit 136 is generated using the prediction taps and the class tap having the tap structures corresponding to the processing information and a set of tap coefficients. The output data is thus data generated by processing the input data in the manner represented by the processing information.

Subsequently, in step S36, the prediction tap extracting circuit 132 determines whether or not there is output data to be used as target data. If it is determined in step S36 that there is output data to be used as target data, the processing returns to step S32 and uses output data that has not yet been used as target data as target data. Subsequently, the similar processing is repeated.

In contrast, if it is determined in step S36 that there is no output data to be used as target data, the processing is terminated.

As described above, the signal processing circuit 113 of the TV signal processor 106 changes the function thereof by setting the tap structure of the prediction taps generated by the prediction tap extracting circuit 132, the tap structure of the class tap generated by the class tap extracting circuit 133, and the type of the set of tap coefficients used in carrying out the product-sum operation by the product-sum operation circuit 136. Also, as in the signal processing circuit 113, the signal processing circuit 123 of the electronic apparatus 11 (FIG. 17) changes the function thereof. The signal processing circuits 113 and 123 changes the functions thereof in this manner to cooperate in sharing the task of processing an input signal. In this case, output data of higher quality than that achieved by independent processing by either of the signal processing circuits 113 and 123 can be achieved.

Specifically, when the signal processing circuit 113 of the TV signal processor 106 operates independently, tap coefficients generated by learning processing using a component-signal HD image as teacher data and a composite-signal SD image generated by degrading the space resolution of the teacher data and converting the component signal into a composite signal as student data (hereinafter referred to as composite/component conversion and SD/HD conversion tap coefficients) are used. Using the tap coefficients, a baseband SD image signal, which is output from the tuner 105 (FIG. 15) and which is a composite signal, is processed, thus converting the composite SD image signal into a component HD image signal.

When the signal processing circuit 123 of the electronic apparatus 11 operates independently, tap coefficients generated by learning processing using an HD image generated by MPEG-encoding a component-signal HD image and MPEG-decoding the coded data as teacher data and coded SD image data generated by degrading the space resolution of the teacher data and MPEG-encoding the degraded SD image as student data (hereinafter referred to as MPEG-decoding and SD/HD conversion tap coefficients) are used. Using the tap coefficients, coded data generated by MPEG-encoding a component SD image signal output from the specific block 124 (FIG. 17) is processed, thus converting the coded data into a component HD image signal.

In contrast, when the TV signal processor 106 and the electronic apparatus 11 are electrically connected with each other, the signal processing circuit 113 of the TV signal processor 106 and the signal processing circuit 123 of the electronic apparatus 11 change the functions thereof and cooperate in sharing the task of processing an input signal.

Specifically, the signal processing circuit 123 of the electronic apparatus 11 uses a component-signal SD image as teacher data and coded data generated by MPEG-encoding the teacher data as student data and performs learning processing to generate tap coefficients (hereinafter referred to as MPEG-decoding tap coefficients). Using the tap coefficients, the signal processing circuit 123 processes coded data generated by MPEG-encoding a component SD image signal output from the specific block 124 (FIG. 17), thus converting the coded data into a component SD image signal.

The signal processing circuit 113 of the TV signal processor 106 uses a component-signal HD image as teacher data and an SD image generated by degrading the space resolution of the teacher data as student data and performs learning processing to generate tap coefficients (hereinafter referred to as SD/HD conversion tap coefficients). Using the tap coefficients, the signal processing circuit 113 processes the component SD image signal, which is generated by the signal processing circuit 123 of the electronic apparatus 11, thus converting the SD image signal into a component HD image signal.

In both modes, namely, a mode in which either of the signal processing circuits 113 and 123 performs independent processing and a mode in which the signal processing circuits 113 and 123 perform cooperative processing, the final result is a component HD image signal.

Using the composite/component conversion and SD/HD conversion tap coefficients used when the signal processing circuit 113 of the TV signal processor 106 operates independently, a composite SD image can be converted into a component HD image by one process. The conversion accuracy may degrade compared with a case in which conversion of a composite SD image into a component SD image and conversion of the component SD image into a component HD image are separately performed.

Specifically, conversion of a composite SD image into a component-signal SD image can be performed using tap coefficients generated by learning processing using the component-signal SD image as teacher data and a composite-signal SD image generated by converting the teacher data into a composite signal as student data (hereinafter referred to as composite/component conversion tap coefficients).

Conversion of a component-signal SD image into a component-signal HD image can be performed using the above-described SD/HD conversion tap coefficients (tap coefficients generated by learning processing using the component-signal HD image as teacher data and an SD image generated by degrading the space resolution of the teacher data as student data).

The composite/component conversion tap coefficients are specialized in converting a composite-signal SD image into a component-signal SD image. In view of only converting a composite signal into a component signal, the composite/component conversion tap coefficients can convert a composite-signal SD image into a component-signal SD image in a more accurate manner than the composite/component conversion and SD/HD conversion tap coefficients for converting a composite SD image into a component-signal HD image by one process.

The SD/HD conversion tap coefficients are specialized in converting an SD image into an HD image. In view of only improving the space resolution, the SD/HD conversion tap coefficients can generate an HD image by improving the space resolution of an SD image in a more accurate manner than the composite/component conversion and SD/HD conversion tap coefficients.

Similarly, the MPEG-decoding and SD/HD conversion tap coefficients can MPEG-decode coded data generated by MPEG-encoding a component SD image signal and convert the decoded data into an HD image by one process. In conversion using the MPEG-decoding and SD/HD conversion tap coefficients, the decoding accuracy may degrade compared with conversion using the MPEG-decoding tap coefficients; and the conversion accuracy may degrade compared with conversion using the SD/HD conversion tap coefficients.

From the above description, when the signal processing circuits 113 and 123 perform cooperative processing, the MPEG-decoding tap coefficients are used to convert coded data into an SD image, and the SD image is converted into an HD image using the SD/HD conversion tap coefficients. The HD image of higher quality is thus generated compared with a case in which the signal processing circuit 113 of the TV signal processor 106 operates independently using the composite/component conversion and SD/HD conversion tap coefficients and a case in which the signal processing circuit 123 of the electronic apparatus 11 operates independently using the MPEG-decoding and SD/HD conversion tap coefficients.

With the MPEG-decoding tap coefficients, coded data is MPEG-decoded, and, what is more, block distortion due to MPEG-encoding is eliminated.

Specifically, the MPEG-decoding tap coefficients are generated by learning processing using, as described above, a component-signal SD image as teacher data and coded data generated by MPEG-encoding the teacher data as student data. The MPEG-decoding tap coefficients convert the coded data into an image in which (the sum of) square errors with respect to the original image is minimum. According to the MPEG-decoding tap coefficients, the coded data is converted into an image close to the undistorted, original image. Therefore, distortion such as block distortion due to MPEG-encoding as well as MPEG-decoding is eliminated.

When tap coefficients are generated by learning processing using data generated by MPEG-encoding a component-signal SD image and MPEG-decoding the coded component-signal SD image as teacher data and coded data generated by MPEG-encoding the teacher data as student data, the tap coefficients convert the coded data into an image close to a decoded image generated when the coded data is MPEG-decoded in a normal manner, that is, a decoded image having block distortion or the like due to MPEG-encoding. In this case, the above-described distortion elimination is not performed.

As described above, a compliant electronic apparatus, such as the electronic apparatus 11, can be stored in the bay 4 of the bay-structure television set (FIGS. 1 and 2) without the bay adapter box 14. Since the compliant electronic apparatus is electrically connected with the TV signal processor 106, the compliant electronic apparatus and the TV signal processor 106 perform cooperative processing to generate a high quality image or the like. In contrast, a non-compliant electronic apparatus, such as the electronic apparatus 13, requires the bay adapter box 14 to be stored in the bay 4 of the bay-structure television set. When the non-compliant electronic apparatus is electrically connected with the TV signal processor 106, the non-compliant electronic apparatus and the TV signal processor 106 perform independent processing. Disregarding whether or not the non-compliant electronic apparatus is electrically connected with the TV signal processor 106, a high quality image, such as that generated by cooperative processing, cannot be generated.

Compared with the non-compliant electronic apparatus, the compliant electronic apparatus has added values in that the compliant electronic apparatus is easily stored in the bay 4 and generates high quality data.

In the above case, the signal processing circuit 113 of the TV signal processor 106 and the signal processing circuit 123 of the electronic apparatus 11 are each provided using the classification adaptive processing circuit (FIG. 22) for performing classification adaptive processing to implement various functions. Alternatively, the signal processing circuits 113 and 123 may include modules (blocks) performing processing corresponding to various functions.

FIG. 27 includes diagrams showing other examples of the configuration of the TV signal processor 106 and the electronic apparatus 11. In the diagrams, portions corresponding to those in FIGS. 16 and 17 are given the same reference numerals, and descriptions thereof are appropriately omitted.

Figure 27B:
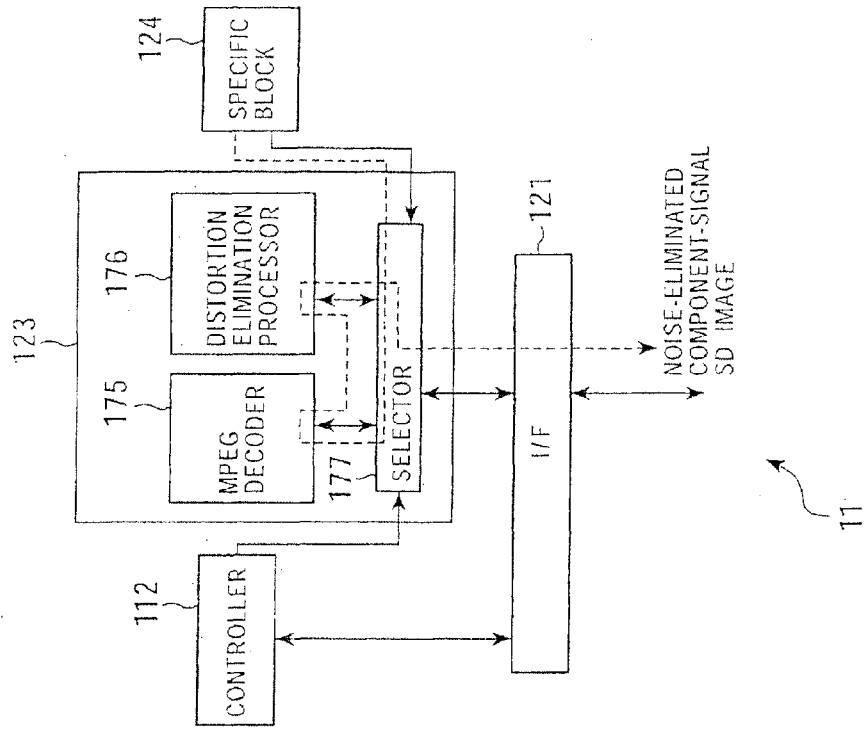
FIG. 27B is a diagram for describing independent processing by the electronic apparatus 11.
Figure 27A:
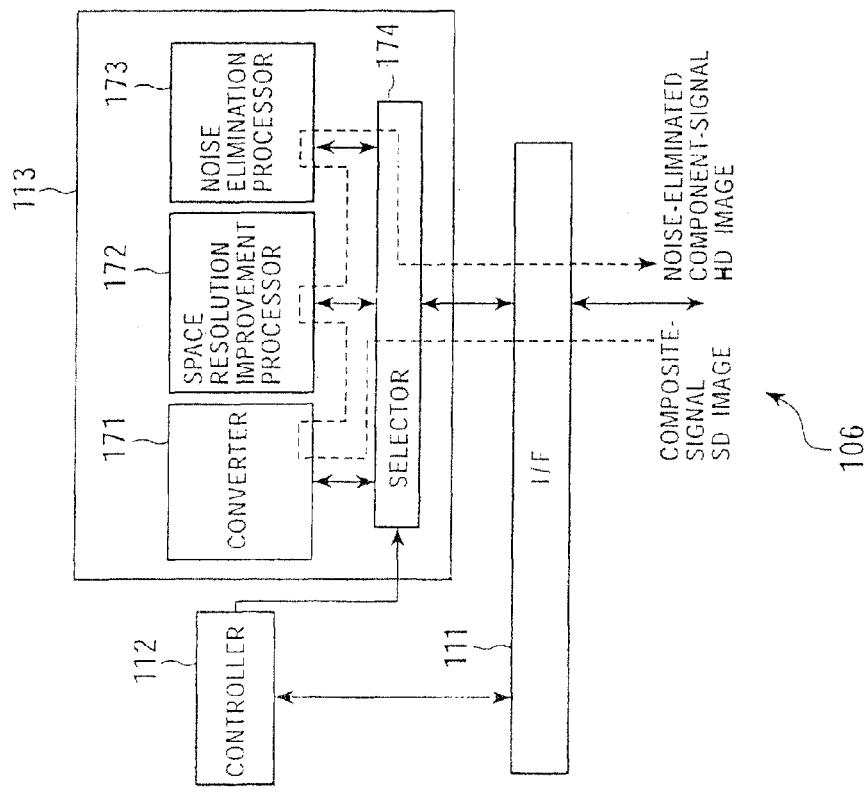
FIG. 27A is a diagram for describing independent processing by the TV signal processor 106.

Specifically, FIG. 27A shows another example of the configuration of the TV signal processor 106. The TV signal processor 106 is arranged as in the case of FIG. 16 except for the fact that the signal processing circuit 113 is provided using a converter 171, a space resolution improvement processor 172, a noise elimination processor 173, and a selector 174, instead of using the classification adaptive processing circuit.

FIG. 27B shows another example of the configuration of the electronic apparatus 11. The electronic apparatus 11 is arranged as in the case of FIG. 17 except for the fact that the signal processing circuit 123 is provided using an MPEG decoder 175, a distortion elimination processor 176, and a selector 177, instead of using the classification adaptive processing circuit.

When the TV signal processor 106 shown in FIG. 27A performs independent processing, a baseband composite SD image signal, which is output from the tuner 105 (FIG. 15), is supplied to the signal processing circuit 113 via the selector 104 and the I/F 111.

In the signal processing circuit 113, the signal from the tuner 105 is processed by being exchanged in the order indicated by dotted lines in FIG. 27A.

Specifically, in the signal processing circuit 113, the selector 174 receives the composite SD image signal from the tuner 105. The selector 174 selects the converter 171 and supplies the composite SD image signal to the selected converter 171.

The converter 171 converts the composite SD image signal from the selector 174 into a component SD image signal and supplies the component SD image signal to the selector 174. The selector 174 selects the space resolution improvement processor 172 and supplies the component SD image signal to the selected space resolution improvement processor 172.

The space resolution improvement processor 172 performs processing to improve the space resolution of the component SD image signal from the selector 174 and supplies the resulting component HD image signal to the selector 174. The selector 174 selects the noise elimination processor 173 and supplies the component HD image signal to the selected noise elimination circuit 173.

The noise elimination circuit 173 performs noise elimination processing with respect to the HD image signal from the selector 174 and supplies the resulting HD image signal to the selector 174. The selector 174 outputs the HD image signal from the noise elimination processor 173 to the selector 104 (FIG. 15) via the I/F 111.

The selector 104 supplies the HD image signal to, for example, the CRT 2 (FIG. 15), and the CRT 2 displays a corresponding HD image.

Accordingly, when the TV signal processor 106 performs independent processing, the signal processing circuit 113 of the TV signal processor 106 has a function for converting a composite signal into a component signal, a function for improving the space resolution (function for converting an SD image into an HD image), and a function for eliminating noise.

In contrast, when the electronic apparatus 11 shown in FIG. 27B performs independent processing, coded data generated by MPEG-encoding an SD image, which is output from the specific block 124, is supplied to the signal processing circuit 123.

In the signal processing circuit 123, the coded data is processed by being exchanged in the order indicated by dotted lines in FIG. 27B.

Specifically, in the signal processing circuit 123, the selector 177 receives the coded data from the specific block 124. The selector 177 selects the MPEG decoder 175 and supplies the coded data to the selected MPEG decoder 175.

The MPEG decoder 175 MPEG-decodes the coded data from the selector 177 and supplies the resulting decoded image signal (SD image signal) to the selector 177. The selector 177 selects the distortion elimination processor 176 and supplies the decoded image signal to the selected distortion elimination processor 176.

The distortion elimination processor 176 performs distortion elimination processing to eliminate block distortion or the like from the decoded image signal from the selector 177 and supplies the resulting decoded image signal to the selector 177. The selector 177 outputs the decoded image signal from the distortion elimination processor 176 via the I/F 121.

Accordingly, when the electronic apparatus 11 performs independent processing, the signal processing circuit 123 of the electronic apparatus 11 has a function for MPEG-decoding coded data generated by MPEG-encoding an image and a function for eliminating block distortion or the like.

When the electronic apparatus 11 is stored in the bay 4 (FIGS. 1 and 2) and thus electrically connected with the TV signal processor 106, as described above, the signal processing circuit 113 of the TV signal processor 106 and the signal processing circuit 123 of the electronic apparatus 11 exchange the function IDs with each other for implementing cooperative processing. Accordingly, at least one of the TV signal processor 106 and the electronic apparatus 11 changes the function thereof.

Specifically, the signal processing circuit 113 of the TV signal processor 106 changes from, for example, having the above-described three functions, namely, the function for converting a composite signal into a component signal, the function for improving the space resolution, and the function for eliminating noise, to only having the function for improving the space resolution.

The signal processing circuit 123 of the electronic apparatus 11 remains unchanged as that having the above-described two functions, namely, the function for MPEG-decoding coded data and the function for eliminating block distortion or the like.

Figure 28:
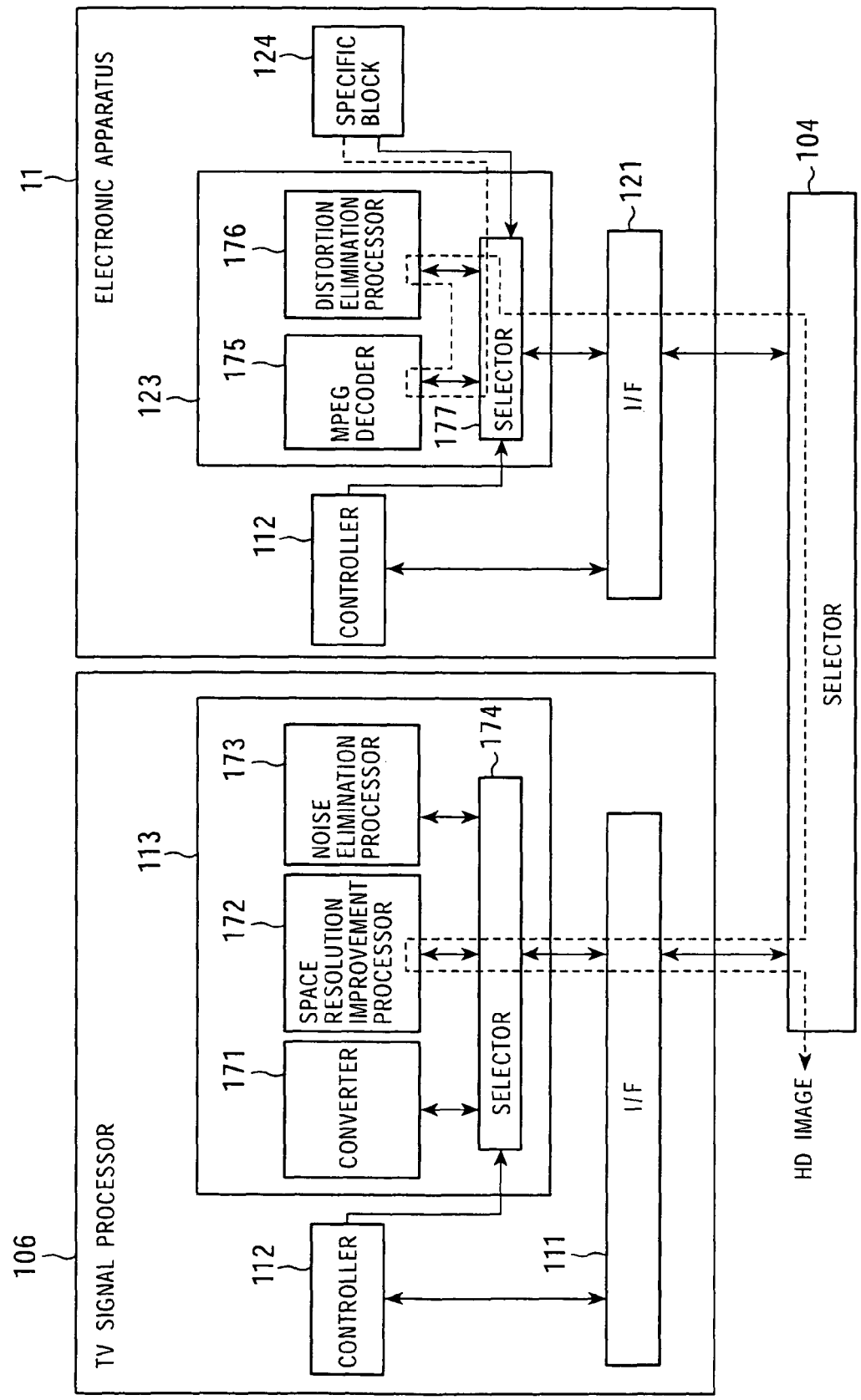
FIG. 28 is a diagram for describing cooperative processing by the TV signal processor 106 and the electronic apparatus 11.

The signal processing circuit 113 of the TV signal processor 106 and the signal processing circuit 123 of the electronic apparatus 11 process the coded data in the order indicated by dotted lines in FIG. 28.

Specifically, the signal processing circuit 123 of the electronic apparatus 11 performs processing similar to that of FIG. 27B. Accordingly, a distortion-eliminated decoded image is output from the I/F 121.

The decoded image signal is supplied to the selector 104. The selector 104 supplies the decoded image signal from (the I/F 121 of) the electronic apparatus 11 to the TV signal processor 106.

In the TV signal processor 106, the decoded image signal from the selector 104 is received by the I/F 111 and supplied to the signal processing circuit 113.

In the signal processing circuit 113, the selector 174 receives the decoded image signal and selects the space resolution improvement processor 172. The selector 174 supplies the received decoded image signal to the selected space resolution improvement processor 172.

The space resolution improvement processor 172 performs processing to improve the space resolution of the decoded image signal from the selector 174 and supplies the resulting HD image signal to the selector 174. The selector 174 outputs the HD image signal from the space resolution improvement processor 172 to the selector 104 via the I/F 111.

The selector 104 supplies the HD image signal to, for example, the CRT 2 (FIG. 15), and the CRT 2 displays a corresponding HD image.

Accordingly, when the electronic apparatus 11 performs independent processing, the coded data is MPEG-decoded, and distortion is eliminated from the resulting decoded image signal to generate distortion-eliminated decoded image signal. When the electronic apparatus 11 and the TV signal processor 106 are electrically connected with each other to perform cooperative processing, an HD image generated by improving the space resolution of the distortion-eliminated decoded image signal can be generated.

As shown in the embodiments of FIGS. 27 and 28, when the signal processing circuits 113 and 123 are provided using modules (blocks) corresponding to individual functions, the same number of modules as that of functions of each of the signal processing circuits 113 and 123 are required. As the number of functions increases, so does the number of modules. Thus, the circuit size increases.

In contrast, when the signal processing circuits 113 and 123 are each provided using the classification adaptive processing circuit, as shown in FIG. 22, basically, only the storage capacity of each coefficient storage unit 135 increases due to an increase in the number of functions. Thus, the circuit size expansion is reduced. By adopting classification adaptive processing as signal processing, the signal processing steps and circuit configuration rarely change due to changes in functions. This is clear from FIGS. 22, 25, and 26. Specifically, according to the classification adaptive processing circuit shown in FIG. 22, signal processing in accordance with various functions is implemented without changing the physical configuration of the product-sum operation circuit 136 for performing processing specialized in the single processing step, that is, performing a product-sum operation of the tap coefficients and the prediction taps.

The above-described series of processes by the signal processing circuits 113 and 123 can be performed by hardware or software. When the series of processes is performed by software, a program constituting the software is installed into a computer such as a microcomputer.

FIG. 29 shows an example of the configuration of an embodiment of a computer into which a program for performing the above-described series of processes is installed.

The program can be pre-recorded in a hard disk 205, which is a built-in recording medium included in the computer, or a ROM 203.

Alternatively, the program can be temporarily or permanently stored (recorded) in a removable recording medium 211 such as a floppy disk, a CD-ROM (Compact Disc Read Only Memory), an MO (Magneto optical) disk, a DVD (Digital Versatile Disc), a magnetic disk, or a semiconductor memory. The removable recording medium 211 can be provided as so-called package software.

In addition to installing the program into the computer from the above-described removable recording medium 211, the program may be wirelessly transmitted from a download site to the computer via an artificial satellite for digital satellite broadcasting or transmitted by wire to the computer via a network such as a LAN (Local Area Network) or the Internet. The computer receives the transmitted program at a communication unit 208, and the program is installed in the built-in hard disk 205.

The computer includes a built-in CPU (Central Processing Unit) 202. An input/output interface 210 is connected to the CPU 202 via a bus 201. When a command is input to the CPU 202 via the input/output interface 210 as a result of operating, by a user, an input unit 207 including a keyboard, a mouse, and a microphone, the CPU 202 executes the program stored in the ROM (Read Only Memory) 202. Alternatively, the CPU 202 may load the program stored in the hard disk 205, the program transmitted from the satellite or the network, received at the communication unit 208, and installed in the hard disk 205, or the program read from the removable recording medium 211 attached to a drive 209 and installed in the hard disk 205 into a RAM (Random Access Memory) 204 and executes the program. Accordingly, the CPU 202 performs processing in accordance with the above-described flowcharts or processing performed by the configurations shown in the above-described block diagrams. If necessary, the CPU 202 outputs the processing result via the input/output interface 210 from an output unit 206 including an LCD (Liquid Crystal Display) and a speaker, transmits the processing result from the communication unit 208, or records the processing result in the hard disk 205.

In this specification, processing steps for writing the program causing the computer to perform various processes are not necessarily processed in time series in the order described in the flowcharts. Parallel processing or individual processing (e.g., parallel processing or object processing) is also included.

The program may be processed by a single computer or distributedly processed by a plurality of computers. Furthermore, the program may be transmitted to a remote computer and executed by the remote computer.

The electronic apparatuses stored in the bays 4 of the bay-structure television set (FIGS. 1 and 2) are not limited to the above-described DVD player and the digital VTR. The electronic apparatus may be any type, e.g., a printer, an HD (Hard Disk) recorder, etc.

Although the tuner 104, the TV signal processor 106, and the like are incorporated in advance in the TV rack 1 (FIG. 1) to provide the bay-structure television set (FIGS. 1 and 2) in the present embodiment, the tuner 104, the TV signal processor 106, and the like need not be incorporated in advance in the TV rack 1. In other words, each of the tuner 104, the TV signal processor 106, and the like may be stored in the bay 4 of the TV rack 1 and used as one electronic apparatus.

In the present embodiment, a case in which the two electronic apparatuses, namely, the TV signal processor 106 and the electronic apparatus 11, perform cooperative processing has been described. However, cooperative processing may be performed by three or more electronic apparatuses. The contents of processing include, besides the above-described processing, time resolution creation, gray-scale creation, etc.

In the present embodiment, when the electronic apparatus 11 is stored in the bay 4 of the bay-structure television set and electrically connected with the TV signal processor 106, cooperative processing is performed. Cooperative processing may be performed by a plurality of electronic apparatuses which are stored in the bays 4 and thus electrically connected with one another or by a plurality of electronic apparatuses which are electrically connected with one another via cables or wirelessly.

In the present embodiment, the coefficient storage unit 135 (FIG. 22) pre-stores sets of a plurality of types of tap coefficients and, by changing the set of tap coefficients to be used, changes the function of the signal processing circuit 113. Instead of pre-storing the tap coefficients for changing the function of the signal processing circuit 113 in the coefficient storage unit 135, the tap coefficients may be downloaded from the outside.

Specifically, for example, as described in FIG. 1, a cellular phone can be stored in the bay 4G of the bay-structure television set. When a cellular phone is stored in the bay 4G, a communication function of the cellular phone accesses a server on another network such as the Internet and downloads necessary tap coefficients. For example, when the bay-structure television set is electrically connected with another electronic apparatus, if the electronic apparatus stores necessary tap coefficients, the tap coefficients may be downloaded from the electronic apparatus.

Similarly, information regarding the tap structures of the prediction taps and the class tap may be downloaded from the outside.

As described above, when tap coefficients are downloaded from the outside, the tap coefficients that are downloaded (hereinafter referred to as the downloaded tap coefficients) need to be stored in the coefficient storage unit 135 (FIG. 22). Thus, the coefficient storage unit 135 needs a storage area for storing the downloaded tap coefficients.

The coefficient storage unit 135 is thus provided with, besides a storage area for storing the minimum required tap coefficients (for the TV signal processor 106, for example, composite/component conversion tap coefficients for implementing the minimum required function of the TV signal processor 106), a storage area for storing the downloaded tap coefficients.

In this case, when the downloaded tap coefficients are not used, the storage area of the coefficient storage unit 135 is wasted. The coefficient storage unit 135 is thus provided with the minimum required storage area and pre-stores, in this storage area, the minimum required tap coefficients. In order to use downloaded tap coefficients, the downloaded coefficients are stored in the coefficient storage unit 135 by overwriting the storage area.

In this case, when the downloaded tap coefficients become unnecessary (for example, when an electrical connection with another electronic apparatus is broken), the coefficient storage unit 135 again must store the pre-stored tap coefficients. In order to do so, the coefficient storage unit 135 needs to maintain the pre-stored tap coefficients when overwriting the storage area for storing the downloaded tap coefficients. This can be performed by, as indicated by the dotted line in FIG. 15, providing a storage medium such as an HD (Hard Disk) 107 connected with the selector 104. In other words, the pre-stored tap coefficients in the coefficient storage unit 135 may be maintained in the HD 107.

Basically, the single coefficient memory $163_n$ in the coefficient storage unit 135 in the embodiment of FIG. 25 stores one set of tap coefficients. When one set of tap coefficients cannot be stored in the single coefficient memory $163_n$ due to a large number of bits of tap coefficients or a large number of classes, one set of tap coefficients may be stored in a plurality of coefficient memories among the coefficient memories $163_1$ to $163_N$.

Although a case in which an image is processed has been described in the present embodiment, the present invention is applicable to a case in which audio or the like is processed.

INDUSTRIAL APPLICABILITY

As described above, according to the present invention, whether or not another apparatus is connected is determined. The function of processing an input signal changes between a mode in which the other apparatus is connected and a mode in which no apparatus is connected. Accordingly, a plurality of apparatuses can cooperate in sharing the task of processing the input signal to achieve a processing result of higher quality than that achieved by independent processing by a single apparatus.

According to the present invention, an electronic apparatus which operates independently and which includes at least one signal terminal, which is exposed to the outside, for receiving or outputting a signal is stored in a cavity-shaped holder, and a connection terminal included in a connection panel in the holder is connected with the signal terminal of the electronic apparatus. Accordingly, the electronic apparatuses are easily connected with each other.

According to the present invention, a first face includes a first terminal connecting with a connection terminal included in a connection panel of a storage rack having, in a holder, the connection panel including the connection terminal to be electrically connected with a signal terminal of an electronic apparatus. A second face includes a second terminal connecting with the signal terminal of the electronic apparatus which operates independently and which includes at least one signal terminal, which is exposed to the outside, for receiving or outputting a signal. Accordingly, when the electronic apparatus is stored in the storage rack, the electronic apparatuses are easily connected with each other.

According to the present invention, a storage rack is provided including at least one cavity-shaped holder for storing an electronic apparatus which operates independently and which includes at least one signal terminal, which is exposed to the outside, for receiving or outputting a signal and a connection panel which is in the holder and which has a connection terminal connecting with the signal terminal of the electronic apparatus. Accordingly, the electronic apparatus are easily connected with each other. According to the present invention, signal processing means for performing signal processing includes an arithmetic operation unit for performing an arithmetic operation using tap coefficients and an input signal. The arithmetic operation unit performs signal processing in accordance with first and second functions without changing the physical configuration of a circuit for performing processing specialized in one processing step. The circuit size expansion is thus prevented.

The invention claimed is:

1. A signal processing apparatus for processing an input signal, comprising:
   signal processing means for processing the input signal, the signal processing means having predetermined functions;
   determining means for determining whether a second apparatus is connected; and control means for changing the function of the signal processing means in a first mode when the second apparatus is connected and is compliant to a function in which the signal processing means functions in optimal cooperation with the second apparatus, and for maintaining a current function of the signal processing means in a second mode when the second apparatus is connected and non-compliant, and for maintaining a current function of the signal processing means in a third mode when the second apparatus is not connected, wherein compliancy is determined based on whether a returned function ID in response to a compliancy determination is received, and wherein the signal processing apparatus has an ID table comprising a plurality of function IDs, each of the plurality of function IDs is associated with processing information comprising processing tasks to be shared between the signal processing device and a connected compliant second apparatus, wherein, when the second apparatus is connected, the signal processing apparatus requests a function ID, and when a function ID is received, the signal processing apparatus refers to the function ID table to retrieve the processing information associated with the received function ID, and wherein a function of the signal processing apparatus and a function of the second apparatus is changed in accordance with the processing information retrieved, and wherein the signal processing apparatus changes from performing a plurality of tasks simultaneously to performing less tasks after a connections to the connected compliant apparatus.

2. The signal processing apparatus according to claim 1, wherein the input signal is processed by the signal processing means and the second apparatus.

3. The signal processing apparatus according to claim 2, wherein the control means changes the function of the signal processing means to improve the quality of an output signal generated by the signal processing means and the second apparatus in the first mode to be higher than the quality of an output signal generated by independent processing of the signal processing means or the second apparatus.

4. The signal processing apparatus according to claim 2, wherein the control unit changes the function of the signal processing unit to improve the quality of an output signal generated by the signal processing unit and the second apparatus in the first mode to be higher than the quality of an output signal generated by independent processing of the signal processing unit or the second apparatus.

5. The signal processing apparatus according to claim 1, wherein the signal processing means includes:

prediction tap extracting means for extracting, from the input signal, prediction taps for use in computing a predetermined predicted value;

class tap extracting means for extracting, from the input signal, a class tap for use in performing predetermined classification;

classification means for performing the classification on the basis of the class tap;

tap coefficient obtaining means for obtaining tap coefficients corresponding to a class code generated as a result of the classification, the tap coefficients being generated by learning; and prediction means for computing the predetermined predicted value on the basis on the tap coefficients corresponding to the class code and the prediction taps.

6. The signal processing apparatus according to claim 5, wherein a plurality of types of tap coefficients is prepared by learning by changing teacher data, which is model data in the learning processing, or student data, which is used in the learning processing to be converted to be much the same as the model data, and the control means changes the function of the signal processing means by controlling the type of tap coefficients to be used by the signal processing means.

7. The signal processing apparatus according to claim 6, further comprising storage means for storing the plurality of types of tap coefficients.

8. The signal processing apparatus according to claim 6, wherein the control means downloads a necessary type of tap coefficients from the outside.

9. The signal processing apparatus according to claim 6, wherein the control means changes the function of the signal processing means by controlling the structure of the prediction taps or the class tap to be used by the signal processing means.

10. The signal processing apparatus according to claim 6, further comprising a storage unit for storing the plurality of types of tap coefficients.

11. The signal processing apparatus according to claim 6, wherein the control unit downloads a necessary type of tap coefficients from the outside.

12. The signal processing apparatus according to claim 6, wherein the control unit changes the function of the signal processing unit by controlling the structure of the prediction taps or the class tap to be used by the signal processing unit.

13. The signal processing apparatus according to claim 5, wherein a plurality of types of tap coefficients is prepared by learning by changing teacher data, which is model data in the learning processing, or student data, which is used in the learning processing to be converted to be much the same as the model data, and the control unit changes the function of the signal processing unit by controlling the type of tap coefficients to be used by the signal processing unit.

14. The signal processing apparatus according to claim 1, wherein the control means changes the function of the signal processing means on the basis of a function of the second apparatus.

15. The signal processing apparatus according to claim 14, wherein the control means receives function information indicating the function of the second apparatus from the second apparatus and changes the function of the signal processing means on the basis of the function information.

16. The signal processing apparatus according to claim 14, wherein the control unit receives function information indicating the function of the second apparatus from the second apparatus and changes the function of the signal processing unit on the basis of the function information.

17. The signal processing apparatus according to claim 1, further comprising supplying means for supplying function information indicating the function of the signal processing means to the second apparatus.

18. The signal processing apparatus according to claim 1, wherein the input signal is processed by the signal processing unit and the second apparatus.

19. The signal processing apparatus according to claim 1, wherein the signal processing unit includes:

a prediction tap extracting unit for extracting, from the input signal, prediction taps for use in computing a predetermined predicted value;

a class tap extracting unit for extracting, from the input signal, a class tap for use in performing predetermined classification;

a classification unit for performing the classification on the basis of the class tap;

a tap coefficient obtaining unit for obtaining tap coefficients corresponding to a class code generated as a result of the classification, the tap coefficients being generated by learning; and a prediction unit for computing the predetermined predicted value on the basis on the tap coefficients corresponding to the class code and the prediction taps.

20. The signal processing apparatus according to claim 1, wherein the control unit changes the function of the signal processing unit on the basis of a function of the second apparatus.

21. The signal processing apparatus according to claim 1, further comprising a supplying unit for supplying function information indicating the function of the signal processing unit to the second apparatus.

22. A signal processing method for a signal processing apparatus for processing an input signal, comprising:

a signal processing step of processing the input signal, the signal processing step having a predetermined function;

a determining step of determining whether a second apparatus is connected; and a control step for changing the function of the signal processing step in a first mode when the second apparatus is connected and is compliant to a function in which the signal processing step functions in optimal cooperation with the second apparatus, and for maintaining a current function of the signal processing step when in a second mode when the second apparatus is connected and non-compliant, and for maintaining a current function of the signal processing step in a third mode in which the second apparatus is not connected, wherein compliancy is determined based on whether a returned function ID in response to a compliancy determination is received, and wherein the signal processing apparatus has an ID table comprising a plurality of function IDs, each of the plurality of function IDs is associated with processing information comprising processing tasks to be shared between the signal processing device and a connected compliant second apparatus, wherein, when the second apparatus is connected, the signal processing apparatus requests a function ID, and when a function ID is received, the signal processing apparatus refers to the function ID table to retrieve the processing information associated with the received function ID, and wherein a function of the signal processing apparatus and a function of the second apparatus is changed in accordance with the processing information retrieved, and wherein the signal processing apparatus changes from performing a plurality of tasks simultaneously to performing less tasks after a connections to the connected compliant apparatus.

23. A non-transitory recording medium having recorded therein a program for causing a computer to perform signal processing for processing an input signal, the program comprising:

a signal processing step of processing the input signal, the signal processing step having a predetermined function;

a determining step of determining whether a second apparatus is connected; and a control step for changing the function of the signal processing step in a first mode when the second apparatus is connected and is compliant to a function in which the signal processing step functions in optimal cooperation with the second apparatus, and for maintaining a current function of the signal processing step when in a second mode when the second apparatus is connected and non-compliant, and for maintaining a current function of the signal processing step in a third mode when the second apparatus is not connected, wherein compliancy is determined based on whether a returned function ID in response to a compliancy determination is received, and wherein the signal processing apparatus has an ID table comprising a plurality of function IDs, each of the plurality of function IDs is associated with processing information comprising processing tasks to be shared between the signal processing device and a connected compliant second apparatus, wherein, when the second apparatus is connected, the signal processing apparatus requests a function ID, and when a function ID is received, the signal processing apparatus refers to the function ID table to retrieve the processing information associated with the received function ID, and wherein a function of the signal processing apparatus and a function of the second apparatus is changed in accordance with the processing information retrieved, and wherein the signal processing apparatus changes from performing a plurality of tasks simultaneously to performing less tasks after a connections to the connected compliant apparatus.

24. A signal processing system comprising at least first and second signal processing apparatuses for processing an input signal, wherein the first and second signal processing apparatuses each include:

signal processing means for processing the input signal, the signal processing means having predetermined functions determining means for determining whether a third signal processing apparatus is connected; and control means for changing the function of the signal processing means in a first mode when the third apparatus is connected and is compliant to a function in which the signal processing means functions in optimal cooperation with the third apparatus, and for maintaining a current function of the signal processing means in a second mode when the third apparatus is connected and non-compliant, and for maintaining a current function of the signal processing means in a third mode when the third apparatus is not connected, wherein compliancy is determined based on whether a returned function ID in response to a compliancy determination is received, and wherein the first signal processing apparatus and the second signal processing apparatus have an ID table comprising a plurality of function IDs, each of the plurality of function IDs is associated with processing information comprising processing tasks to be shared between the signal processing device and a connected compliant second apparatus, wherein, when the second apparatus is connected, the signal processing apparatus requests a function ID, and when a function ID is received, the signal processing apparatus refers to the function ID table to retrieve the processing information associated with the received function ID, and wherein a function of the signal processing apparatus and a function of the second apparatus is changed in accordance with the processing information retrieved, and wherein the signal processing apparatus changes from performing a plurality of tasks simultaneously to performing less tasks after a connections to the connected compliant apparatus.

25. The signal processing system according to claim 24, wherein the signal processing means includes:

prediction tap extracting means for extracting, from the input signal, prediction taps for use in computing a predetermined predicted value;

class tap extracting means for extracting, from the input signal, a class tap for use in performing predetermined classification;

classification means for performing the classification on the basis of the class tap;

tap coefficient obtaining means for obtaining tap coefficients corresponding to a class code generated as a result of the classification, the tap coefficients being generated by learning processing; and prediction means for computing the predetermined predicted value from the tap coefficients corresponding to the class code and the prediction taps.

26. A signal processing apparatus for processing an input signal, comprising:

a signal processing unit for processing the input signal, the signal processing unit having predetermined functions;

a determining unit for determining whether a second apparatus is connected; and a control unit for changing the function of the signal processing unit in a first mode when the second apparatus is connected and is compliant to a function in which the signal processing unit functions in optimal cooperation with the second apparatus, and for maintaining a current function of the signal processing unit in a second mode when the second apparatus is connected and non-compliant, and for maintaining a current function of the signal processing unit in a third mode when the second apparatus is not connected, wherein compliancy is determined based on whether a returned function ID in response to a compliancy determination is received, and wherein the signal processing apparatus has an ID table comprising a plurality of function IDs, each of the plurality of function IDs is associated with processing information comprising processing tasks to be shared between the signal processing device and a connected compliant second apparatus, wherein, when the second apparatus is connected, the signal processing apparatus requests a function ID, and when a function ID is received, the signal processing apparatus refers to the function ID table to retrieve the processing information associated with the received function ID, and wherein a function of the signal processing apparatus and a function of the second apparatus is changed in accordance with the processing information retrieved, and wherein the signal processing apparatus changes from performing a plurality of tasks simultaneously to performing less tasks after a connections to the connected compliant apparatus.

* * * * *